US012690098B2

(12) United States Patent
Frederixon et al.

(10) Patent No.: US 12,690,098 B2
(45) Date of Patent: *Jul. 21, 2026

(54) MICROWAVE WASTE HEATING SYSTEM AND RELATED FEATURES

(71) Applicant: A.L.M. Holding Co., Onalaska, WI (US)

(72) Inventors: Drew J. Frederixon, Rockland, WI (US); Gerald H. Reinke, La Crosse, WI (US); Jacob G. Hehir, Holmen, WI (US)

(73) Assignee: A.L.M. Holding Company, Onalaska, WI (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/782,830

(22) PCT Filed: May 19, 2021

(86) PCT No.: PCT/US2021/033145
§ 371 (c)(1),
(2) Date: Jun. 6, 2022

(87) PCT Pub. No.: WO2022/245348
PCT Pub. Date: Nov. 24, 2022

(65) Prior Publication Data
US 2024/0080950 A1 Mar. 7, 2024

(51) Int. Cl.
H05B 6/78 (2006.01)
C02F 1/02 (2023.01)
(Continued)

(52) U.S. Cl.
CPC ................. H05B 6/78 (2013.01); C02F 1/02 (2013.01); C02F 1/487 (2013.01); H05B 6/76 (2013.01);
(Continued)

(58) Field of Classification Search
CPC ...... C02F 1/02; C02F 1/487; C02F 2103/005; C02F 2303/04; H05B 2206/044;
(Continued)

(56) References Cited

U.S. PATENT DOCUMENTS 3,239,643 A 3/1966 Kluck
3,665,141 A 5/1972 Schiffmann et al.
(Continued)

FOREIGN PATENT DOCUMENTS

CA 2051445 A1 10/1990
CA 2660700 A1 2/2008
(Continued)

OTHER PUBLICATIONS

"Animal Feeding Operations-Uses of Manure," National Pollutant Discharge Elimination System (NPDES), United States Environmental Protection Agency (EPA), Jan. 2022, 12 pp.
(Continued)

*Primary Examiner* — Quang T Van
(74) *Attorney, Agent, or Firm* — Kagan Binder, PLLC

(57) ABSTRACT

A system for processing waste material is disclosed that includes at least one microwave generator, at least one microwave guide operatively connecting the at least one microwave generator to at least a first conveyor unit. The first conveyor unit is provided in a first housing that includes at least one opening configured to receive microwave energy via a first microwave guide and the first conveyor unit is configured to receive and process a quantity of waste material, which includes heating the waste material to a first temperature by applying microwave energy to the waste material within the first housing.

20 Claims, 35 Drawing Sheets

(51) Int. Cl.

| | |
|---|---|
| *C02F 1/48* | (2023.01) |
| *H05B 6/76* | (2006.01) |
| *C02F 103/00* | (2006.01) |
| *H05B 6/70* | (2006.01) |

(52) U.S. Cl.
CPC .... *C02F 2103/005* (2013.01); *C02F 2303/04* (2013.01); *H05B 6/707* (2013.01); *H05B 2206/045* (2013.01)

(58) Field of Classification Search
CPC .... H05B 2206/045; H05B 6/707; H05B 6/76; H05B 6/78
USPC ....... 219/699, 679, 678, 680, 681, 682, 686, 219/701, 756, 757, 759
See application file for complete search history.

(56) References Cited

U.S. PATENT DOCUMENTS

| | | | |
|---|---|---|---|
| 3,774,003 A | 11/1973 | Kaufman | |
| 3,856,275 A | 12/1974 | Dydzyk | |
| 4,176,267 A | 11/1979 | Rueggeberg | |
| 4,180,718 A | 12/1979 | Hanson | |
| 4,246,462 A | 1/1981 | Meisel | |
| 4,252,459 A | 2/1981 | Jeppson | |
| 4,253,005 A | 2/1981 | Gordon et al. | |
| 4,276,093 A | 6/1981 | Pickermann | |
| 4,319,856 A | 3/1982 | Jeppson | |
| 4,338,869 A | 7/1982 | Hoskinson | |
| 4,395,025 A | 7/1983 | Watanabe et al. | |
| 4,488,027 A | 12/1984 | Dudley et al. | |
| 4,619,550 A | 10/1986 | Jeppson | |
| 4,808,782 A | 2/1989 | Nakagawa et al. | |
| 4,861,955 A | 8/1989 | Shen | |
| 5,083,870 A | 1/1992 | Sindelar et al. | |
| 5,092,706 A | 3/1992 | Bowen et al. | |
| 5,120,217 A | 6/1992 | O'Brien et al. | |
| 5,242,493 A | 9/1993 | Glynn et al. | |
| 5,270,000 A | 12/1993 | Goldner et al. | |
| 5,303,999 A | 4/1994 | Nath et al. | |
| 5,352,275 A | 10/1994 | Nath et al. | |
| 5,447,388 A | 9/1995 | Rouse | |
| 5,810,471 A | 9/1998 | Nath et al. | |
| 5,843,287 A * | 12/1998 | Wicks ...................... B09B 3/35 204/157.43 | |
| 5,902,510 A | 5/1999 | Balbaa et al. | |
| 6,186,700 B1 | 2/2001 | Omann | |
| 6,207,462 B1 | 3/2001 | Barclay et al. | |
| 6,262,405 B1 * | 7/2001 | Wicks .................... H05B 6/802 219/679 | |
| 6,349,658 B1 | 2/2002 | Tyer | |
| 6,455,826 B1 | 9/2002 | Araya et al. | |
| 6,618,957 B2 | 9/2003 | Novak et al. | |
| 6,768,089 B2 | 7/2004 | Minobe et al. | |
| 7,081,605 B2 | 7/2006 | Fritts et al. | |
| 7,432,483 B2 | 10/2008 | Wilson | |
| 7,758,235 B1 | 7/2010 | Collette | |
| 7,927,465 B2 | 4/2011 | Novak | |
| 7,931,806 B2 | 4/2011 | Logan et al. | |
| 8,101,893 B2 | 1/2012 | Bogdan | |
| 8,490,904 B2 | 7/2013 | Liubakka et al. | |
| 8,575,525 B2 | 11/2013 | Mackay et al. | |
| 8,585,788 B2 | 11/2013 | Drozd et al. | |
| 8,586,898 B2 | 11/2013 | Novak | |
| 9,314,231 B2 | 4/2016 | O'Neil et al. | |
| 9,624,625 B2 | 4/2017 | Coe | |
| 9,642,194 B2 | 5/2017 | Wilber et al. | |
| 10,081,920 B2 | 9/2018 | Coe | |
| 10,155,866 B2 | 12/2018 | Le et al. | |
| 10,214,786 B2 | 2/2019 | Logan et al. | |
| 10,239,331 B1 | 3/2019 | Gervais et al. | |
| 10,294,616 B2 | 5/2019 | Crupi et al. | |
| 11,198,977 B2 | 12/2021 | Eliot | |
| 12,058,799 B2 | 8/2024 | Hegg | |
| 12,144,093 B2 | 11/2024 | Hegg | |
| 12,144,094 B2 | 11/2024 | Hegg | |
| 12,324,083 B2 | 6/2025 | Frederixon et al. | |
| 2002/0046474 A1 | 4/2002 | Novak et al. | |
| 2002/0191481 A1 | 12/2002 | Cox et al. | |
| 2007/0122235 A1 | 5/2007 | Kasahara et al. | |
| 2010/0020630 A1 | 1/2010 | Musil | |
| 2011/0290788 A1 | 12/2011 | Klemarewski | |
| 2012/0029252 A1 | 2/2012 | Lissianski et al. | |
| 2013/0056987 A1 | 3/2013 | Novak | |
| 2013/0336720 A1 | 12/2013 | Jack et al. | |
| 2013/0343145 A1 | 12/2013 | Villalobos Davila | |
| 2014/0119829 A1 | 5/2014 | Eliot | |
| 2014/0146632 A1 | 5/2014 | Eliot | |
| 2014/0263779 A1 | 9/2014 | Svec et al. | |
| 2015/0164108 A1 | 6/2015 | Logan et al. | |
| 2015/0237684 A1 | 8/2015 | Huber | |
| 2017/0182531 A1 | 6/2017 | Hurliln et al. | |
| 2018/0017323 A1 | 1/2018 | Whitney et al. | |
| 2018/0187385 A1 | 7/2018 | Reinke et al. | |
| 2018/0343713 A1 | 11/2018 | Swiergon et al. | |
| 2019/0017233 A1 | 1/2019 | Coe | |
| 2019/0100886 A1 | 4/2019 | Eliot | |
| 2019/0274195 A1 | 9/2019 | Magana | |
| 2019/0297922 A1 | 10/2019 | Takeda et al. | |
| 2019/0320508 A1 | 10/2019 | Vickers et al. | |
| 2019/0373926 A1 | 12/2019 | Druga et al. | |
| 2021/0007190 A1 | 1/2021 | Hegg | |
| 2022/0136183 A1 | 5/2022 | Eliot | |
| 2022/0256662 A1 | 8/2022 | Frederixon et al. | |
| 2023/0074184 A1 | 3/2023 | Frederixon et al. | |
| 2023/0126550 A1 | 4/2023 | Frederixon et al. | |
| 2023/0210145 A1 | 7/2023 | Frederixon et al. | |
| 2023/0211040 A1 | 7/2023 | Frederixon et al. | |
| 2023/0328853 A1 | 10/2023 | Hegg | |
| 2023/0345593 A1 | 10/2023 | Hegg | |

FOREIGN PATENT DOCUMENTS

| | | | |
|---|---|---|---|
| CL | 2017000155 A1 | 7/2017 | |
| CL | 202103591 A1 | 10/2022 | |
| CL | 2023000379 A1 | 7/2023 | |
| CN | 201172789 Y | 12/2008 | |
| CN | 102658077 A | 9/2012 | |
| CN | 102690699 A | 9/2012 | |
| CN | 106309136 A | 1/2017 | |
| CN | 206204738 U | 5/2017 | |
| CN | 108547199 A | 9/2018 | |
| CN | 107673927 B | 10/2018 | |
| DE | 2627588 B2 | 12/1977 | |
| DE | 3505570 C1 | 1/1991 | |
| EP | 0529285 A1 | 7/1992 | |
| EP | 1611788 A1 | 1/2006 | |
| EP | 2689833 A2 | 1/2014 | |
| EP | 2920533 B1 | 6/2018 | |
| EP | 2318487 B1 | 5/2019 | |
| FR | 2522798 A1 | 9/1983 | |
| FR | 2755450 A1 | 5/1998 | |
| JP | S45-014954 B | 5/1970 | |
| JP | S50-154545 U | 12/1975 | |
| JP | S52-97653 U | 7/1977 | |
| JP | S61-158091 U | 9/1986 | |
| JP | H06-000147 B | 1/1994 | |
| JP | H07-505193 A | 6/1995 | |
| JP | 2008518930 A | 6/2008 | |
| KR | 2010-0133842 A | 12/2010 | |
| KR | 101030187 B1 | 4/2011 | |
| KR | 101089213 B1 | 12/2011 | |
| KR | 101251102 B1 | 4/2013 | |
| KR | 10-2015-0098455 A | 8/2015 | |
| WO | 90/12602 A1 | 11/1990 | |
| WO | 1993009647 A1 | 5/1993 | |
| WO | 93/10952 A1 | 6/1993 | |
| WO | 1996034241 A1 | 10/1996 | |
| WO | 2006050122 A1 | 5/2006 | |
| WO | 2006057563 A1 | 6/2006 | |
| WO | 2011036773 A1 | 3/2011 | |
| WO | 2013166489 A1 | 11/2013 | |
| WO | 2013166490 A2 | 11/2013 | |

(56)                    References Cited

FOREIGN PATENT DOCUMENTS

| WO | 2016/003583 A1 | 1/2016 |
| WO | 2016/012334 A1 | 1/2016 |
| WO | 2017165664 A1 | 9/2017 |
| WO | 2018154094 A1 | 8/2018 |
| WO | 2018/170218 A1 | 9/2018 |
| WO | 2020/106263 A1 | 5/2020 |
| WO | 2021003250 A2 | 1/2021 |
| WO | 2022/245348 A1 | 11/2022 |
| WO | 2022/250663 A1 | 12/2022 |
| WO | 2023/069159 A1 | 4/2023 |
| WO | 2023/133182 A1 | 7/2023 |
| WO | 2023/133186 A1 | 7/2023 |
| WO | 2023/249650 A2 | 12/2023 |

OTHER PUBLICATIONS

"Animal Product Manual" from the USDA Animal and Plant Health Inspection Service, U.S. Department of Agriculture, Second Edition issued 2014, 730 pp. (Filed in 8 parts).

"Bedding Option for Dairy Cows," UMass Extension Crops, Dairy, Livestock, and Equine Program, CDLE Pub. 11-48, retrieved from https://ag.umass.edu/sites/ag.umass.edu/files/fact-sheets/pdf/ BeddingOptionsforDairyCows(11-48 on Dec. 28, 2021, 2 pp.

"Conveyorized Modular Industrial Microwave Power Systems," from Thermex Thermatron, accessed from https://thermex-thermatron. com/industrial-microwave-systems, on Apr. 10, 2019, 1 pp.

"DM-6: Lesson 12 Physical Methods—Thermal Processing," Module 4. Microbiology of food preservation, from Food and Industrial Microbiology, Nov. 2012, retrieved from http://ecoursesonline.iasri. res.in/mod/page/view.php?id=5130 on Jan. 2021, 10 pp.

"Environmental Regulations and Technology—Control of Pathogens and Vector Attraction in Sewage Sludge," United States Environmental Protection Agency (EPA) Section 503.32, Jul. 2003, 186 pp.

European Union Animal By-Products Regulations (Regulation 1069/ 2009), Oct. 2009, 62 pp.

"Food Additive Status List," United States Food and Drug Administration (FDA) Food Additive Status List, retrieved from https:// www.fda.gov/food/food-additives-petitions/food-additive-status-list current as of Aug. 2021, retrieved Jan. 2022, 99 pp.

"Food additives," from the World Health Organization dated Jan. 31, 2018, retrieved from https://who.it/news-room/fact-sheets/detail/ food-additives on Dec. 29, 2021, 4 pp.

"Good Practices for the Feed Industry, Implementing the Codex Alimentarius Code of Practice on Good Animal Feeding," FAO Animal Production and Health Manual, Food and Agriculture Organization of the United Nations and International Feed Industry Federation, 2010, 106 pp.

"Heating, ventilation, and air conditioning," Wikipedia, retrieved from https://en.wikipedia.org/wiki/Heating,_ventilation,_and_air_ conditioning on Sep. 7, 2020, 17 pp.

"Industrial Microwaves Information-Industrial Microwave Systems Components," from Cellencor, Apr. 10, 2019, 1 pp.

"Seed Heat-Treatment: A Management Strategy for Controlling Bacterial Diseases," Sustainable Farming on the Urban Fringe, Jan. 2012, retrieved from https://sustainable-farming.rutgers.edu/seed-heat-treatment-manage-bacterial-diseases/ on Apr. 20, 2022, 4 pp.

"Mechanical Heat Treatment of Municipal Solid Waste," from Department for Environment Food and Rural Affairs (Defra), 2007, 32 pp.

"Thermal Pre-treatment of Biomass for Large-scale Applications, Summary and Conclusions form the IEA Bioenergy ExCo66 Workshop," IEA Bioenergy: ExCo: 2011:05, Oct. 2010, 24 pp.

Whitepaper entitled "Thermal Processing of Food," from Safefood 360°, Inc., 2014, 23 pp.

Aramideh, S., "Numerical simulation of biomass fast pyrolysis in fluidized bed and auger reactors," Thesis for degree of Master of Science at Iowa State University, Jan. 2014, 121 pp.

Baiano, A., "Recovery of Biomolecules from Food Wastes—A Review," Molecules, vol. 19, No. 9, Sep. 2014, 22 pp.

Code of Federal Regulations, Chapter 21, Part 112—Standards for the Growing, Harvesting, Packing, and Holding of Produce for Human Consumption, May 2022, 50 pp.

Code of Federal Regulations, Chapter 40, Part 503—Standards for the Use of Disposal of Sewage Sludge, May 2022, 47 pp.

Carlson et al., "Bedding Recovery From Manure: The Solution to Livestock Bedding," Feeco International, retrieved from https:// feeco.com/bedding-recovery-from-manure-the-solution-to-livestock-bedding/ on Dec. 28, 2021, 5 pp.

Data Sheet entitled "80dB Stainless steel RFI shielding Aaronia X-Steel," from Aaronia AG, Rev. 1.6, dated Jun. 1, 2015, 3 pp.

Data Sheet entitled "Fireproof Shielding Fabric Aaronia Mesh," from Aaronia AG, Rev. 1.1, dated Sep. 19, 2014, 3 pp.

Doran et al., "Chapter 7. Treatments to Promote Seed Germination," from Handbook on Seeds of Dry-Zone Acacias: A Guide for Collecting, Extracting, Cleaning, and Storing the Seed and for Treatment to Promote Germination of Dry-zone Acacias, 1983, retrieved from http://www.fao.org/3/q2190e/q2190e07.htm on Apr. 20, 2022, 11 pp.

Drygas et al., "The impact of heat treatment on the components of plant biomass as exemplified by Junniperus sabina dn Picea abies," Econtechmod: An International Quarterly Journal on Economics of Technology and Modelling Processes, vol. 5, No. 3, Jul. 2016, 10 pp.

European Directive 86/278/EEC of Jun. 12, 1986 on the protection of the environment, and in particular of the soil, when sewage sludge is used in agriculture, Document 31986L0278, 7 pp.

European Directive 91/271/EEC of May 21, 1991 concerning urban waste-water treatment, Document 31991L0271, 13 pp.

European Directive 2008/98/EC of the European Parliament and of the Council of Nov. 19, 2008 on waste and repealing certain Directives (Text with EEA relevance), Document 32008L0098, 28 pp.

Hassani et al., "The influence of microwave irradiation on rocks for microwave-assisted underground excavation," Journal of Rock Mechanics and Geotechnical Engineering, vol. 8, No. 1, Dec. 2015, 15 pp.

Invitation to Pay Additional Fees for related PCT/US2021/033145, 22 pages, Mar. 25, 2022.

International Search Report and Written Opinion of International Application No. PCT/US2021/033145, mailed May 16, 2022, 26 pp.

International Search Report and Written Opinion of International Application No. PCT/US2021/034241, mailed Feb. 10, 2022, 16 pp.

John et al., "Understanding microwave induced sorting of porphyry copper ores," Minerals Engineering, vol. 84, Dec. 2015, 37 pp.

Kingman, S., "Recent developments in microwave processing of minerals," International Materials Reviews, vol. 51, No. 1, Feb. 2006, 12 pp.

Koleini et al., Chapter 4, "Microwave Heating Applications in Mineral Processing," The Development and Application pf Microwave Heating, Edited by Wenbin Cao, Nov. 2012, 26 pp.

Kostas et al., "The application of microwave heating in bioenergy: A review on the microwave pre-treatment and upgrading technologies for biomass," Renewable and Sustainable Energy Reviews, vol. 77, Apr. 2017, 63 pp. '(Paper).

Kouhkannejad, M., "Post-thermal application of feed additives," from All About Feed, Aug. 17, 2020, retrieved from https://www. allaboutfeed.net/animal-feed/feed-processing/post-thermal-application-of-feed-additives/ on Apr. 20, 2022, 6 pp.

Kwong et al., "Combustion of Biomass in Fluidized Beds: A Review of Key Phenomena and Future Perspectives," Energy & Fuels, vol. 35, No. 20, Oct. 2021, 32 pp.

Leach et al., "Recycling manure as cow bedding: Potential benefits and risks for UK dairy farms," The Veterinary Journal, vol. 206, No. 2, Nov. 2015, 8 pp.

Li et al., "Effectiveness of microwave-assisted thermal treatment in the extraction of gold in cyanide tailings," Journal of Hazardous Materials, vol. 384, Oct. 2019, 3 pp. Abstract Only.

(56) References Cited

OTHER PUBLICATIONS

Masthoff et al., "A systematic review of the effect of thermal processing on the allergenicity of tree nuts," Allergy European Journal of Allergy and Clinical Immunology, vol. 68, No. 8, Aug. 2013, 11 pp.

McGrath, M., "Heat Treating Seeds for Disease Management," by Cornell University, retrieved from http://vegetablemdonline.ppath.cornell.edu/NewsArticles/Hot-Water-Seed-Trt_McGrath_2016-17f56dy.pdf on Apr. 20, 2022, 38 pp.

Ozkoc et al., "Chapter 20—Recent Developments in Microwave Heating," Emerging Technologies for Food Processing (Second Edition), Aug. 2014, 23 pp.

Reyes et al., "Heat-Assisted Batch Settling of Mineral Suspensions in Inclined Containers," Minerals, vol. 9, No. 4, Apr. 2019, 19 pp.

Satish, H., "Exploring Microwave Assisted Rock Breakage for Possible Space Mining Applications," Thesis for the degree of Master of Engineering, for McGill University, Jun. 2005, 128 pp.

Setyawan, E., "Torrefaction of Biomass: An Overview," BioEnergy Consult—Powering a Greener Future, Jan. 2022, 7 pp.

Smeenk et al., "Experience with Atmospheric Fluidized Bed Gasification of Switchgrass," BioEnergy '98 conference, Dec. 1998, 9 pp. found at https://www.osti.gov/servletspurl/334227.

Taqi et al., "Understanding microwave heating in biomass-solvent systems," Chemical Engineering Journal, vol. 393, Mar. 2020, 10 pp.

Teimoori et al., "Twenty years of experimental and numerical studies on microwave-assisted breakage of rocks and minerals—a review," arXiv: Applied Physics, Nov. 2020, 43 pp.

Tumuluru et al., "Formulation, Pretreatment, and Densification Options to Improve Biomass Specifications for Co-Firing High Percentages with Coal," Industrial Biotechnology, vol. 8, No. 3, Jun. 2012, 20 pp.

Office action, and translation thereof, from counterpart Korean Application No. 10-2023-7043729, dated Jul. 16, 2025, 20 pp.

Jankovic et al., "The Effects of Microwave Radiation on Microbial Cultures," Hospital Pharmacology-International Multidisciplinary Journal, vol. 1, No. 2, Jan. 2014, pp. 102-108.

Vorster et al., "The effect of microwave radiation upon the processing of Neves Corvo copper ore," International Journal of Mineral Processing, vol. 63, No. 1, Jun. 2001, pp. 29-44. (Abstract Only).

United States Code, Title 33, Navigation and Navigable Waters, Chapter 26, Water Pollution Prevention and Control, 1972, 233 pp. (Filed in 10 parts).

Vorster, W., "The Effect of Microwave Radiation on Mineral Processing," Thesis for the degree of Doctor of Philosophy at the University of Birmingham, Jun. 2001, 256 pp.

Wang et al., "Impact of Thermal Pretreatment Temperatures on Woody Biomass Chemical Composition, Physical Properties, and Microstructure," Energies, vol. 11, No. 1, Dec. 2017, 20 pp.

Wisconsin Department of Natural Resources (Wi Dnr) Chapter NR 204—Domestic Sewage Sludge Management, May 2011, No. 665, May 2011, 13 pp.

Zafar, S., "Thermal Conversion of Biomass," BioEnergy Consult—Powering a Greener Future, Sep. 2021, 10 pp.

Zhang et al., "Liquefaction of Biomass and Upgrading of Bio-Oil: A Review," Molecules, vol. 24, No. 12, Jun. 2019, 30 pp.

\* cited by examiner

152

116

114

104

206

208

210

212

214

201

400

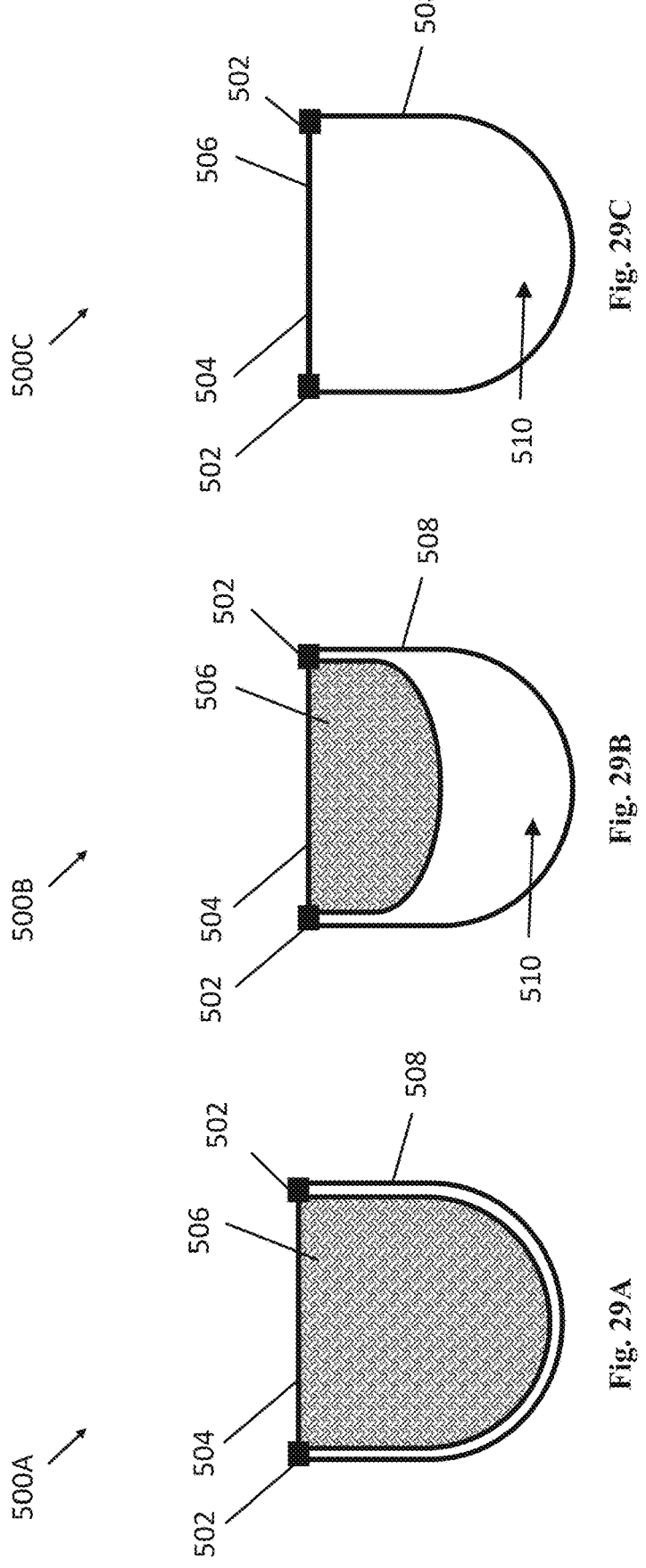

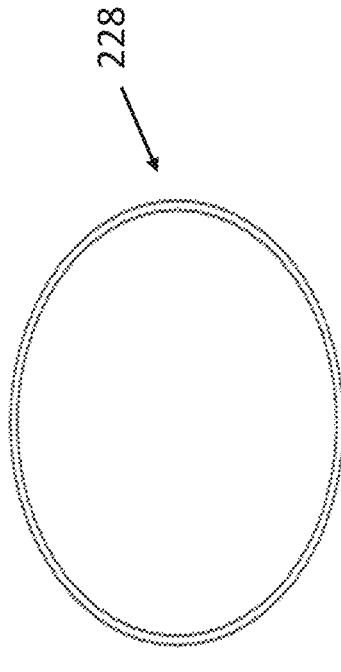
228
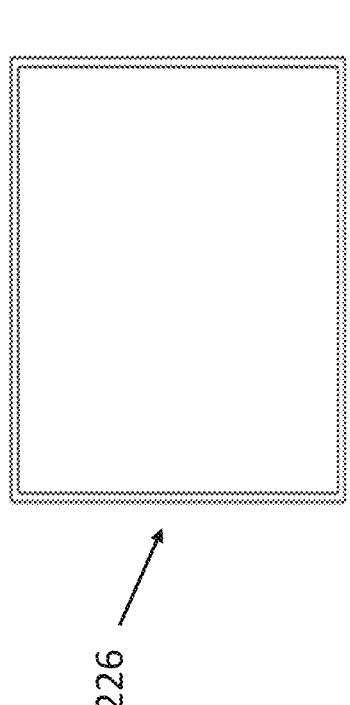
226
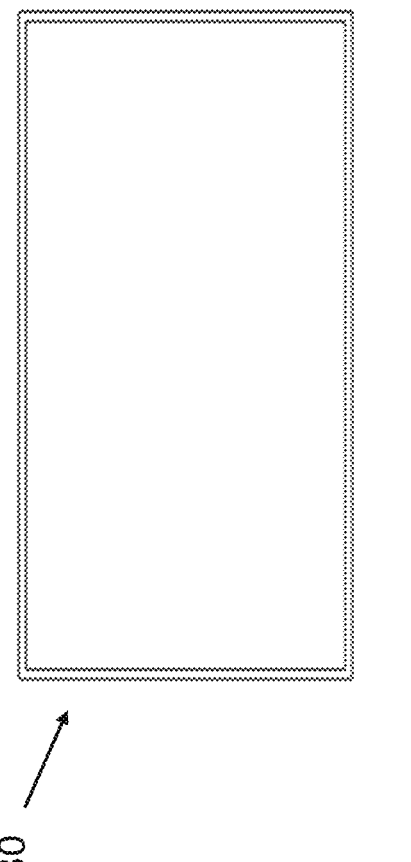
230
Fig. 31

| Temperature [°F] | Temperature [°C] | Time [Minutes] |
|---|---|---|
| 120 | 48.9 | 27133.38 |
| 130 | 54.4 | 4526.12 |
| 140 | 60.0 | 755.00 |
| 150 | 65.6 | 125.94 |
| 160 | 71.1 | 21.01 |
| 170 | 76.7 | 3.50 |
| 175 | 79.4 | 1.43 |
| 180 | 82.2 | 0.58 |
| 190 | 87.8 | 0.10 |
| 200 | 93.3 | 0.02 |
| 210 | 98.9 | 0.00 |

| Metal | Results [mg/kg] | EPA Limit [mg/kg] | NR 204 Limits [mg/kg] |
|---|---|---|---|
| Arsenic | 13.0 | 41 | 41 |
| Cadmium | <0.17 | 39 | 39 |
| Copper | 320 | 1500 | 1500 |
| Lead | 9.3 | 300 | 300 |
| Molybdenum | 7.7 | - | - |
| Nickel | 21.6 | 420 | 420 |
| Selenium | <5.1 | 100 | 100 |
| Zinc | 259 | 2800 | 2800 |
| Mercury | 19 | 17 | 17 |
| Potassium | <170 | - | - |

| Treatment | Rate [lb/hr] | Moisture [%] | Water removal [gal/hr] | Moisture Reduction [%] |
|---|---|---|---|---|
| From Centrifuge | 1872 | 80 | - | - |
| IR* | 1782 | 75 | 10.8 | 5 |
| Microwave | 1710 | 71 | 19.5 | 9 |
| IR & Microwave | 1584 | 65 | 34.5 | 15 |

MICROWAVE WASTE HEATING SYSTEM AND RELATED FEATURES

BACKGROUND

Microwave energy can be radiated within an enclosure to process materials. Molecular agitation within the material resulting from its exposure to microwave energy provides energy to heat or dry the material. Heating the material using microwave energy can take a certain amount of time based on the quantity, chemical composition of material, moisture content, a desired final heating temperature, and other factors specific to the intended use of the material in its finally processed form.

There also exist challenges related to mobile deployment of heating systems, particularly in areas where a reliable permanent power source may not be present.

Some government agencies allocate frequency bands centered at 915 MHz and 2450 MHz for use in microwave heating systems. The intensity of the microwave energy that is permitted to leak is sometimes restricted to less than 10 milliwatts (mW) per centimeter squared.

Many industrial microwave heating applications require that there be access apertures into the enclosure so that materials may be continuously transported utilizing such as, for example, a conveyor unit or other mechanism. There is a desire for suppression of microwave energy from these apertures. Continuous microwave heating arrangements have presented a problem that is more complex than the suppression of microwave energy from a simpler batch microwave system.

While applying microwave heating to moisture-containing particles, a problem can include preventing microwaves from escaping to an inlet and/or an outlet/discharge region from a channel or region where the microwaves are applied. This can be handled at present by introducing material through a metal grate including two by two inch (5.08 by 5.08 centimeter) square metal channels. The same type of grate and channels can be employed on an outlet end. However, these grates have limitations. For example, granular materials or particles (such as moisture-laden granular materials) are sometimes introduced through a square channel system. In these systems, a blockage or slowdown in the process can occur. In some cases, waste, such as human municipal waste or fecal sewage, can be heated to a certain temperature and/or for a certain amount of time for treatment. After being treated, such waste can be reused for various purposes.

Other technological approaches are currently used to prevent potential harmful effects of microwave emissions, but can be less flexible than desirable. For example, other ways of suppressing microwave energy from escaping a microwave system as a material is moving through can include, for example, water jackets or reflectors.

There remains a desire to improve microwave suppression, especially in continuous microwave heating systems. There also remains a desire to provide modular and/or portable heating systems that can be flexibly deployed as needed.

SUMMARY

Embodiments of the present disclosure relates to a continuous heating system for treating various forms of waste. In particular, this disclosure relates to a continuous system for using a microwave heating process at the point of treatment or processing, such as a municipal waste or sewage treatment facility. The systems disclosed herein can be used in any suitable location, and can be stationary/permanent or mobile in various embodiments. Also disclosed and contemplated are batch-type heating systems for processing and treating waste material.

According to the present disclosure, modular heating systems can be configured to include sequentially arranged, multiple conveyor units, mixers, and/or lifting units. Further arrangements provide at least partially parallel arrangements of multiple conveyor units, optionally in combination with sequential arrangements. Disclosed embodiments are fully scalable according to particular desired waste heating and treatment requirements and specifications, such as of the U.S. Environmental Protection Agency (EPA), or other regulatory agencies of various U.S. state, county, city, or municipal governments.

Also disclosed are embodiments of a microwave energy suppression tunnel with one or more flexible or bendable microwave reflecting components, such as mesh flaps, for substantially reducing or preventing the leakage of microwave energy from a microwave vessel, e.g., on a conveyor unit, while having a continuous flow of product or material through the vessel and suppression tunnels. The suppression tunnels, including flexible or bendable microwave reflecting components, can be installed at an inlet or an outlet of the vessel and are sized to suppress leakage of the microwaves produced by the microwave system while allowing continuous flow of material regardless of material size.

Stated differently, embodiments of the invention include the addition of at least one microwave energy suppression tunnel configured for substantially preventing the leakage of microwave energy from one or more access openings in a microwave energized system while the product to be heated is flowing continuously through the microwave vessel, including, for example, a trough of a conveyor unit also fitted with a helical auger. The suppression tunnel can be used at inlets and/or outlets of the microwave energized system, and in some examples each suppression tunnel includes a rectangular, U-shaped, or other suitably shaped tunnel about three feet or more in length installed flat or at an angle of preferably no more than about 45 degrees with multiple plies or layers of steel or other microwave compatible material, such as metallic shielding mesh attached to the inner top of the rectangular or U-shaped tunnel or trough. The size and desired throughput of waste materials to be heated can be used as a guideline for adjusting tunnel or trough size for various embodiments. The tunnel and trough of the heating system can be sized and shaped differently in various embodiments.

Flexible or bendable mesh shielding (e.g., in the form of flaps) can be spaced at various intervals and be the same cross-sectional size as the tunnel in which they are mounted. The shielding mesh preferably operates to absorb, deflect, or block various frequency ranges, preferably from about 1 MHz to 50 GHz in radio frequency (RF) and low frequency (LF) electric fields.

According to a first embodiment of the present disclosure, a system for processing waste material is disclosed. According to the first embodiment, the system includes at least one microwave generator. The system also includes at least one microwave guide operatively connecting the at least one microwave generator to at least a first conveyor unit. According to the first embodiment, the first conveyor unit is provided in a first housing that includes at least one opening configured to receive microwave energy via a first microwave guide. According to the first embodiment, the first conveyor unit is configured to receive and process a quantity of waste material, which includes heating the waste material to a first temperature by applying microwave energy to the waste material within the first housing.

According to a second embodiment of the present disclosure, a method of processing waste material is disclosed. According to the second embodiment, the method includes receiving a quantity of waste material at a first conveyor unit provided in a first housing. The method also includes performing a first processing step to the quantity of waste material within the first conveyor unit using at least one microwave generator coupled to the housing of the first conveyor unit, wherein the waste material is heated within the first conveyor unit.

According to a third embodiment of the present disclosure, a method for portably providing waste material processing upon demand is disclosed. According to the third embodiment, the method includes receiving a request for processing a first quantity of waste material at a first location. The method also includes determining that the first location has a first group of characteristics that include at least a distance from the first location to an external power source of a first power output. The method also includes deploying a portable system for processing waste material at the first location based on at least the first quantity of waste material and the first group of characteristics. According to the third embodiment, the portable system includes at least one power generator configured to provide at least the first power output. The portable system also includes at least one microwave generator operatively coupled to the power generator. The portable system also includes at least one conveyor unit configured to receive and process a quantity of waste material to achieve at least a target temperature for a target time. The method also includes applying microwave energy to the waste material within the conveyor unit of the portable system.

According to a fourth embodiment of the present disclosure, a microwave suppression system is disclosed. According to the fourth embodiment, the system includes at least an inlet and an outlet. The system also includes a tunnel within at least one of the inlet and outlet that includes at least one movable mesh flap within the tunnel. According to the fourth embodiment, the at least one movable mesh flap is configured to absorb, deflect, or block microwave energy, where the at least one movable mesh flap is configured to be deflected as a waste material passes through the tunnel and then to return to a resting, closed position when the waste material is no longer passing through the tunnel.

According to a fifth embodiment, an apparatus for treating waste material is disclosed. According to the fifth embodiment, the apparatus includes a conveyor unit including a helical auger having an auger shaft provided along an auger rotational axis, the auger configured to rotate in a direction such that a quantity of waste material received at the conveyor unit is caused to be transported according the auger rotational axis. The apparatus also includes at least one microwave energy generator, each microwave energy generator being operatively connected to a respective microwave guide configured to cause microwaves emitted by the microwave energy generator to heat the waste material within the conveyor unit by converting the microwaves to heat when absorbed by at least a portion of the quantity of waste material within the conveyor unit. Also according to the fifth embodiment, the quantity of waste material is heated using the microwave energy, and wherein the quantity of waste material is caused to exit the conveyor unit after being heated according to a target specification.

According to a sixth embodiment of the present disclosure, a method of treating waste material using microwave energy is disclosed. According to the sixth embodiment, the method includes receiving a quantity of waste material at a conveyor unit including an auger, wherein the waste material passes through at an inlet microwave suppression tunnel before entering the conveyor unit. The method also includes transporting the quantity of waste material along the conveyor unit by causing the auger to rotate. The method also includes heating the quantity of waste material within the conveyor unit using at least one microwave generator operatively connected to a respective microwave guide configured to cause microwaves emitted by the microwave energy generator to heat the quantity of waste material within the conveyor unit by converting the microwaves to heat when absorbed by at least a portion of the quantity of waste material within the conveyor unit. The method also includes causing the heated quantity of waste material to exit the conveyor unit through an outlet microwave suppression tunnel, wherein the quantity of waste material that exits the conveyor unit is a reusable product.

According to a seventh embodiment of the present disclosure, a method for sharing portable waste material processing is disclosed. According to the seventh embodiment, the method includes receiving a request for processing a first quantity of waste material at a first location and a second location separate from the first location. The method also includes determining that the first location has a first group of characteristics. The method also includes determining that the second location has a second group of characteristics. The method also includes deploying a portable system for processing waste material at the first location or the second location based on at least the first quantity of waste material and the first group of characteristics or the second quantity of waste material and the second group of characteristics. According to the seventh embodiment, the portable system includes at least one power generator configured to provide at least the first power output. The portable system also includes at least one microwave generator operatively coupled to the power generator. The portable system also includes at least one conveyor unit configured to receive and process a quantity of waste material to achieve at least a target temperature for a target time. The method also includes applying microwave energy to the first or second quantity waste material within the conveyor unit of the portable system.

DESCRIPTION OF THE DRAWINGS

FIG. 29A is a cross-sectional end view of a U-shaped microwave suppression tunnel configuration with a top-mounted pivoting mesh flap in a closed position.

FIG. 29B is a cross-sectional end view of the U-shaped microwave suppression tunnel configuration of FIG. 29A with the mesh flap in a partially open position.

FIG. 29C is a cross-sectional end view of the U-shaped microwave suppression tunnel configuration of FIG. 29A with the mesh flap in a fully open position.

FIG. 31 shows various alternative cross-sectional shapes of a microwave suppression tunnel.

FIG. 38 is a transmission damping chart of the shielding mesh of FIG. 36.

FIG. 40 is a time and temperature table relating to test results of heating waste using microwaves, according to various embodiments.

FIG. 41 is a results and limits table relating to test results of heating waste using microwaves, according to various embodiments.

FIG. 42 is a moisture reduction table relating to test results of heating waste using microwaves, according to various embodiments.

DETAILED DESCRIPTION

Figure 1:
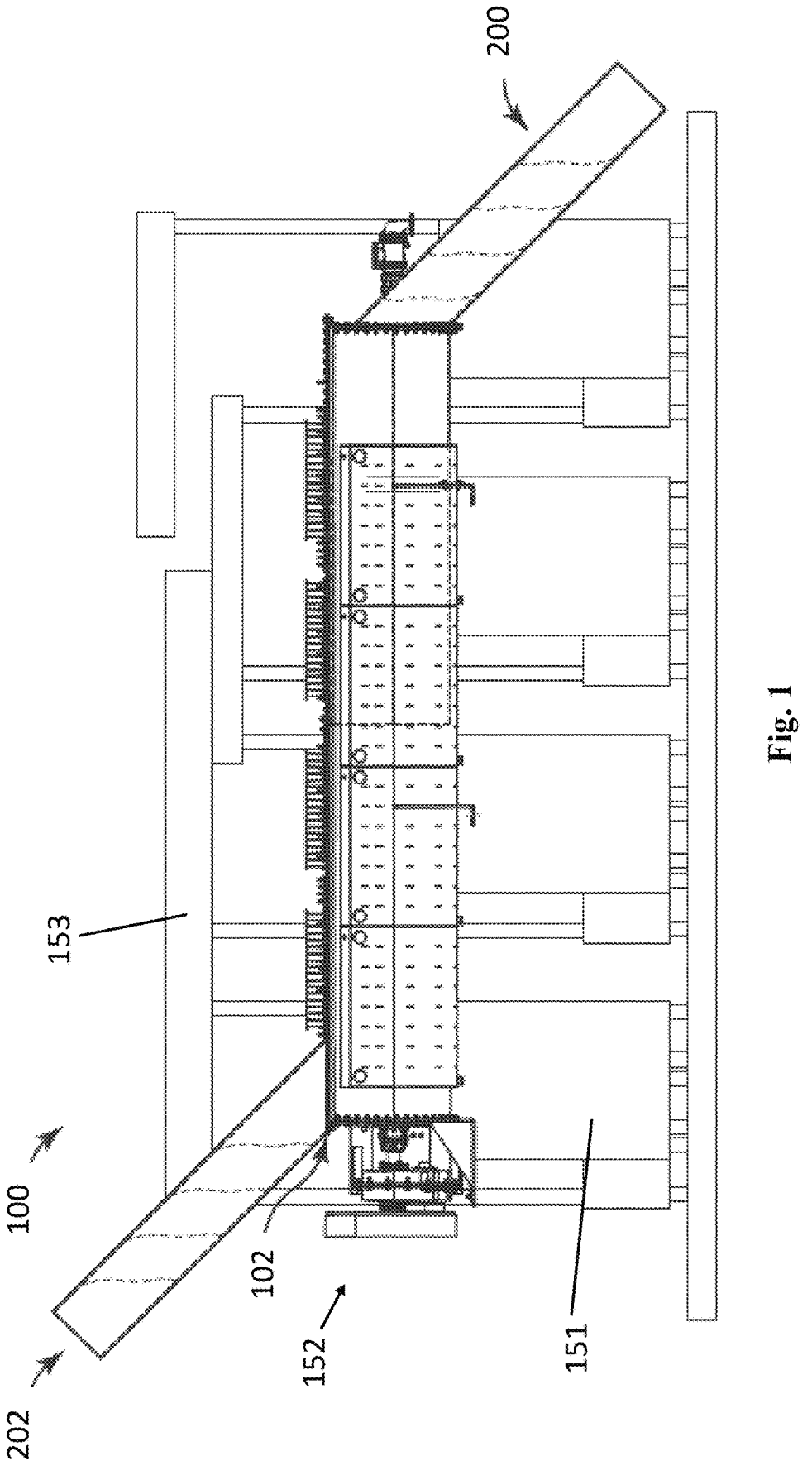
FIG. 1 is a side view of a continuous waste processing system, according to various embodiments.
Figure 2:
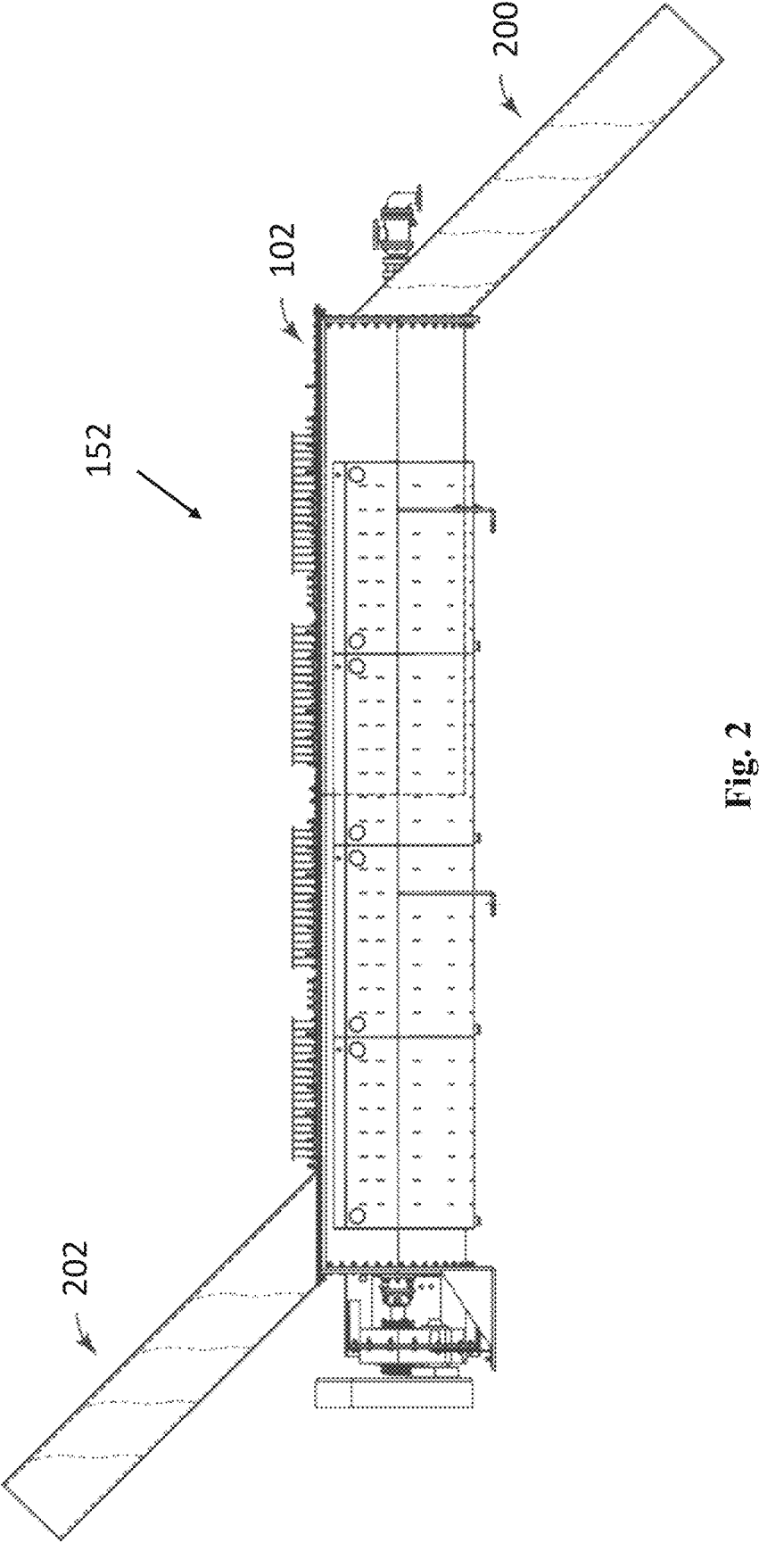
FIG. 2 is a side view of trough and suppression tunnel components of the continuous treatment system of FIG. 1

According to the present disclosure, a problem currently exists in the art relating to treating and processing waste material by heating the waste material (or related or derived composition) to a desired temperature using microwave energy while continuously moving the waste material during heating. For example, a waste material to be heated is heated to a point such that all, substantially all, or a substantial percentage of pathogens within received waste material are exterminated by heating to a certain temperature for a certain amount of time. A waste material can include some waste or be entirely composed of waste. Certain configurations use a "batch" style heating and processing system. In batch systems, a quantity of material is heated and/or mixed together as a single stage and then is dispensed. It is often desirable to have more flexibility than a batch-style heating system affords because flexible operation of the heating and/or mixing system is preferred. Therefore, continuous type heating and/or mixing systems can be preferable because they can provide greater efficiency, control, and flexible scalability and operation, among other benefits. Also disclosed and contemplated are batch-type systems for heating waste material.

Other challenges also exist in the art relating to microwave emissions escaping a heating system. In a continuous production system, microwave energy leakage can be particularly undesirable and challenging.

Another common complication in the art relates to rapid distribution and deployment of heating apparatuses to remote or non-grid-connected regions or situations. Microwave-based heating is generally more portable than other types of heating apparatuses and allows for portable generator use to power the microwave heating units (e.g., microwave generators) and system if mains or grid power is not readily accessible. Some examples of situations where grid power is not available include rural or remote areas, or other areas that have temporarily lost a grid power connection.

According to the present disclosure, portable, modular, parallel, and/or sequential heating and/or processing conveyor units can provide a modular, scalable, and portable system for heating a waste material even in remote, or otherwise off-grid locations. Sharing of waste material processing systems between multiple locations and/or facilities is also contemplated. A portable system can require little or no assembly to reach operability once transported to a site for treating waste. Stationary, semi-permanent, and permanent embodiments are also contemplated. Primarily stationary systems can nevertheless be transported, e.g., in components or parts, to various locations for final assembly.

Various mixers and/or lifting conveyors can be used in-line with the conveyor units as suitable. Packaging various operative components within or attached to containers or other housings, such as shipping containers, can further simplify and streamline rapid and simple distribution, setup, and operation for portability when utilized. Portable waste processing systems disclosed herein can be integrated, attached, or otherwise associated with any of various trailers, trucks, machinery, trains, and the like.

Also according to the present disclosure, various microwave suppression systems and features, such as included in or related to inlet/outlet tunnels can be sized to accommodate the size of the flow of whatever waste material is being heated and/or processed, such as various types and sources of waste materials and the like. In some cases, a microwave heating system of the present disclosure can be configured to process/heat about 100 tons of waste per hour or more according to various specifications and standards, although it would be obvious to one skilled in the art that the process could be scaled to accommodate quantities of less than 100 tons of material per hour and reach target specifications. For example, certain types of waste material can include a greater amount of moisture than other types of material. For example, waste material can include about 30-90% water content depending on various pre-processing used by a treatment facility or the like. A rated capacity of a system can be configured based on an end goal of a particular facility and/or municipality. For instance, one goal may be to kill pathogens found in waste material. In this case, the waste material may be heated to reach about 180° F. for approximately 1-10 seconds. These specifications may therefore require less energy and allow for higher throughput than certain other specifications. However, if it is desired to reduce moisture in waste material being processed to 10-15% (e.g., in preparation for re-sale), the energy required would increase because of the heat of vaporization for water. End throughput and configuration can be determined based on end goals of a user.

One or more microwave suppression systems (e.g., tunnels or chutes) including one or more (e.g., flexible and/or movable) fabric and/or mesh flaps can be used at one or more openings within a microwave-based heating system in order to reduce microwave emissions that would otherwise reach the outside of the heating system. Each microwave suppression system can include a flap or series of flaps that are capable of and configured to cover one or more inlets and/or exits from a microwave heating system. Flexible or bendable mesh shielding (e.g., in the form of flaps) can be spaced at, for example, about six-inch (15.2 cm) intervals and the flaps be the same cross-sectional size as the tunnel in which they are mounted. The microwave suppression systems can prevent or suppress the escape of microwave emissions from the waste heating system. Therefore, one or more of the fabric and/or mesh flaps can be positioned at outlets and/or inlets of the continuous microwave waste heating system. Each flap can be generally shaped to conform to a shape of a corresponding suppression tunnel, chute, component thereof, or the like. Outlets and/or inlets of the continuous microwave heating system can include one or more suppression tunnels. In particular, moisture-laden material, waste, or other component particles or material can be allowed to enter into the heating region of microwave heating while microwaves are simultaneously substantially prevented from escaping a heating trough via the suppression tunnels within the system. As multiple modular heating and processing conveyors can be arranged sequentially and/or in parallel, various material inlets and outlets are particularly suitable for microwave suppression systems, including tunnels and other related features. In preferable embodiments, separate suppression systems such as tunnels are supplied and connected to both an inlet and an outlet of a system. In other embodiments, additional suppression tunnels or related features can be included intermediately within a waste material flow path or otherwise to the system such that more than two such suppression systems are included in order to maximize microwave suppression from any number of openings in the system.

It is known that microwave energy is particularly efficient for heating water (e.g., water molecules), which leads to efficient microwave heating of materials that include at least some of such water molecules. Waste in some embodiments disclosed herein can contain about 80% water, although embodiments containing less than 80% or more than 80% water are also contemplated herein. Water can escape a material in the gaseous form of steam when the water is heated to its boiling point (e.g., about 212 degrees Fahrenheit (° F.) or 100° C.). Steam can escape from a heating system through natural ventilation, and in some cases by forced ventilation, through positive or negative pressure applied to the system (e.g., an air blower or fan to expedite or assist ventilation). Vents can also be added to improve ventilation and facilitate steam escape characteristics. Excessive quantities of water can have a negative effect on heating waste or other materials. Furthermore, heat exchangers can be used to reclaim heat released as steam (or otherwise) during microwave heating processes, and in particular heat that is emitted from the phase change (e.g., boiling) of water when the material containing at least some water is heated.

In some typical cases, waste can be about 5-90%, or in some cases about 50-80% water content by weight, or any other percentage according to each situation.

Heating a quantity of waste material to a temperature above the boiling point of water (about 212° F. or 100° C.) can therefore be less efficient because the water particles boil off and escape as steam. During heating organic or inorganic waste materials to certain temperatures, e.g., at or above a boiling point of water, the number of small dipole molecules (e.g., water) that the microwaves can easily heat through oscillation can decrease. Heating of the waste material then becomes reliant on the microwaves oscillation larger particles which may require more energy. If the waste material being heated is for example, municipal waste, more water is removed from the heated waste material as heating temperature increases. A phase change of liquid water to gaseous steam can occur around 180-212° F. (82-100° C.) depending on air pressure or vacuum, and it can be desirable to heat a material, e.g., a waste material, to about 180-212° F. (82-100° C.) or even to about 225-275° F. (107-135° C.), according to various embodiments. A target heating temperature can be determined based on various goals or targets according to a particular situation and/or need. In some cases, a target temperature of about 180° F. (82° C.) can be sufficient for elimination of pathogens. Where a goal is overall volume reduction and/or water removal, a target temperature can be about 212° F. (100° C.). Steam that is produced from the heating can escape the heating system via vents once the phase change occurs. According to various embodiments contemplated herein, steam and/or other heat produced and/or emitted during microwave heating can be captured for re-use using one or more air-air, and air-liquid heat exchangers or the like. The steam can exit the system by natural and/or forced ventilation. In some cases, there may be least waste emissions below about 160° F. (71° C.), or at a maximum below about 270-275° F. (132-135° C.). Waste emissions are dependent on final material temperature and water content and increase with percentage water and temperature. In some embodiments a scrubber system can be implemented that is configured to trap or scrub emitted steam, vapor, particulates, and/or odors that result from waste processing.

In some embodiments, one or more components of a waste processing system can be sealed and/or pressurized, e.g., in a pressurized heating vessel of a microwave waste processing system. Pressurization of system components can provide benefits, including containing any steam produced from water content of waste during microwave heating of the waste material and providing efficiencies by not discharging heated steam and resulting increased pressures. In yet further embodiments, heat conductivity of gaseous steam/water molecules provides increased heating efficiency during waste material processing described herein. In yet further embodiments, heated steam and/or heated waste material can be used with heat exchangers in order to transfer thermal energy from a position to another position, or the like.

According to various embodiments the material to be heated and/or processed is a waste material or other material. In certain embodiments the material can be various particles, such as particles to be heated. The material can be composed of various particulate materials.

The waste material, e.g., human fecal waste, biowaste, wastewater, or any other type of municipal, natural, commercial, or industrial waste, can have an initial, first maximum or average particle (or clump) size or viscosity. The initial, first particle or clump size or viscosity can be reduced to a second, smaller maximum or average particle or clump size or viscosity by a component or feature of at least one of the first and second conveyor units, such as a baffle as described herein, or any other suitable component for reducing particle or clump size or viscosity as known in the art, such as an impactor, shredder, mixer, mesh, brush, or the like. If present, the impactor, shredder, mixer, mesh, or brush can be separate from the first and second conveyor units. Torque load on a motor in a conveyor unit can be used as a proxy for viscosity and/or clumping of waste material being processed.

According to various embodiments, and as discussed above, the waste material typically contains at least some water. Optionally, the waste material contains less than ninety percent water by weight. In various further examples, the waste material contains at least five percent water by weight. In yet further examples, the waste material contains less than ten percent water by weight. In yet further examples, the waste material contains between twenty and ninety percent water by weight. In even yet further examples, the waste material contains between about fifty and ninety percent water by weight. As discussed herein, in at least some embodiments, one heat exchanger apparatus configured to recover a heat byproduct from the waste material. In some examples the heat byproduct is recovered from the steam resulting from a heating of the water within the waste material.

In some embodiments, one or more additives can be added to waste material to be heated and at various stages during processing. Various additives can provide a number of different qualities when added to material being processed. For example, additives can increase microwave energy absorption and efficiency during heating or can reduce odor or other waste emissions.

In some embodiments, a continuous microwave heating process can include ramp-up time, hold time, process time (e.g., based on time and temperature of processing), and various heating peaks. Mixing of waste materials of differing physical properties can improve performance during microwave heating, according to some embodiments.

A continuous microwave heating system can be sized in order to get a desired throughput and to accommodate the physical size of the waste material being heated. This can be due to limitations, such as with existing heating, mixing, and tunnel design in view of target treatment specifications as described herein. An example (e.g., steel) mesh or fabric flap design of a microwave outlet suppression tunnel 200 as shown in FIG. 1 (and as explained in greater detail below) is better suited for high-volume continuous flow of various sized and consistencies of waste materials. Microwave outlet suppression tunnel 200 is an example of a microwave suppression system as used herein. Also as shown in FIG. 1, multiple flaps can be used in a single microwave outlet suppression tunnel 200, e.g., four positioned sequentially as shown. Each flap is preferably shaped to conform to a shape of a corresponding outlet suppression tunnel 200, chute, or the like.

Drying, heating, sterilizing, and/or mixing (collectively "processing") of materials such as waste materials is contemplated herein. However, any one type of suitable material can be heated, such as any other waste that can be heated, and conveyed or flowed through a microwave heating system. For example, municipal waste in the form of household, commercial, industrial waste, or byproducts thereof, such as shredded or chipped used tires processing byproducts, or any other particulate waste materials can be heated and thereby sterilized and/or dried. Food products either before or after having been consumed by a human or animal can include plant-derived products, animal-derived products, sand, and the like can also be heated and dried. Additionally, sanitization, pasteurization, etc. of various waste materials is also contemplated. In fact, waste materials can be sanitized and heated such that the waste material becomes suitable for safe and beneficial re-used. Other applications of the microwave heating of waste are also contemplated. It may be desirable to substantially sterilize a waste material such that it can be adaptively reused as a product to be resold or otherwise used, such as fertilizer, etc.

Various embodiments of heating and/or processing systems discussed herein can have various total weight, and/or throughput capacities, depending on dimensions, power capacity, arrangements, and the like. In some embodiments, a continuous material processing system discussed herein has a capacity of about 10-1000 U.S. tons (9.1-907.2 metric tons) of waste material per hour. In further embodiments, the capacity can be between 50-100 U.S. tons (45.4-90.7 metric tons) of waste material per hour.

Figure 3:
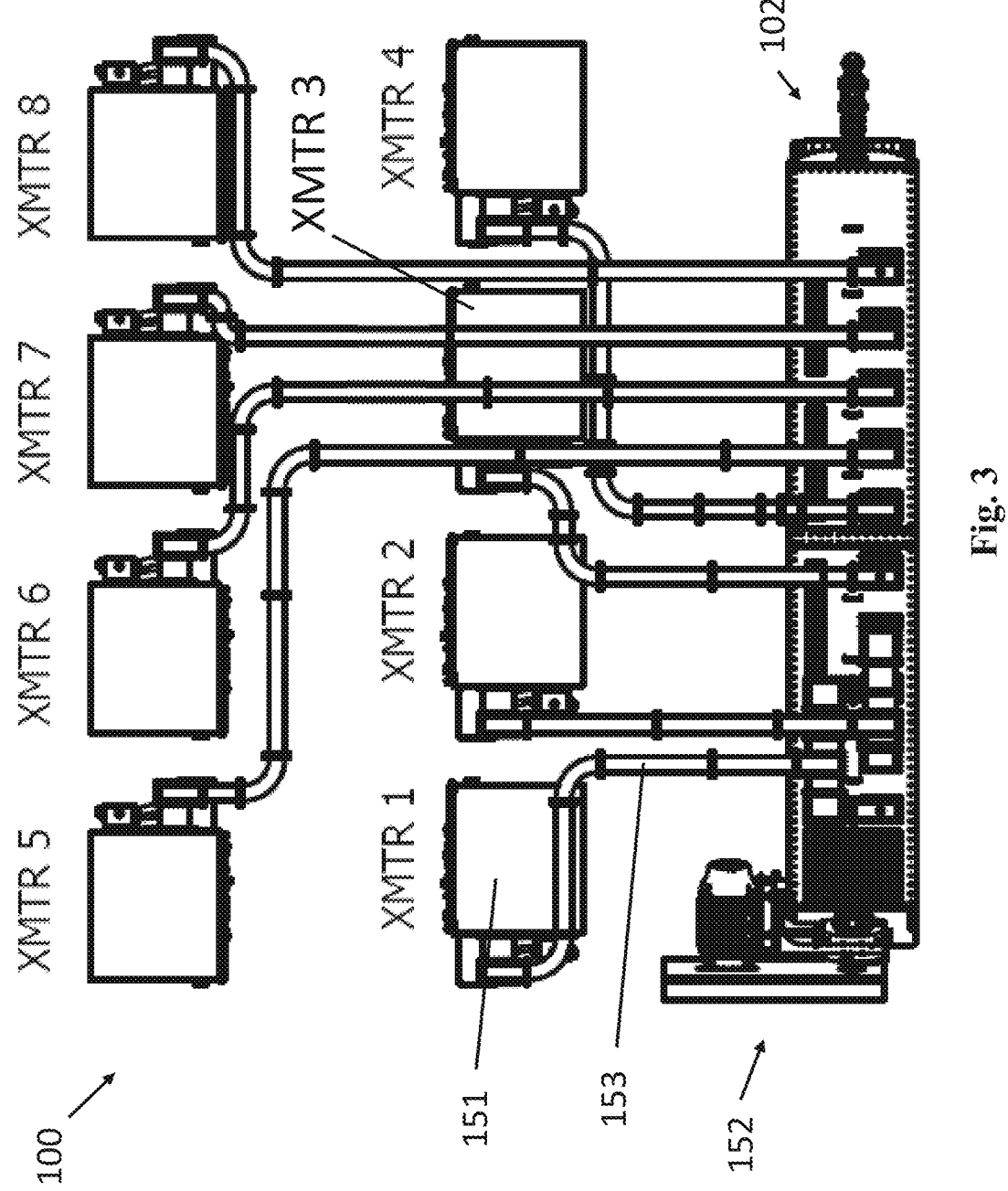
FIG. 3 is a top view of the continuous treatment system of FIG. 1.

FIGS. 1-9 illustrate an embodiment of a continuous (e.g., waste) waste processing (or treatment) system 100 having a housing, vessel, or trough 102 (as shown in FIGS. 1-5) (or alternative trough 104 as shown in FIGS. 6-9) including a microwave heated apparatus with one or more microwave heating units 151 each with at least a corresponding waveguide 153 to define a guide path for microwaves (see e.g., FIGS. 1 and 3). In various embodiments, the waste processing system 100 can be portable. The continuous treatment system 100 also preferably includes at least an outlet suppression tunnel 200, as shown. As shown, the continuous treatment system 100 also includes a housing including a trough 102 including one or more microwave heating units 151, a conveyor system such as including an auger 106, an inlet suppression tunnel 202, and the outlet suppression tunnel 200. Examples of these components are described in greater detail herein.

According to FIGS. 1-9 a single conveyor unit continuous heating and/or processing system 100 is shown, although in various embodiments herein (e.g., FIGS. 10, 11, and 14) it is also shown that multiple conveyor units can be assembled sequentially. Conveyor units can therefore be assembled sequentially, but also in parallel, or both in order to achieve a desired throughput for a given conveyor unit size and/or heating capacity; or in order to achieve a desired heating capacity and throughput for a production rate needed to fulfill specification and standards requirements for heating a waste material. Therefore, arrangements and the like can be adjusted for a given conveyor unit specification by introducing multiples of the conveyor unit and/or arrangements thereof. For example, running two conveyor units in parallel can offer twice the heating capacity and/or throughput of processed material compared to a single conveyor unit, provided suitable microwave heating units are provided.

Figure 4:
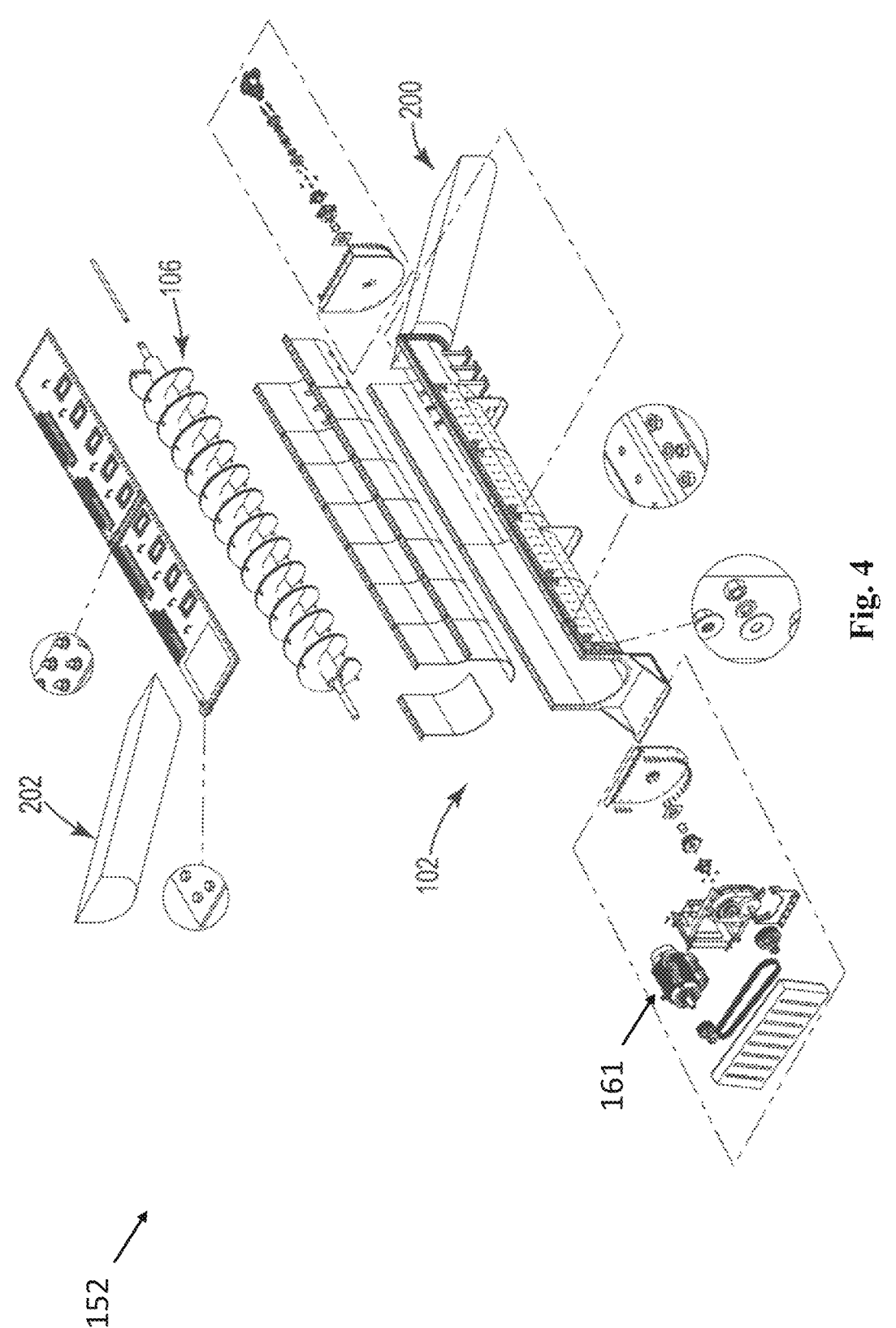
FIG. 4 is a perspective exploded view of the trough of the continuous treatment system of FIG. 1.
Figure 6:
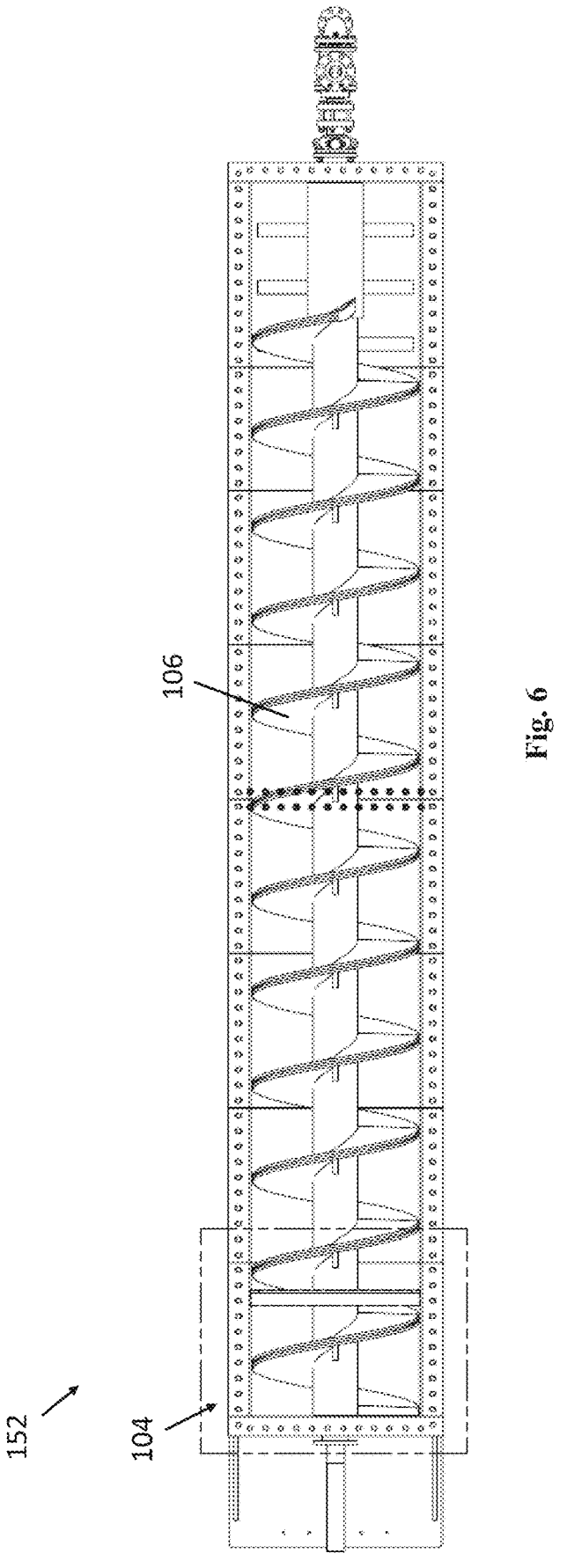
FIG. 6 is a top view of an auger for use with the trough of the continuous treatment system of FIG. 1.
Figure 8:
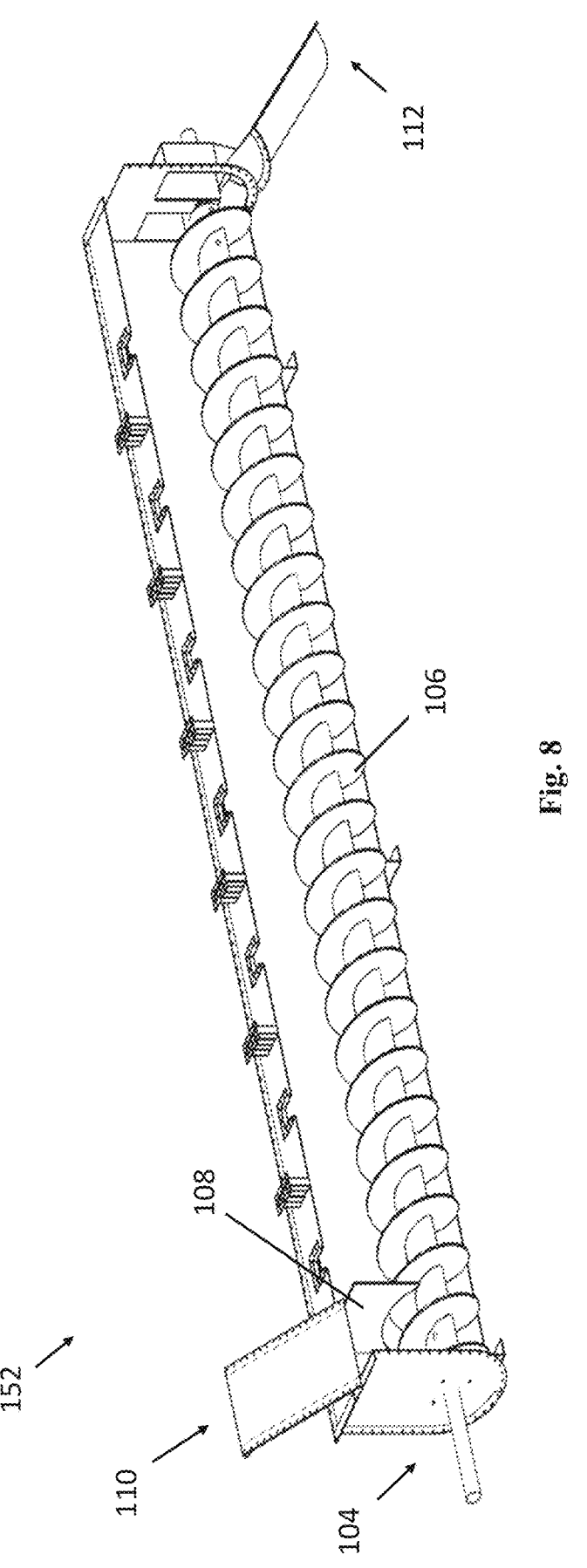
FIG. 8 is a partial cut-away view of the alternative trough of FIG. 7.

Shown best in FIGS. 4, 6, and 8, a helical auger 106 or (e.g., a helical screw) is one option for a conveyance mechanism by which material particles can be caused to pass through the housing trough 102 longitudinally. The auger 106 can be completely or partially covered in particles (e.g., waste or any other form of material) to be heated during operation, but the particles are not shown for clarity. The auger 106 can be a heated auger, and in some examples can be a jacketed auger (e.g., where an auger has a hollow flighting that heating fluid is run through as desired). The outlet suppression tunnel 200 can be connected to an outlet and/or inlet of trough 102. The trough 102 can be level or can be canted at an angle to the horizontal plane according to various embodiments. An angled trough 102 (and/or auger 106 in some embodiments) can facilitate movement of the material during processing by utilizing gravity assistance to flow downhill. An example trough 102 can be about twelve feet long and five feet wide, although any suitable size and/or shape is also contemplated.

FIGS. 2-9 show various components of the trough 102, auger 106, inlet suppression tunnel 202, outlet suppression tunnel 200, and other components of the system 100 in greater detail. Selected embodiments and variations of the inlet suppression tunnel 202 and the outlet suppression tunnel 200 and components thereof are shown in yet greater detail with respect to FIGS. 16-31. Furthermore, various embodiments of multiple-conveyor microwave-based waste heating systems are shown with reference to FIGS. 10-15.

FIG. 3 shows a general configuration of a single-conveyor unit 152, continuous heating system 100 of the present description, including eight microwave heating units 151, a microwave waveguide 153 for each heating unit 151, an auger-based continuous heating assembly with trough 102, and various other components. In particular, FIG. 3 shows an example including eight microwave heating units 151 labeled as XMTR 1, XMTR 2, XMTR 3, XMTR 4, XMTR 5, XMTR 6, XMTR 7, and XMTR 8. More or fewer microwave heating units 151 (and corresponding waveguides 153) can be used in alternative embodiments. A number of waveguides 153 and therefore microwave generators 151 used with a trough 102 can be limited by a surface area on top (or other side) of the trough 102, including any vents, inlets, and/or outlets included thereon. In some examples 1-30 waveguides 153 can be utilized for each conveyor unit, and in more specific embodiments 7-10 waveguides can be utilized for each conveyor unit.

One example microwave heating unit 151 can be a microwave power system sourced from Thermax Thermatron. The microwave heating units 151 can have a variety of shapes and sizes according to the requirements of the continuous heating process and system 100. Each microwave heating unit can apply about 100 kW of power to the waste material being heated and preferably operates at about 915 MHz.

In various examples, various quantities of microwave energy can be received by the waste material while in a conveyor unit.

Various conveyor units described herein (e.g., conveyor unit 152) can have a nominal weight capacity of about 500-40,000 lbs (500-18,144 kg). In some examples, the conveyor units can each have a weight capacity of about 8,500 lbs (3,856 kg) of waste material at a point in time.

Various example waveguide 153 configurations and embodiments for a single conveyor unit 152 are shown in FIGS. 1 and 3. The various waveguides 153 can be configured to bend and be routed such that no two waveguides 153 collide, and in some cases the waveguides can be configured to minimize turns or bends in the waveguides, as practical. Similar waveguide 153 configurations can be adapted for use with multiple-conveyor unit waste processing systems described below. Each microwave heating unit 151 can optionally be connected to more than one waveguide 153.

Still referring to FIG. 1, a side view of the continuous heating assembly is shown, including an example inlet suppression tunnel 202, outlet suppression tunnel 200, and trough 102 of system 100. Although not shown, the trough 102 can be generally mounted or positioned, or provided with a shape generally including an angle relative to horizontal to facilitate waste movement or production during heating and/or conveying material for processing described herein, e.g., by at least partially utilizing gravity to move the waste material through the trough 102. Non-stick coating can be applied to the trough 102, such as to an interior portion of the trough 102 such that waste material is less prone to stick and resist movement during processing.

FIG. 4 is an exploded view of system 100. Shown is a conveyor motor 161 for rotating the auger 106, the housing trough 102 for holding and carrying the waste material to be heated, the inlet suppression tunnel 202, the outlet suppression tunnel 200, and various other components. The conveyor motor 161 can be an electric, brushed or brushless, induction or permanent magnet, variable reluctance, etc. motor and can utilize alternating current (AC) or direct current (DC) power of any voltage or power as suitable. Any other suitable type of motor, including an internal combustion engine or gas turbine, can also be implemented. In particular, FIG. 4 provides a more detailed view of system 100, including the trough 102, auger 106, inlet suppression tunnel 202, outlet suppression tunnel 200, and related components.

Figure 5:
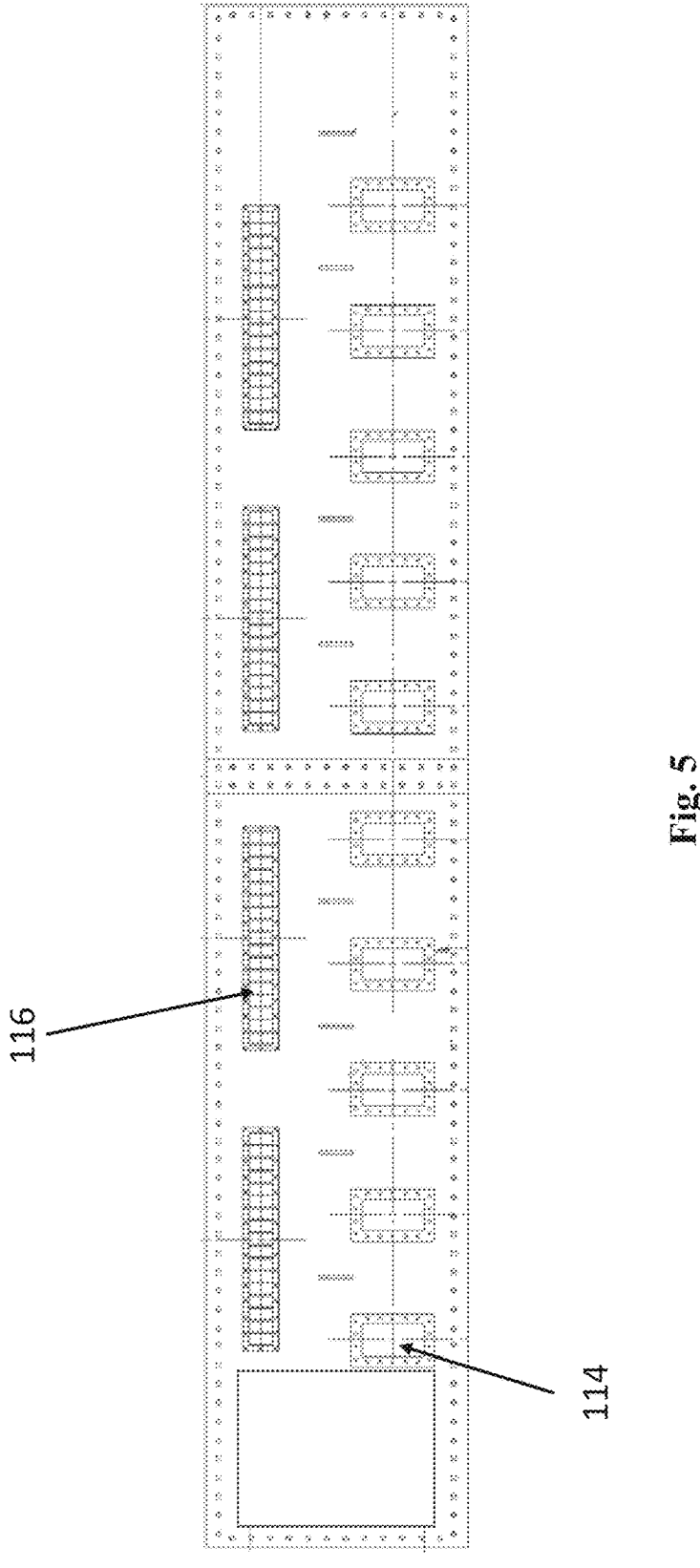
FIG. 5 is a top view of the trough of the continuous treatment system of FIG. 1.
Figure 7:
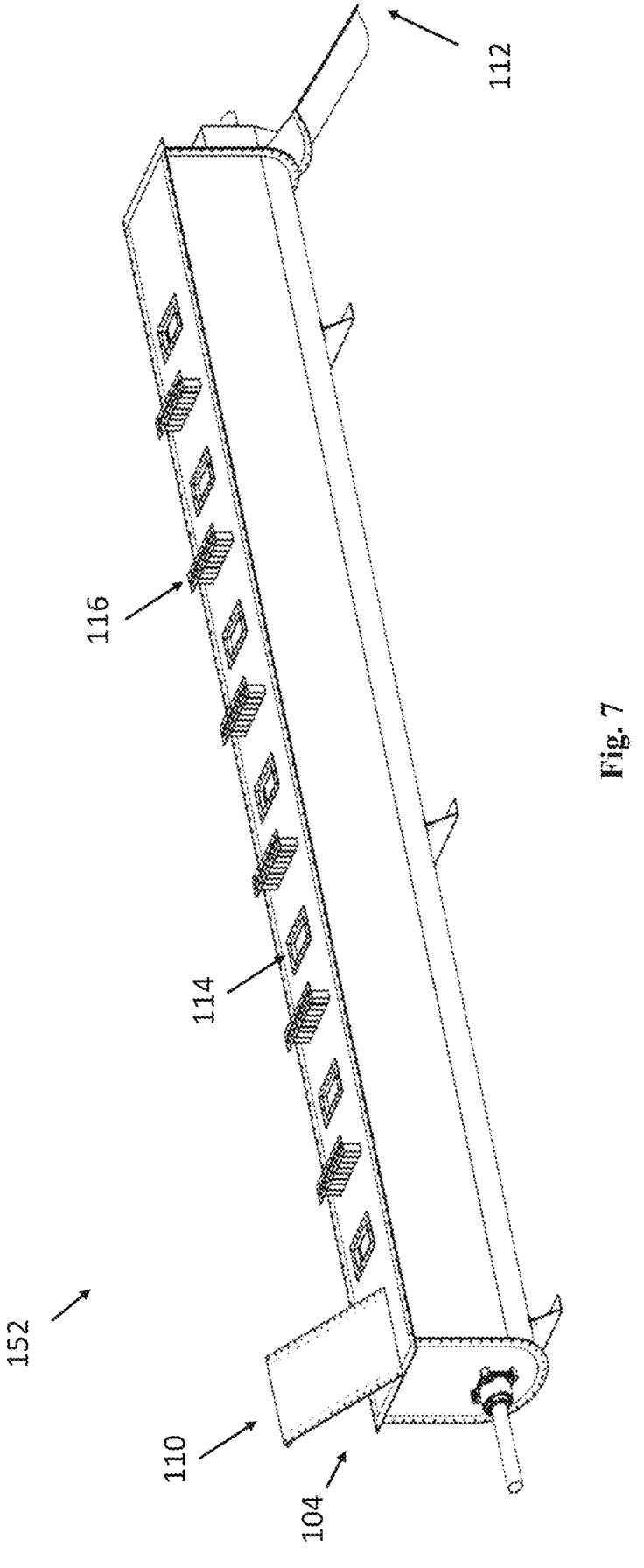
FIG. 7 is a perspective view of an alternative trough for use with the continuous treatment system of FIG. 1
Figure 9:
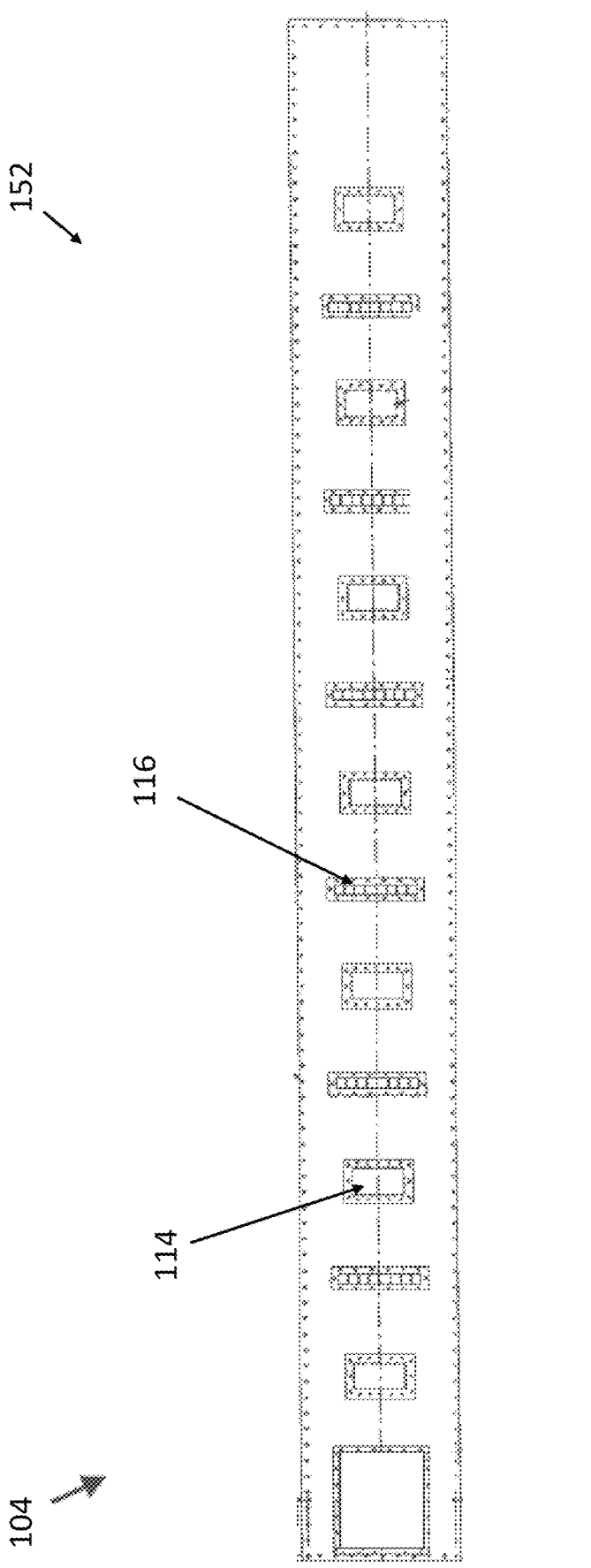
FIG. 9 is a top view of the alternative trough of FIG. 7.

Various example entry points for microwaves via the multiple waveguides 153 in a top of trough 102 are shown in FIG. 5. FIG. 9 shows alternative example entry points in a top of the alternative trough 104. Various other arrangements and configurations of troughs, conveyor units, and/or systems are also contemplated herein. Waveguides 153 are also referred to as microwave guides or simply guides, herein. As shown in FIGS. 7 and 8, the alternative trough 104 can include a material inlet 110 and a material outlet 112. One or both of inlet 110 and outlet 112 can include a microwave suppression tunnel and/or features thereof as described herein.

In the conveyor unit 152 configuration of FIG. 6, the example, alternative trough 104 (or housing) of the continuous heating assembly that includes the auger 106. The auger 106 can optionally be heated and used to cause waste material to be heated using liquid and/or microwave heating to be moved longitudinally along the trough 102 of the conveyor unit 152 during material heating, processing, or production. The auger 106 can also be caused to rotate directly or indirectly by the conveyor motor 161 (see, e.g., FIG. 4) (or alternatively, an engine or the like), according to various embodiments. Furthermore, the auger 106 can be caused by the conveyor motor 161 to rotate the auger 106 more slowly or more quickly according to various parameters, which can be based on need or usage, such as target temperature, microwave heating power, and the like. Various controllers can be programmed to rotate the auger 106 according to various set points, parameters, variables, and the like. The motor 161 can have a power rating of 50-150 kW, 70-130 kW, 80-110 kW, or 90-100 kW in various embodiments. Embodiments with the motor having a power rating below 50 kW or above 150 kW are also contemplated.

As shown the auger 106 can be helical, and in some embodiments the auger 106 can be single helical or double helical, among other variations. In yet further variations, a single trough 104 can comprise two separate augers 106, which can be counter-rotating or otherwise (not shown). As shown, a fluid connection can be attached to one or more ends of the auger 106, which can be used for additional auger-based heating or cooling of waste material being produced.

FIGS. 7-9 show various views of the alternative configuration 104, where various apertures within the alternative trough 104 cover are instead positioned in alternative locations as compared to trough 102. More specifically, the microwave inlets 114 and vents 116 are generally placed in line as shown with trough 104. Various embodiments that utilize trough 104 can be similar to embodiments that utilize trough 102, and various other configurations are also contemplated herein.

Figure 10:
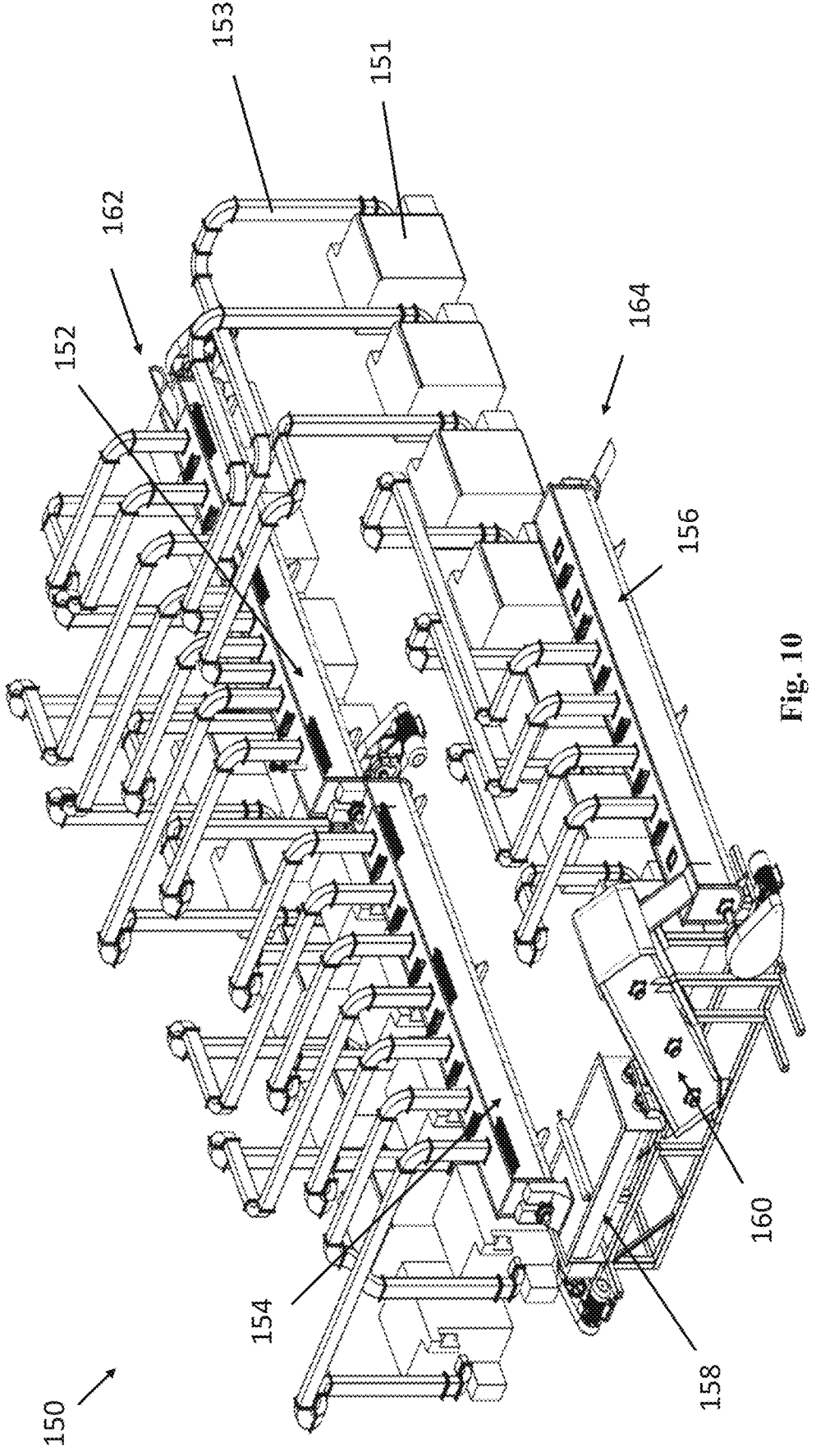
FIG. 10 is a perspective view of a multi-conveyor continuous treatment system, according to various embodiments.
Figure 11:
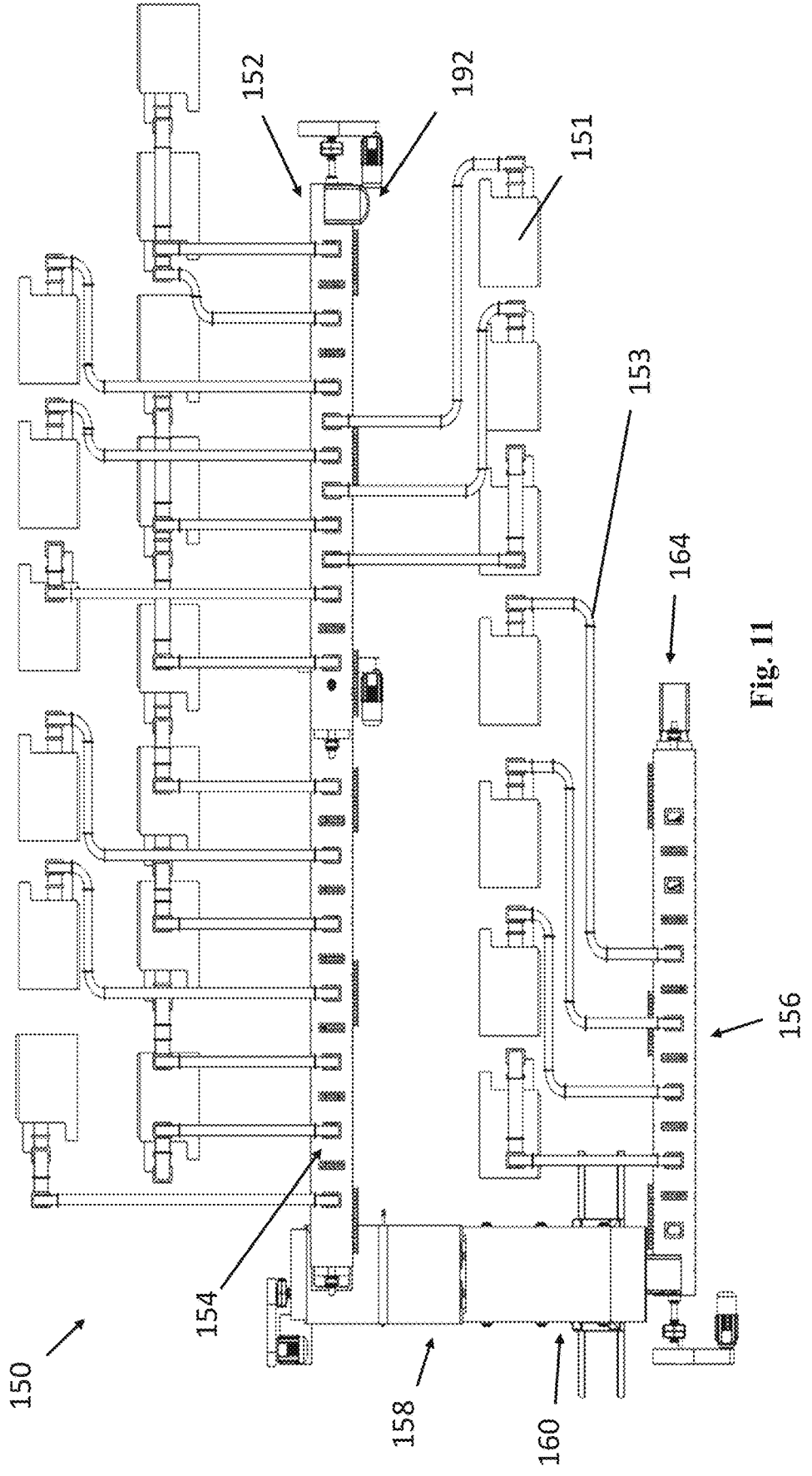
FIG. 11 is a top view of the multi-conveyor continuous treatment system of FIG. 10.

FIGS. 10 and 11 show an example multi-conveyor continuous waste treatment or processing system 150. The system 150 as shown comprises an example of three conveyor units that are similar to conveyor unit 152 described above, in addition to a mixer 158, lifting conveyor 160, and two microwave suppression tunnels (e.g., 200, 202) shown at inlet 162 and outlet 164. Multiple microwave heating units 151 are also shown connected to the conveyor units via multiple corresponding waveguides 153 as described herein. As shown the three conveyor units are laid out in series, or sequentially.

As shown, a first conveyor unit 152 receives a waste material to be heated, and the system 150 operates sequentially by passing the waste material to a second conveyor unit 154 following the first conveyor unit 152, and to a third conveyor unit 156 following the second conveyor unit 154. A mixer 158 (described in greater detail with reference to FIGS. 12 and 13), and a lifting conveyor 160 are also shown in line and between the second conveyor unit 154 and the third conveyor 156 in a sequential or serial arrangement. In other optional embodiments, a return system can be implemented where waste material is returned to the inlet 162 once it has approached or left the outlet 164 or equivalent.

In this way, a given system 150 can simulate a larger system and can achieve higher temperatures and/or longer heating times as desired.

In particular, the mixer 158 can be located sequentially after an outlet of the second conveyor unit 154, and the lifting conveyor 160 can be located sequentially after the mixer 158 and before the third conveyor unit 156. The mixer 158 can be a pugmill, a drum mixer, mixing chamber, or any other type of suitable mixer as known in the art.

As described and shown herein, any number of conveyor units 152, 154, 156, etc. and any number of mixers 158, lifting conveyors 160 can be utilized in various systems such as 150. Moreover, the various components within the system 150 can be arranged in any suitable order according to a desire or need. Furthermore, microwave suppression tunnels (e.g., 200, 202) are preferably utilized at various inlets and/or outlets of the system 150 according to various embodiments.

The various conveyor units 152, 154, 156 can positioned such that the first conveyor unit 152 is vertically elevated and that the second and/or third conveyor units 154, 156 are positioned sequentially lower than the first conveyor unit 152 so as to utilize gravity to facilitate movement of material being heated between the various conveyor units when in use. In some embodiments, one or more lifting conveyor 160 can also be utilized to lift or raise the waste material being heated and reduce a total amount of height required for various conveyor units. As used herein, a conveyor, can be any mechanism or setup, or component thereof, that allows or causes a material to be moved from one location to another location.

When used sequentially, the first conveyor unit 152 can heat the flowing waste material to a first temperature, the second conveyor unit 154 can heat the material to a second temperature greater than the first temperature, and the third conveyor unit 156 can heat the waste material to a third temperature that is greater than the second temperature according to various embodiments. Each conveyor unit preferably heats the waste material using microwave energy as the material flows and such that a third or final desired temperature is reached before the waste material exits the heating and/or processing system, e.g., after achieving a desired heating and time specification per various regulations.

Any conveyor unit, such as the first conveyor unit 152, can further include a baffle 108 (see FIG. 8), preferably a vertical baffle or a baffle that is otherwise at least partially transverse to a direction of material flow within the conveyor unit 152, which is configured to restrict, guide, and shape the waste material as it proceeds through the first housing of the first conveyor unit 152. For instance, the baffle 108 can assist the auger 106 in restricting the flow of, leveling the waste material to a desired maximum level within the first conveyor unit 152, or reducing the particle size of received waste material to a desired diameter for processing and/or heating. In some embodiments, the waste material to be processed, before or after passing the baffle 108, has a maximum diameter or size of about eight inches. In other embodiments the maximum diameter is about six inches. In yet further embodiments, one or more impactor is added to reduce a maximum largest dimension of the waste material (e.g., municipal waste or other waste material). For example, in some embodiments at least some waste material is crushed, comminuted, ground, or otherwise reduced in size within or prior to entering the first conveyor unit 152. Other conveyor units can also include various types of baffles (e.g., baffle 108) or other restrictive or material guiding members or features. In other embodiments, the waste material is received as a semi-solid, liquid, or flowable state. During heating the waste material can progressively become more solid and less flowable as water is evaporated or boiled off the waste material.

Figure 12:
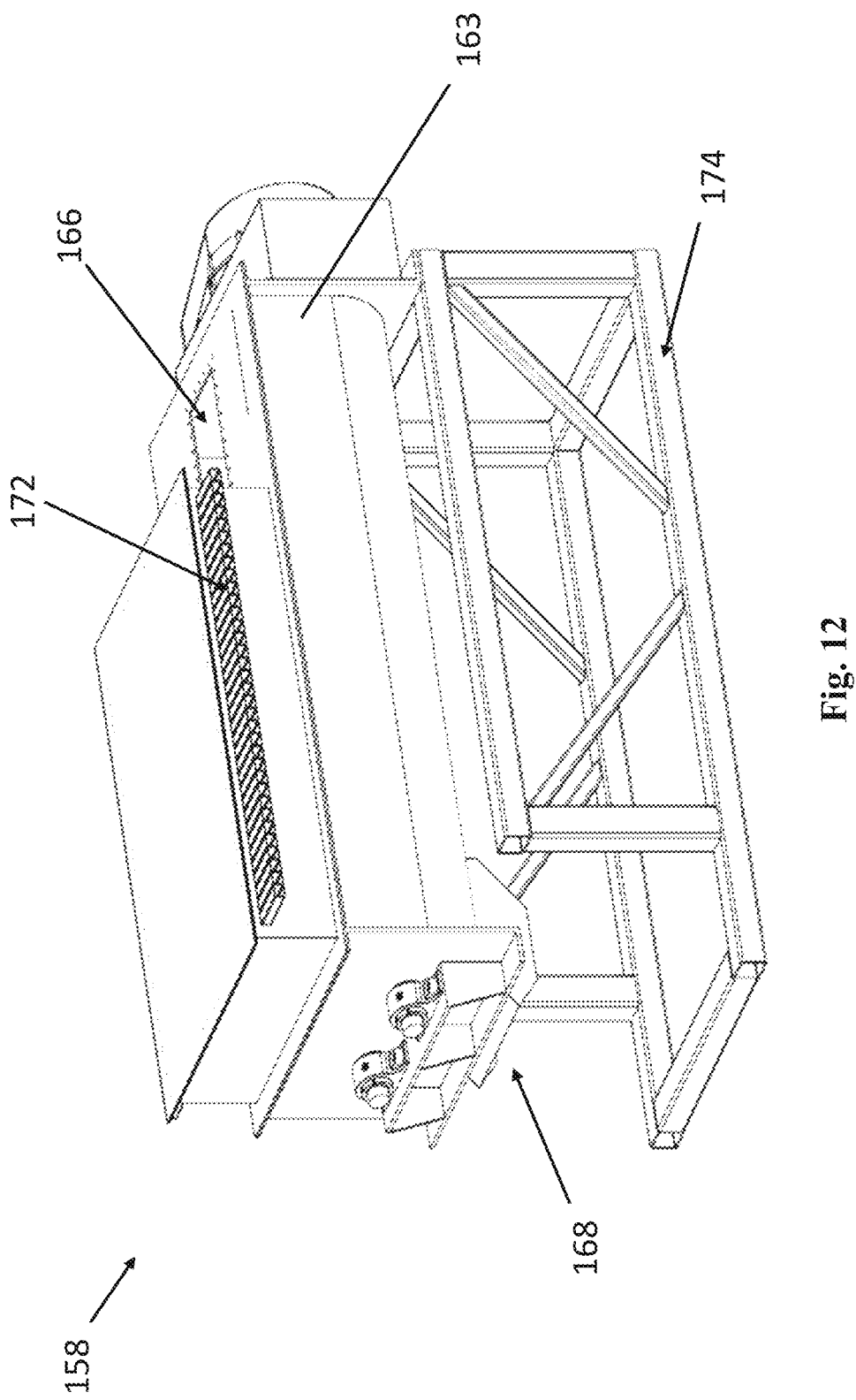
FIG. 12 is a perspective view of a mixer for use with the multi-conveyor continuous treatment system of FIG. 10.
Figure 13:
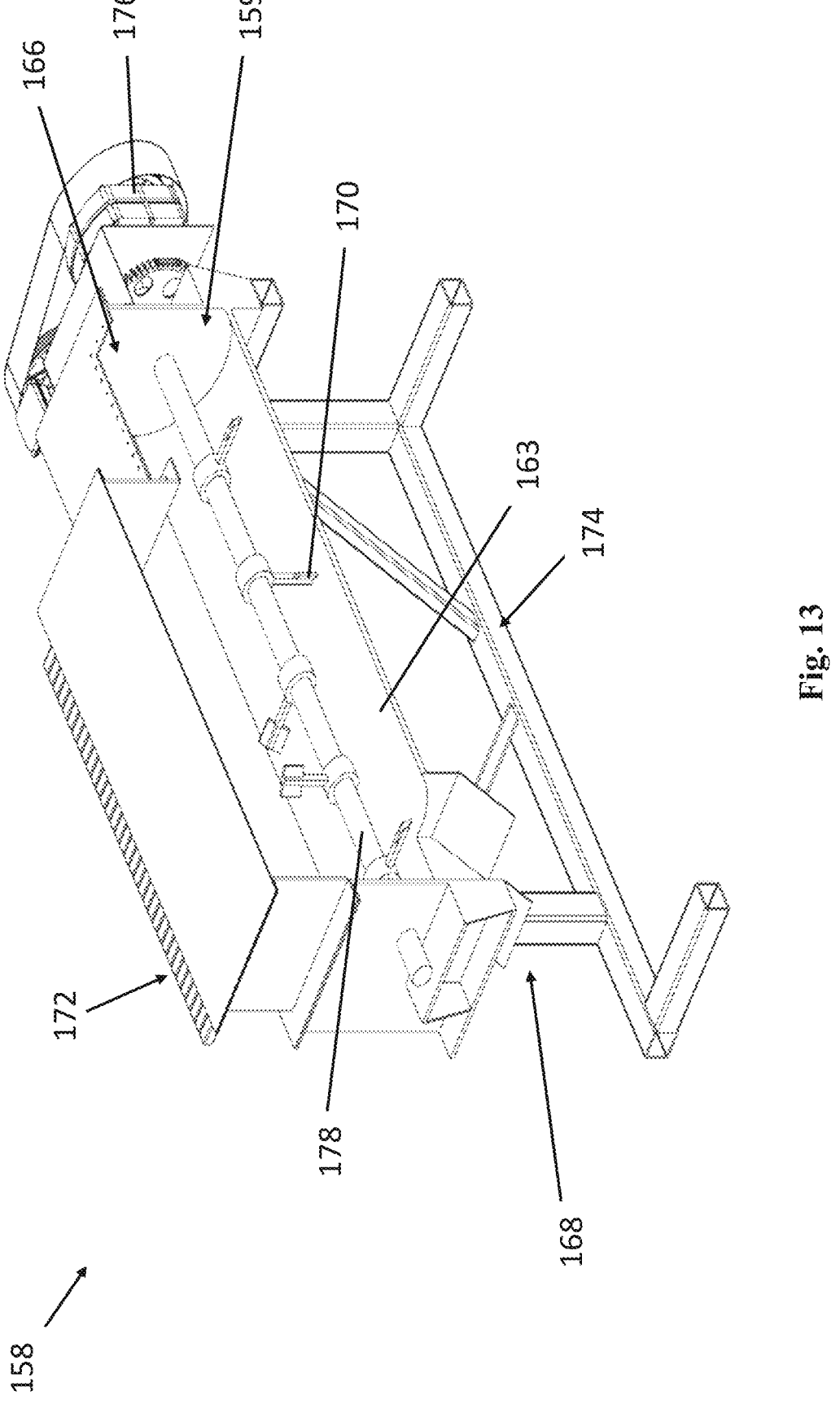
FIG. 13 is a partial cut-away view of the mixer of FIG. 12.

FIGS. 12 and 13 show the optional mixer 158 of system 150 in greater detail. The mixer 158 generally includes a mixer trough 163 supported by a mixer support structure 174, which can be height-adjustable in various embodiments. The mixer 158 also preferably comprises one or more mixer vents 172, and a mixer material inlet 166 and outlet 168. With reference in particular to the cross-sectional view of the mixer 158 in FIG. 13, the mixer trough 163 has an interior 159 for holding and mixing a material being processed. The mixer trough 163 also supports a mixer shaft 178 (e.g., via one or more bearings, not shown) that is operatively driven by a mixer motor 176. Connected to and protruding from the mixer shaft 178 are one or more mixer axially-mounted paddles 170 that are configured to mix a material held within the interior 159 of the mixer trough 163. Optionally, various heat exchanger components and/or heat recovery components or features can be positioned within or near the mixer 158. As shown the material is not heated during mixing within mixer 158. However, in alternative embodiments, the material can be heated while in the mixer 158. Multiple mixer shafts 178 can optionally be included in mixer 158.

Figure 14:
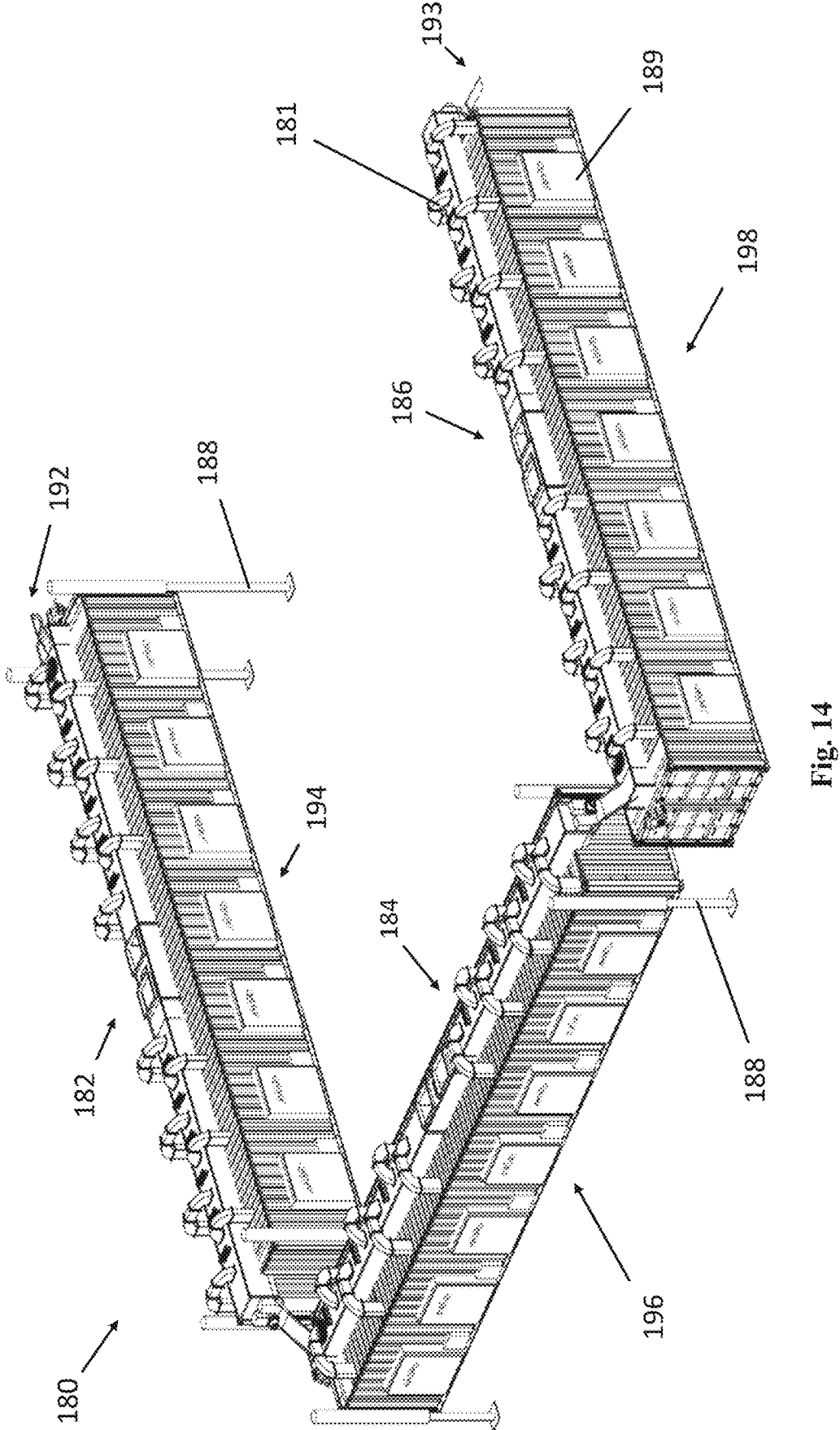
FIG. 14 is a perspective view of a mobile multi-conveyor continuous treatment system, according to various embodiments.
Figure 15:
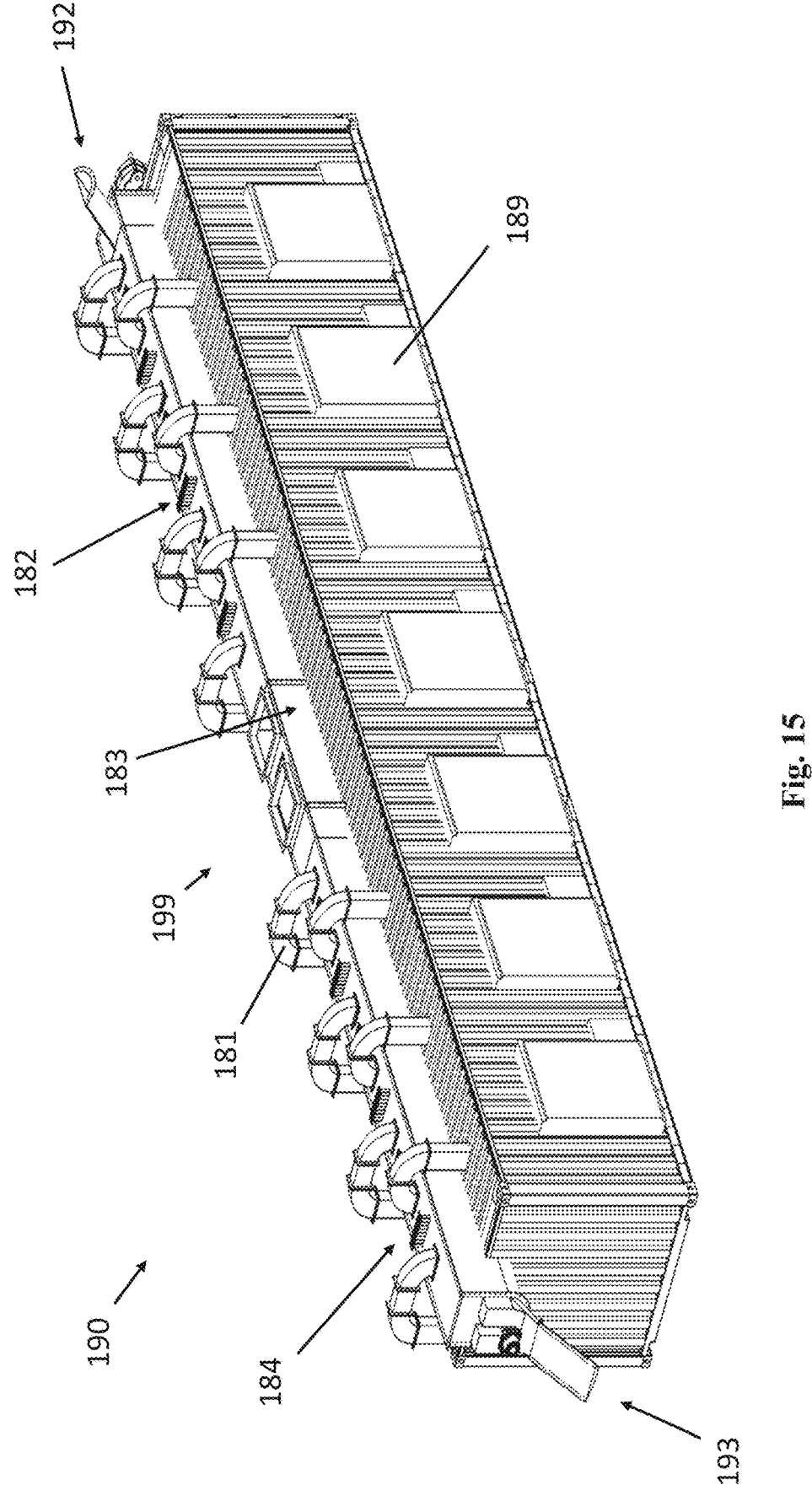
FIG. 15 is a perspective view of an alternative mobile multi-conveyor continuous treatment system, according to various embodiments.

FIGS. 14 and 15 show various mobile multi-conveyor continuous treatment systems, including 180 (three conveyor unit) and 190 (two conveyor unit).

Mobile and/or modular multi-conveyor continuous treatment systems, such as systems 180 or 190, can be beneficially modular and easily transported. With mobile, modular systems, scalability of production can be improved because additional mobile units can be added for a jobsite as needed, provided there is sufficient space, and without requiring additional fabrication or sourcing of components.

As shown in FIG. 14, a three-module, mobile multi-conveyor waste mixer and treatment system 180 is shown. The system 180 as shown is composed of three generally similar mobile container units 194, 196, and 198, each comprising a conveyor unit 182, 184, and 186, respectively. As shown, each mobile container unit also comprises one or more microwave units 189, one or more waveguides 181, and optionally one or more system material inlet 192 and/or outlet 193. According to some embodiments, each mobile container unit 194, 196, and/or 198 is one or more reused or modified industry standard corrugated steel shipping container. Various openings and/or portions can be removed or modified such that the various components can fit onto or within each mobile container unit. As shown, the conveyor units 182, 184, 186 are generally positioned above or on an upper portion of the respective mobile container unit 194, 196, 198. The microwave heating or power units 189 are shown as being at least partially integrated into the mobile container units 194, 196, 198, and at least a portion of each microwave heating unit 189 can be exposed to the outside when installed within the mobile container unit. Various container units 194, 196, 198 as contemplated herein can be mounted to or incorporated various vehicles, trailers, etc.

Each mobile container unit 194, 196, 198 can further be provided with a mechanism or system for adjusting a vertical position or height of the mobile container unit operative components, such as the conveyor unit. The mechanism can include one or more individual adjustable height support structures 188, e.g., four with one positioned at each corner of each mobile container unit. Other height-adjustable structures are also contemplated, such as various scissor lifts, jacks, removable stands, and the like.

As shown the first mobile container unit 194 is positioned at a relatively more raised position, the second mobile container unit 196 is positioned at a less raised position compared to the first mobile container unit 194, and the third mobile container unit 198 is positioned at a fully lowered position, e.g., set on a ground or floor without use of the adjustable height support structures 188. Although neither a mixer (e.g., 158) nor a lifting conveyor (e.g., 160) are shown in the system 180, in other embodiments one or more mixers and/or lifting conveyors can be utilized with the system 180, and can be integrated into one or more mobile container units, such as 194, 196, and/or 198. Any feature or component of system 150 of FIG. 14 can be applied to the system 18, as appropriate.

FIG. 15 shows an alternative mobile multi-conveyor waste mixer and treatment system 190 with a single combined mobile container unit 199 with two conveyor units 182, 184 therein. As shown, a single container, such as a shipping container, can be modified to receive two conveyor units 182, 184 in sequence, and optionally can include a mixing and/or venting chamber 183 positioned between the first and second conveyor units 182, 184. Multiple systems 190 can be operated in parallel in order to adjust a throughput of heated material according to a particular need or desire for a mobile operation.

FIGS. 16-31 illustrate various arrangements of features of microwave suppression tunnels or chutes, such as the inlet suppression tunnel 202 or the outlet suppression tunnel 200. As used herein, the inlet suppression tunnel 202 and the outlet suppression tunnel 200 can be operatively similar and the features of either can be incorporated into the other in various embodiments. For example, although the inlet suppression tunnel 202 is shown with a single flap 218, multiple flaps 218 can be used in the inlet suppression tunnel 202 among other features of the outlet suppression tunnel 200. For example, the various suppression tunnels of FIGS. 16-31 can be adapted to connect and operate in conjunction with systems 150, 180, and any other system disclosed herein, among other examples.

Figure 16:
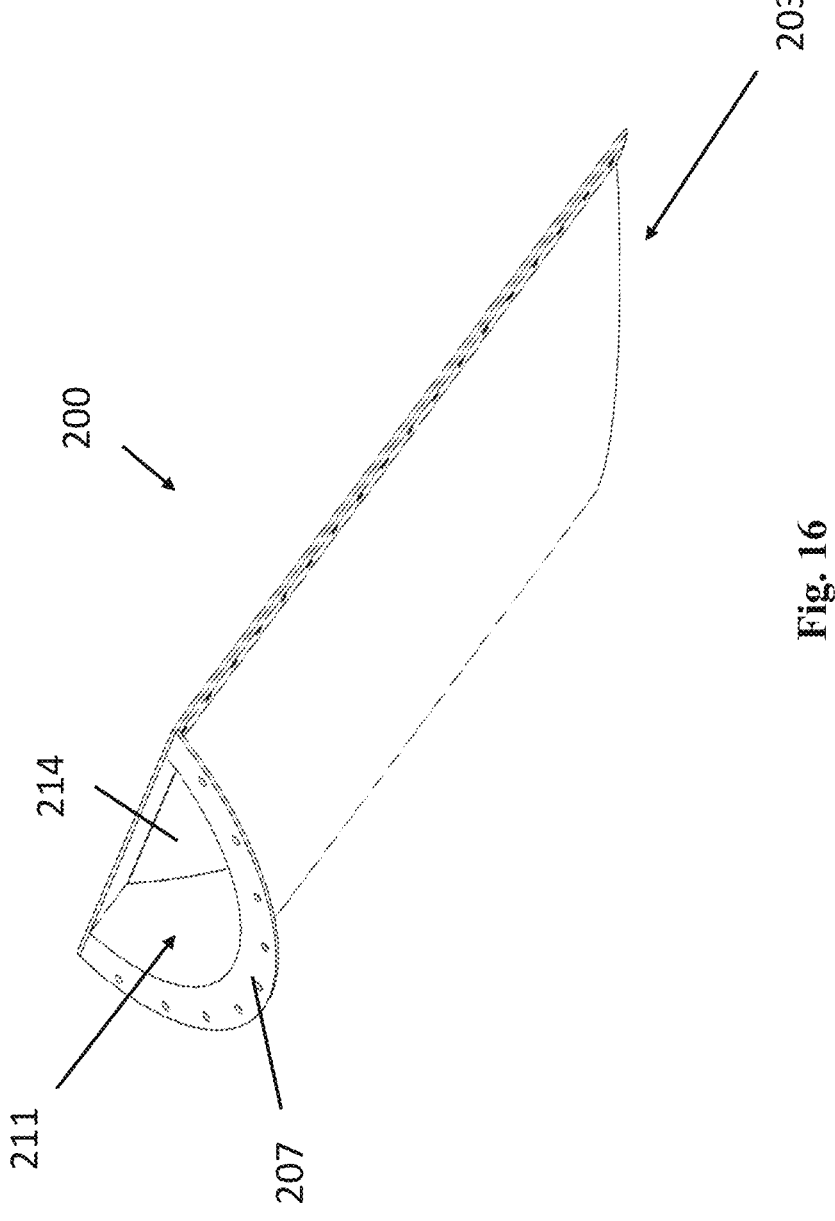
FIG. 16 is a perspective view of a microwave suppression tunnel, according to various embodiments.

As shown in FIG. 16, the outlet suppression tunnel 200 can be configured to include one or more absorbing, deflecting, or blocking flaps 214, variously including inlet and outlet suppression tunnel embodiments. Each suppression tunnel can be located attached to or comprised within a material inlet (e.g., inlet suppression tunnel 202) or outlet (e.g., outlet suppression tunnel 200) of various conveyor units as described herein. The example outlet suppression tunnel 200 preferably comprises a chute flange 207 for attachment at or near a conveyor unit outlet, or the like. The suppression tunnel 200 can also be configured for use as an "inlet" suppression tunnel with only minor changes, such as changing the location of the chute flange 207, a direction of permitted flap 214 movement relative to the outlet suppression tunnel 200, positioning, and the like. The flap 214 can be a single unit that is movable, flexible, or the like as described below. Flap 214 is attachable and/or pivotally attached to an upper portion of the outlet suppression tunnel 200.

Figure 17:
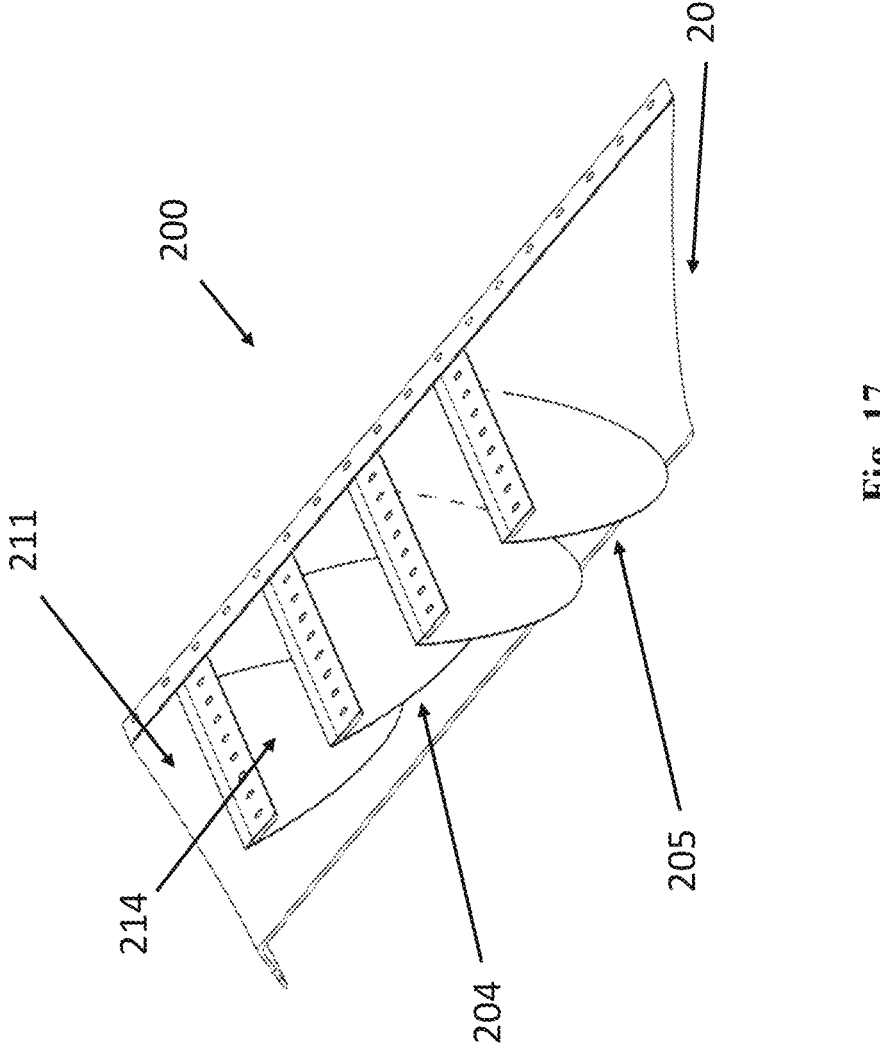
FIG. 17 is a partial cut-away view of the microwave suppression tunnel of FIG. 16.
Figures 18, 19:
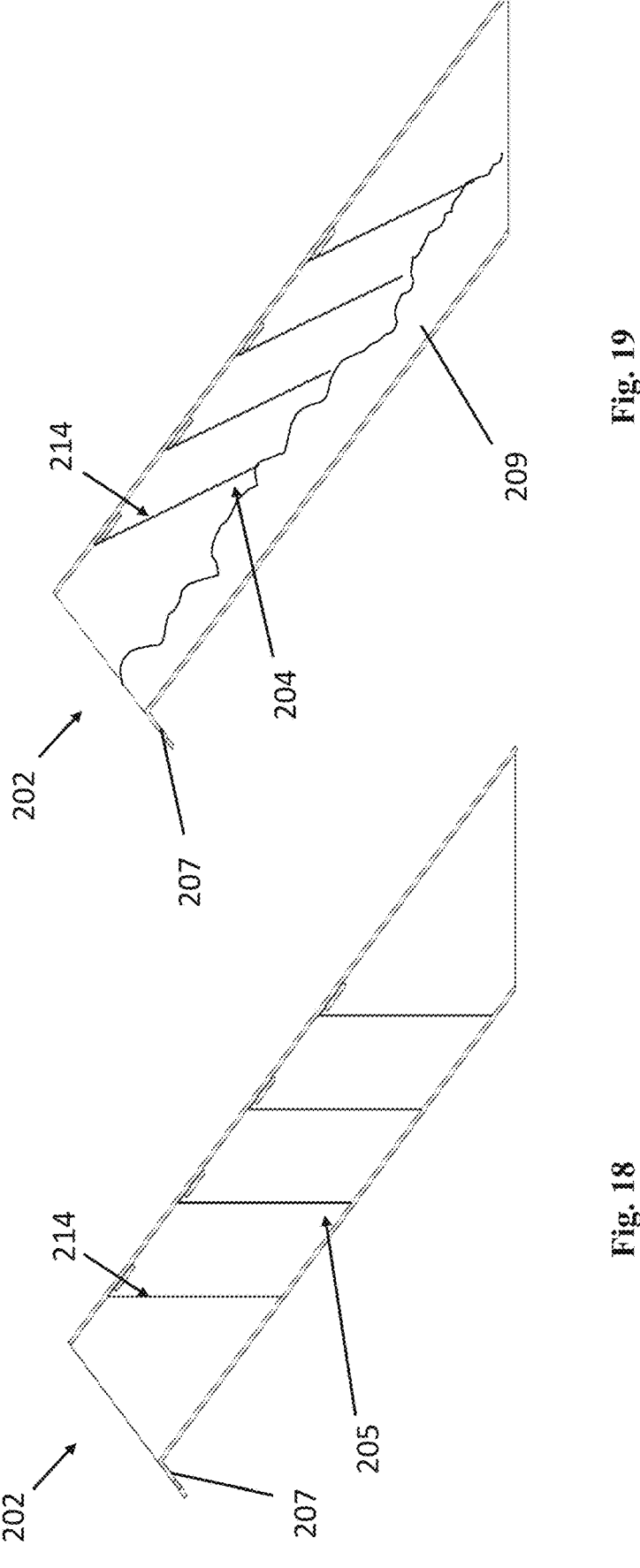
FIG. 18 is cross-sectional side view of the microwave suppression tunnel of FIG. 16, showing multiple flaps in a closed position.
FIG. 19 is cross-sectional side view of the microwave suppression tunnel of FIG. 16, showing multiple flaps in an open position as flowing material passes the flaps.
Figures 20, 21:
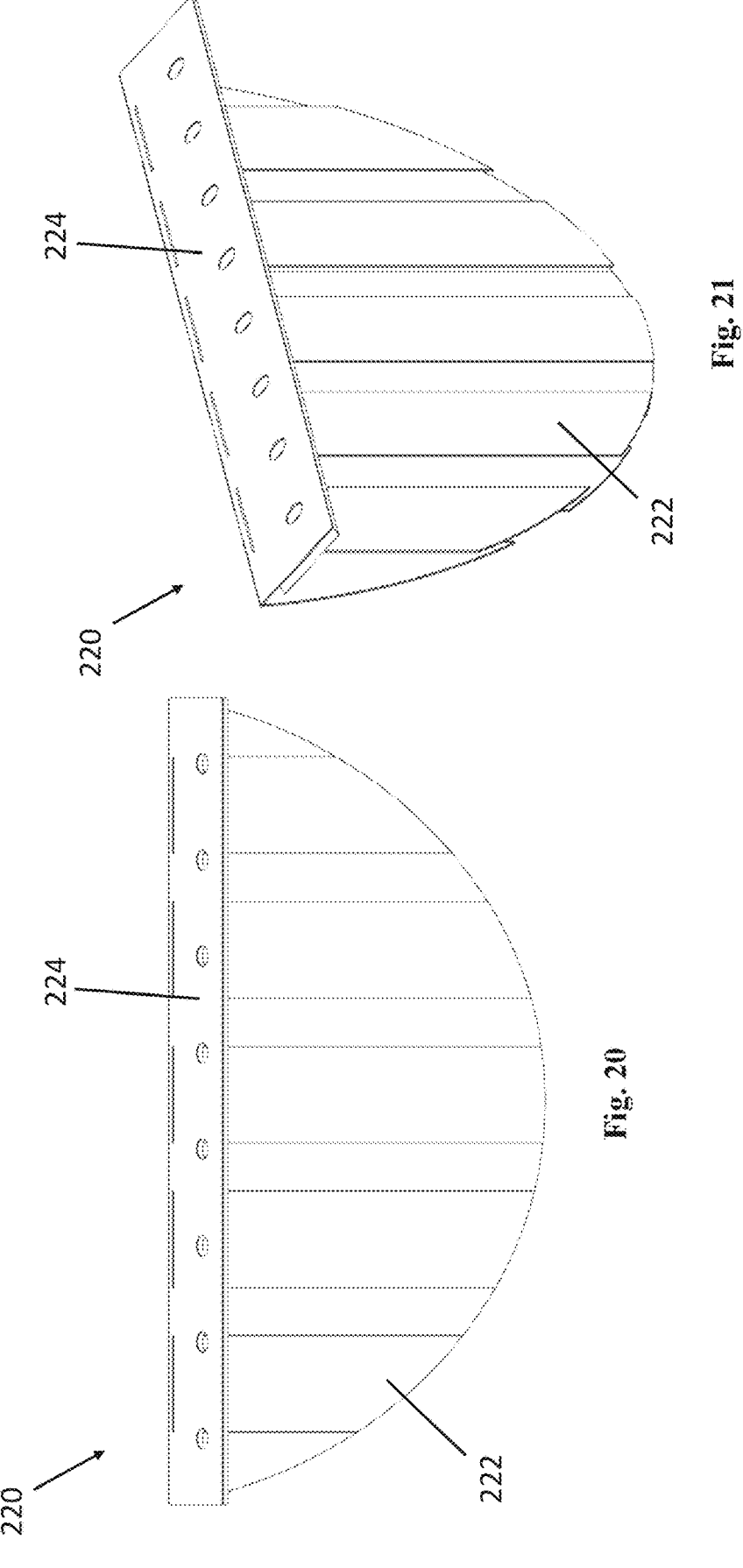
FIG. 20 is a front view of an alternative arrangement mesh strip flap for use in a microwave suppression tunnel.
FIG. 21 is a perspective view of the alternative arrangement mesh strip flap of FIG. 20.

Shown in perspective cross-sectional view in FIG. 17, the outlet suppression tunnel 200 includes flaps 214 that can move from a default, closed position 205 of the flap 214 as it contacts the outlet suppression tunnel 200, to a dynamic, open position 204 as waste material 209 flows past (see FIG. 19), and applies a pressure on the flap 214, thereby opening it until the waste material 209 stops flowing or is cleared from the outlet suppression tunnel 200 (See FIG. 18). The outlet suppression tunnel 200 as shown in FIGS. 16 and 17 includes an attachment side, tunnel inlet 211, and an exit side, tunnel outlet 203.

An alternative embodiment of a flap 220 for use herein, is instead composed of multiple sub-portions 222, such as strips of microwave blocking, deflecting, or absorbing material, which are attached to an attachment flange 224 of the flap, which is usable for attachment (e.g., pivotable attachment) of flap 220 to an upper portion of the suppression tunnel 220. In yet further alternative embodiments of suppression flaps, chains, combinations of materials, or any other suitable microwave-suppression composition can be utilized.

Figures 22, 23, 24:
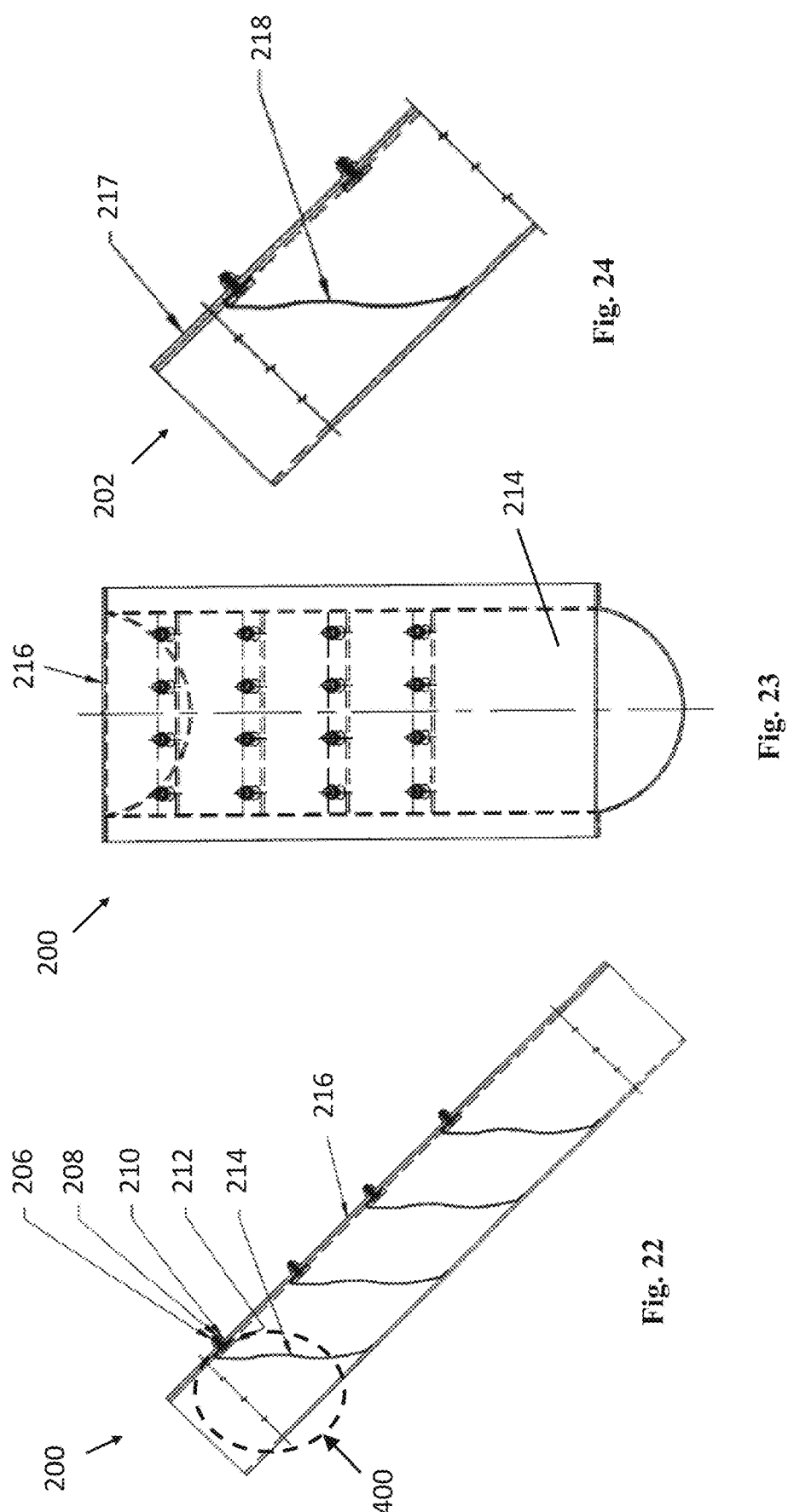
FIG. 22 is a cross-sectional side view of a U-shaped microwave suppression tunnel of an outlet side.
FIG. 23 is a cross-sectional top view of the U-shaped microwave suppression tunnel of FIG. 22.
FIG. 24 is a cross-sectional side view of a U-shaped microwave suppression tunnel of an inlet side.

FIG. 22 is a cross-sectional side view of a U-shaped outlet suppression tunnel 200 of an outlet side. As shown, a series of four, single-ply (e.g., single layer) microwave suppression flaps 214 are shown in the outlet suppression tunnel 200 in a down position. At hardware detail section 400 of FIG. 28, flaps 214 can be attached to a top outlet side portion 216 of the outlet suppression tunnel 200 along with attachment hardware including bolt fastener 206, nut 208, bolt washer 210, metal bracket 212, and shielding mesh flap 214.

FIG. 23 is a cross-sectional top view of the outlet U-shaped microwave outlet suppression tunnel 200 of FIG. 22. As shown, multiple attachment points (e.g., using hardware shown at FIG. 28) for each flap 214 are contemplated, although any suitable attachment or arrangement for the flap 214 is also contemplated herein.

FIG. 24 is a cross-sectional side view of a U-shaped inlet microwave suppression tunnel 202 for use with or connection to an inlet side of a conveyor unit, such as conveyor unit 152 of the system 100. System 100 described above with reference in particular to FIGS. 1-4 can have inlet and outlet ends of a continuous motion particle pathway (e.g., motivated by auger 106 or other conveyance mechanism of the conveyor unit 152), an inlet suppression tunnel 202 can be used with or without an outlet suppression tunnel 200 as shown in FIGS. 22 and 23. A single, single-ply (e.g. single layer) microwave suppression flap 218 is shown in FIG. 24 attached to a top inlet side portion 217, e.g., using hardware as shown and described with respect to FIG. 28, below. As shown in the embodiments of FIGS. 22-24, the outlet/inlet suppression tunnels 200 and 202 use a single-ply (e.g., single layer) microwave-absorbing, deflecting, or blocking mesh flap 214 or 218, respectively. With reference to mesh flaps 214 and 218 and the like, the term "absorbing" is understood generally to optionally include any of absorbing, deflecting, blocking, and/or any other suppression technique of microwaves.

Figure 27:
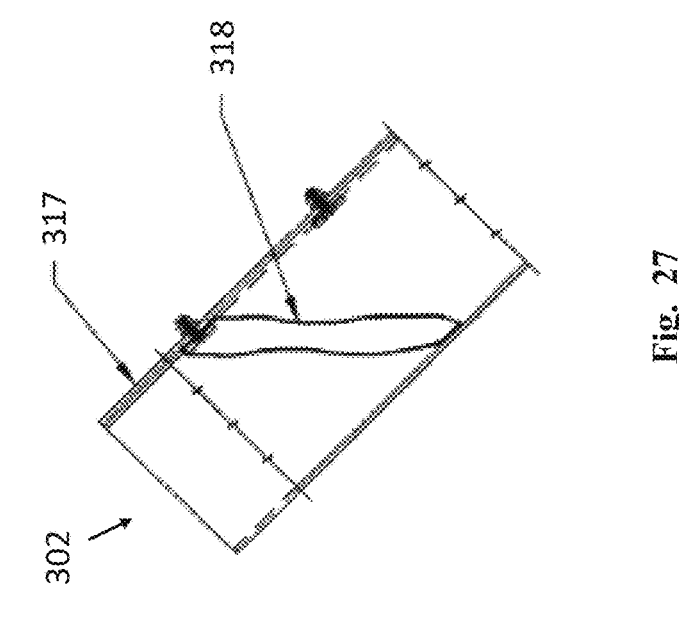
FIG. 27 is a cross-sectional side view of a rectangular microwave suppression tunnel of an outlet side.
Figure 26:
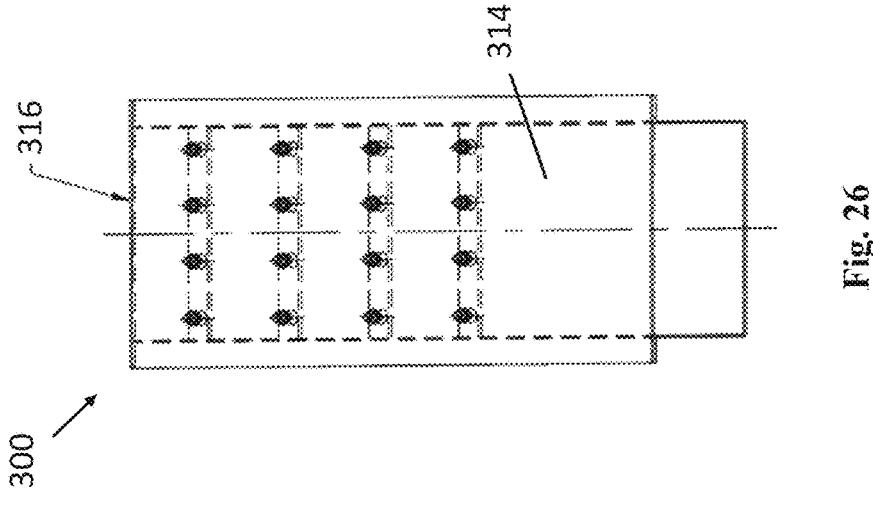
FIG. 26 is a cross-sectional top view of a rectangular microwave suppression tunnel of FIG. 25.
Figure 25:
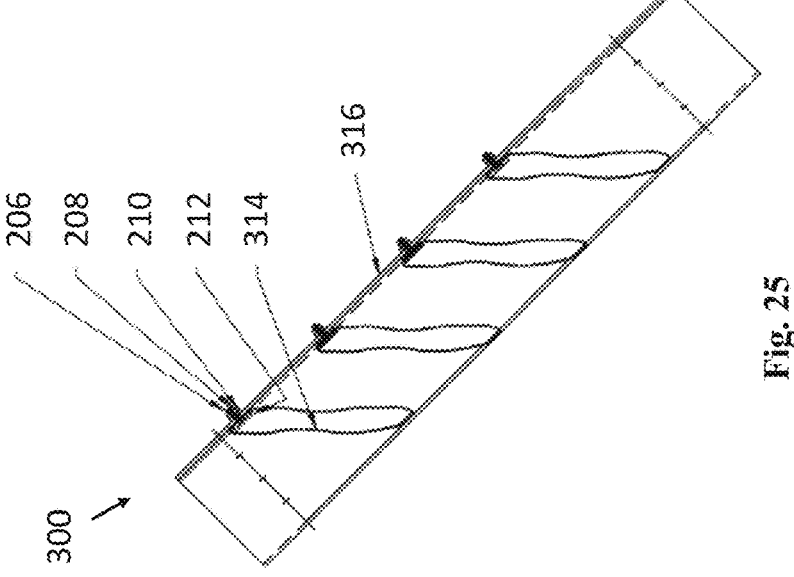
FIG. 25 is a cross-sectional side view of a rectangular microwave suppression tunnel of an inlet side.

FIGS. 25-27 illustrate alternative embodiments where mesh flap(s) 314, 318 are doubled over as two-ply for increased microwave absorption. FIGS. 25-27 are similar to FIGS. 22-24, respectively, with the exception of the folded over, two-ply (two layer) mesh flap(s) 314, 318.

FIG. 25 is a cross-sectional side view of a rectangular microwave outlet suppression tunnel 300. Four flaps 314 are shown, and each flap 314 can be attached to a top portion 316 of the outlet suppression tunnel 300 along with attachment hardware including bolt fastener 206, nut 208, bolt washer 210, metal bracket 212, and shielding mesh flap 314.

FIG. 26 is a cross-sectional top view of the rectangular microwave outlet suppression tunnel 300 of FIG. 25. FIG. 27 is a cross-sectional side view of a corresponding rectangular microwave inlet suppression tunnel 302. As shown, folded flap 318 is attached to top outlet side 317.

Figure 28:
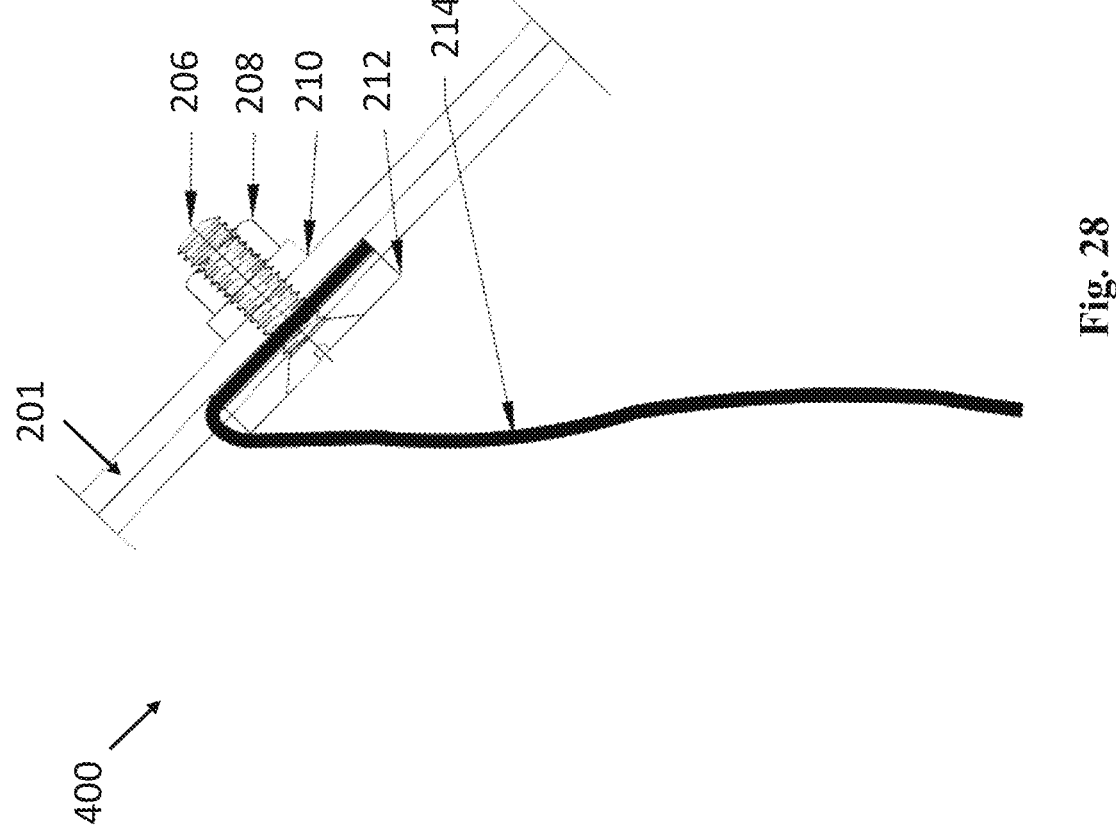
FIG. 28 is a schematic side view of a hardware detail section of a non-looped microwave absorbing flap with a mesh attached to a microwave suppression tunnel.

FIG. 28 shows greater detail of hardware detail section 400 of FIG. 22. As shown, a flap 214 can be attached to (e.g., a top inlet or outlet side portion) of a suppression tunnel along with attachment hardware including bolt fastener 206, nut 208, bolt washer 210, metal bracket 212, and shielding mesh flap 214. FIG. 28 shows a side view of a non-looped, single-ply microwave absorbing, deflecting, or blocking flap 214 with a microwave-absorbing, deflecting, or blocking mesh described in greater detail herein that is attached to an upper portion of a suppression tunnel (or chute thereof, etc.). Only one example fastening arrangement is shown at hardware detail section 400, but other arrangements are contemplated. In other embodiments, the flap 214 with mesh can be looped, causing a two-ply (e.g., two layer) flap to be attached at two ends in a manner similar to the fastening arrangement shown at hardware detail section 400.

Flap 214 as shown in FIG. 28 (and any other embodiments of flaps herein) is preferably electrically grounded to a heating system frame 201. The heating system frame 201 is preferably grounded to a power source electrical grid (not shown) according to various embodiments.

Turning now to FIGS. 29A-29C and 30A-30C, various cross-sectional end views are shown that provide detail of flap configuration within a suppression tunnel or chute in addition to flap articulation or flexing that occurs during continuous material (e.g., waste) production and movement along the tunnel.

Inlet and/or outlet microwave suppression tunnels (e.g., 202, 200, etc.) can be positioned and connected relative to the continuous heating assembly or system as described herein. During heating operation, it is possible that at least some microwave energy will not be absorbed by material being heated or other components within the assembly. This non-absorbed, escaped, or "leaked," microwave energy can be unsafe, undesirable, or otherwise beneficial to avoid in practice. In order to address this shortcoming, one or more movable and/or pivotable flaps can be positioned at the inlet tunnel, the outlet tunnel, or both.

In various embodiments, an example microwave absorbing, deflecting, or blocking flap, for inlet or outlet of material, such as waste, can comprise a flexible mesh configured to feely pivot when contacted by moving waste material as described herein. Inlet and/or outlet microwave suppression tunnels can have rounded, rectilinear, or a combination of the two for an outline along the various tunnels.

In various embodiments, the various microwave suppression tunnels are preferably in a substantially horizontal position, but preferably at an angle of no more than 45 degrees from horizontal.

FIG. 29A is a cross-sectional end view of a U-shaped microwave suppression tunnel configuration 500A with a top-mounted pivoting mesh flap 506 in a closed position. Example attachment points 502 show one alternative mounting configuration that allows flap 506 to pivot within U-shaped flap surround 508. The flap 506 can pivot along a top flap portion or axis 504, or can bend alternatively when a pressure is applied to the flap 506.

FIG. 29B is a cross-sectional end view of a U-shaped microwave suppression tunnel configuration 500B, similar to 500A of FIG. 29A with the mesh flap 506 in a partially open position. As particles are moved along a trough defined by surround 508, flap 506 can be caused to pivot or bend such that an opening 510 between the flap 506 and the surround 508 is revealed. Opening 510 can allow waste material particles to pass while allowing minimal microwaves to escape. Particles of waste material causing flap 506 to open can at least partially block microwaves that would otherwise have escaped the microwave suppression tunnel (e.g., outlet suppression tunnel 200 or inlet suppression tunnel 202, among other examples described herein).

FIG. 29C is a cross-sectional end view of the U-shaped microwave suppression tunnel configuration 500C similar to 500A of FIG. 29A with the mesh flap 506 in a fully open position, causing a larger opening 510 than in configuration 500B.

Figures 30A, 30B, 30C:
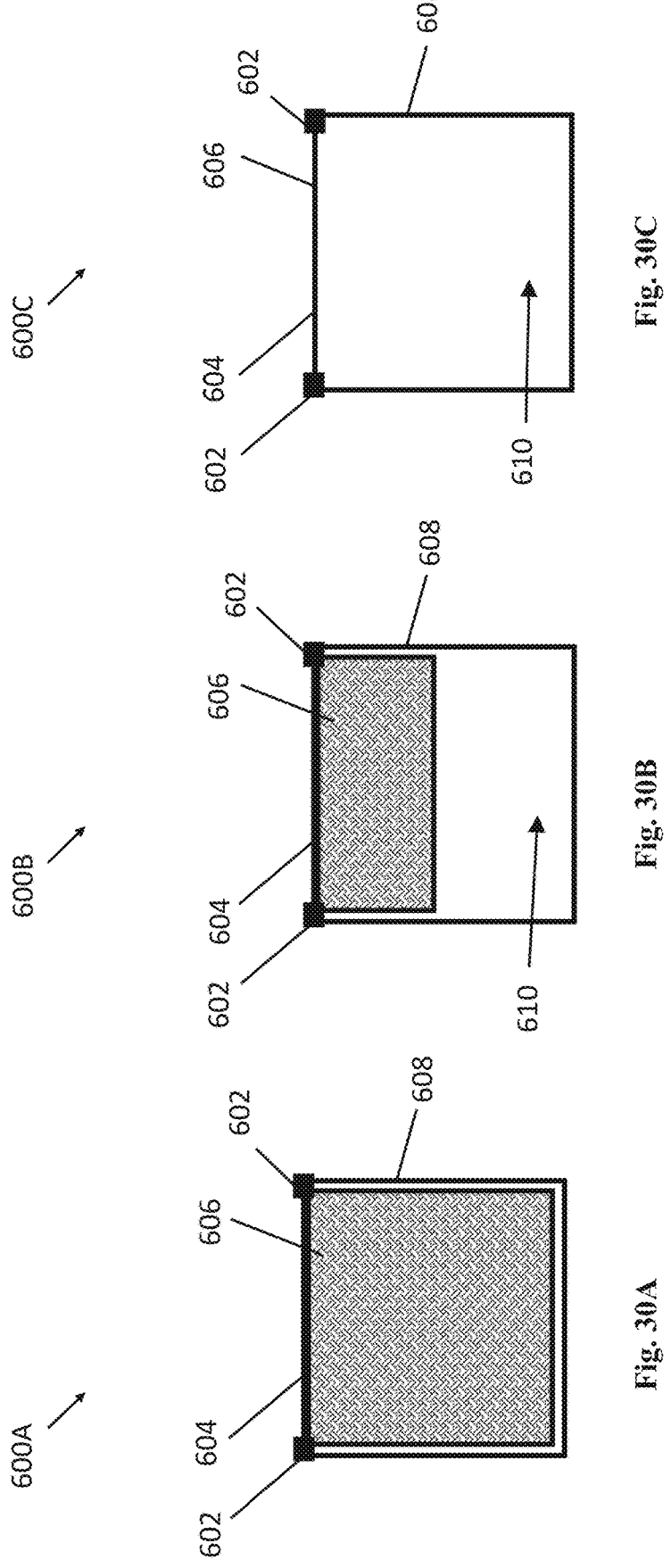
FIG. 30A is a cross-sectional end view of a rectangular microwave suppression tunnel configuration with a top-mounted pivoting mesh flap in a closed position.
FIG. 30B is a cross-sectional end view of the rectangular microwave suppression tunnel configuration of FIG. 30A with the mesh flap in a partially open position.
FIG. 30C is a cross-sectional end view of the rectangular microwave suppression tunnel configuration of FIG. 30A with the mesh flap in a fully open position.

The embodiments shown in FIGS. 29A-29C can also be modified to include a rectangular flap 606 with a corresponding rectangular tunnel or chute surround 608, as shown in FIGS. 30A-30C.

FIG. 30A is a cross-sectional end view of a rectangular microwave suppression tunnel configuration 600A with a top-mounted pivoting mesh flap 606 in a closed position. Example attachment points 602 show one alternative mounting configuration that allows flap 606 to pivot within rectangular flap surround 608. The flap 606 can pivot along a top flap portion or axis 604, or can bend alternatively when a pressure is applied to the flap 606.

FIG. 30B is a cross-sectional end view of a rectangular microwave suppression tunnel configuration 600B, similar to 600A of FIG. 30A with the mesh flap in a partially open position. As waste material particles are moved along a trough defined by surround 608, flap 606 can be caused to pivot or bend such that an opening 610 between the flap 606 and the surround 608 is revealed. Opening 610 can allow particles to pass while allowing minimal microwaves to escape. Material particles causing flap 606 to open can at least partially block microwaves that would otherwise have escaped the microwave suppression tunnel.

FIG. 30C is a cross-sectional end view of the rectangular microwave suppression tunnel configuration 600C similar to 600A of FIG. 30A with the mesh flap 606 in a fully open position, causing a larger opening 610 than in configuration 600B.

Many other microwave suppression system flap and tunnel configurations are also contemplated herein, and the examples above are merely shown as selected examples of preferred embodiments. For example, various example and alternative cross-section shapes of chute are shown at FIG. 31. A generally square chute cross-section is shown at 226, a generally round chute cross-section is shown at 228, and a generally rectangular chute is shown at 230. Any other shape of chute or suppression tunnel (and correspondingly shaped flap[s]) is also contemplated herein.

Figure 32:
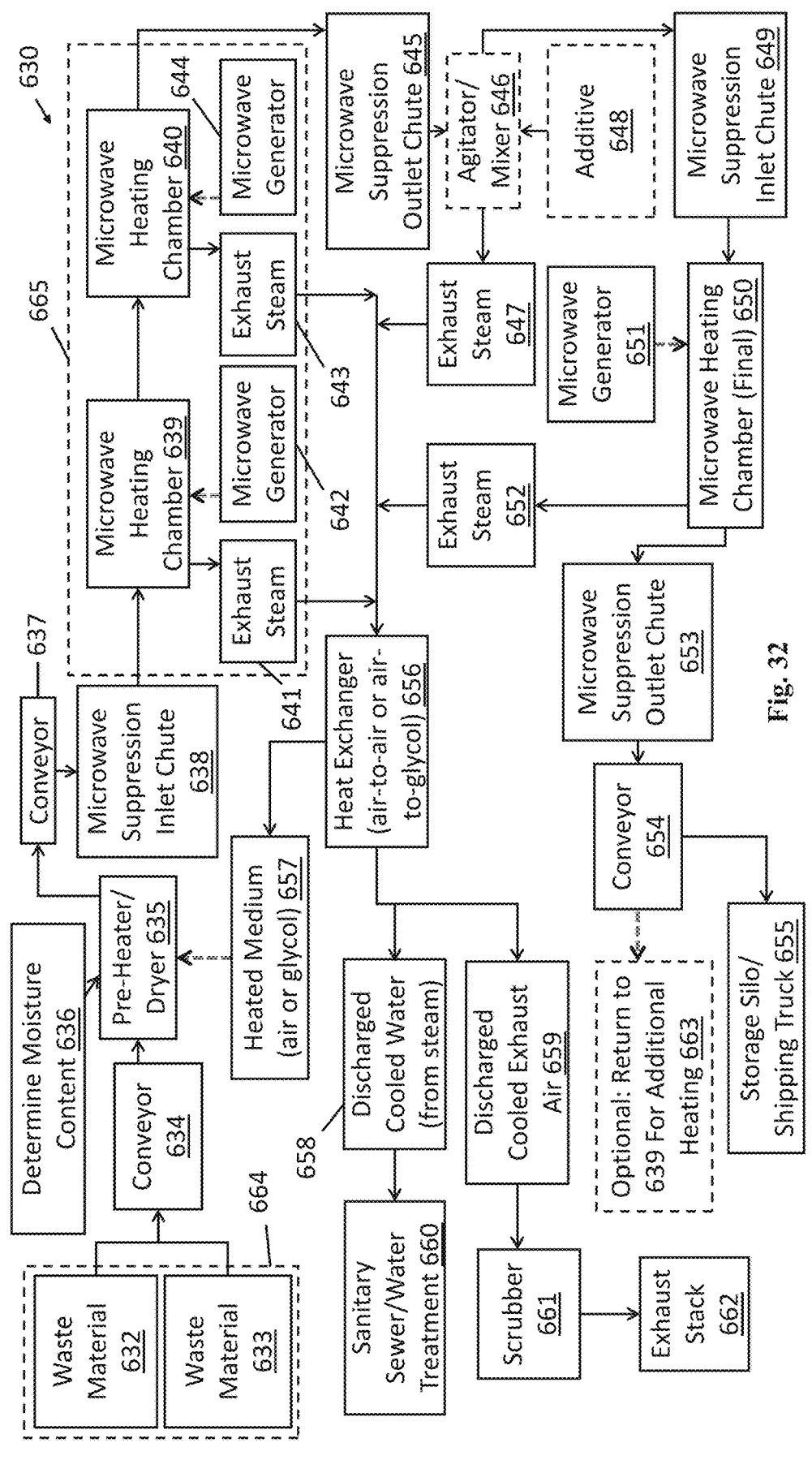
FIG. 32 is a flowchart of a process according to various embodiments of the present disclosure.

FIG. 32 is a flowchart of an example process 630 according to embodiments of the present disclosure.

Process 630 can start with operations 632 and/or 633. At operation 632, one or more hoppers (e.g., containers) of waste material are optionally weighed. At operation 633, one or more hoppers (e.g., containers) of waste material are also optionally weighed. As shown at 664, multiple bins of various waste materials 632, 633 can be combined with different waste materials (or in some cases, combined with other non-waste materials) to obtain a waste material blend. The optional waste material blend is referred to as waste material below for simplicity. For example, certain types of waste material may be mixed in small quantities to another waste material for processing according to various properties.

Next, process 630 proceeds to operation 634, where a conveyor (e.g., a loader unit) carries waste material to a pre-heater or drier at 635. Optionally at operation 636, a moisture/water content of the waste material can be determined or an average moisture content level for the type of waste material can be estimated and entered. By determining an initial moisture content, the initial weight of the waste material can be used to predict or determine final dry weight and the mass of water to be removed. Also at 635, energy can be transferred to the pre-heated or dryer from a heated medium, such as air or glycol from operation 657, as discussed further below.

Following operation 635, the waste material can be further moved using another conveyor at operation 637 until the waste material reaches a microwave suppression inlet chute (or tunnel) at operation 638. Next, the waste material can proceed to a microwave heating chamber (e.g., a trough of a conveyor unit), which can emit heated exhaust steam at 641, and can receive power via microwaves emitted by a microwave generator at 642 (e.g., via one or more waveguides as discussed herein).

Optionally, the waste material can then proceed to another microwave heating chamber of another conveyor unit at 640, which can also omit exhaust steam at 643 and/or receive microwave energy from another microwave generator at 644 (e.g., a microwave heating unit, etc.). As shown at 665, multiple heating sections can be added to get the required energy input to reach a specific throughput and/or reach a specification according to a regulation. After the waste material is sufficiently heated in accordance with desired specifications, the material can proceed to as past a microwave suppression outlet chute (or tunnel) at 645.

After the waste material passes the microwave suppression outlet chute at 645, optionally the material can enter an agitator or mixer at 646. The waste material when in the mixer (if present) can emit exhaust steam at 647, and can optionally receive an additive (e.g., to make a final product more suitable for use as fertilizer, etc.) at 648. It is contemplated that in some embodiments no mixer 646 is used, and the microwave heating chamber 640 can proceed to microwave heating chamber 650 without a mixer.

If the mixer 646 is used, and once the waste material is sufficiently mixed at 646, the material can proceed to another microwave suppression inlet chute (or tunnel) at 649.

At 650 (and similar to 639 and 640), the waste material can proceed to a third microwave heating chamber at 650. The chamber 650 can also receive microwave energy via one or more microwave generator at 651, and exhaust steam can also be used to extract heat from the heated waste material at 652. Once the waste material is heated to a desired, final temperature and moisture content level at 650, the waste material can proceed through another microwave suppression outlet chute at 653, and can proceed via a conveyor 654 to a storage medium, such as a silo or shipping truck at 655, among other destinations for storage or use, including at various remote locations. If however, the waste material may benefit from additional heating and/or drying, at 663, the waste material being processed can be returned to, e.g., microwave heating chamber 639 (e.g., via microwave suppression inlet chute 638) for additional processing. Waste material can be returned for additional processing two, three, four or any number of times and suitable based on target specifications of the waste material.

Exhaust steam heat received at 641, 643, and/or 652 can be recovered as waste heat using one or more heat exchanger 656. The heat exchanger 656 can be an air-to-air heat exchanger, or an air-to-liquid (e.g., glycol) heat exchanger in various embodiments. The heat exchanger 656 can thereafter provide heat via a heated medium at 657 to be used in the pre-heater or dryer 635 as discussed above.

Also in thermal communication with the heat exchanger at 656 can be discharged cooled water (from steam) at 658 and/or discharged cooled exhaust air at 659. The discharged cooled water at 658 can then proceed to a sanitary sewer or water treatment at 660. Furthermore, the discharged cooled exhaust air at 659 can proceed to an optional scrubber at 661, and then to one or more exhaust stacks at 662. The optional scrubber at 661 can condense steam and reduce odor emissions and the like.

In some examples, a shielding mesh used for blocking or absorbing microwave emissions can be an aluminum mesh with a pitch or opening size of about 0.15" (3.81 mm) or less. The shielding mesh can be optionally encapsulated or coated in a protective substance, such as silicone or the like. In some embodiments, such silicone can reduce the likelihood of screens touching and resulting arcing. Reducing arching between screens can prolong useful life of the screen. Also contemplated is an aluminum particle filled silicone structure. Other variations and types of shielding mesh also contemplated are discussed below.

Figure 33:
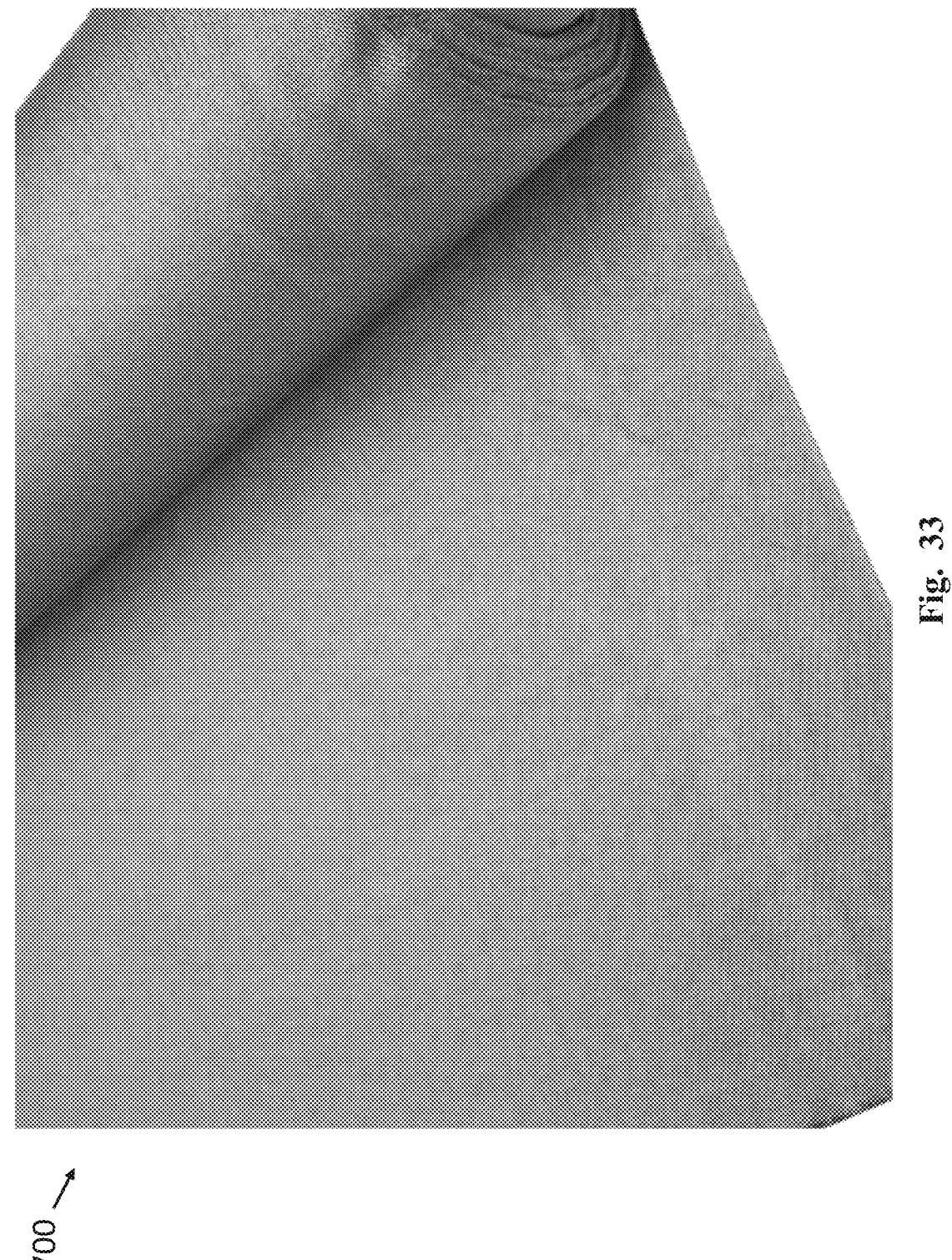
FIG. 33 is a detail view of an RFI shielding mesh according to various embodiments.
Figure 34:
FIG. 34 is another view of the RFI shielding mesh of FIG. 33.

FIGS. 33 and 34 show an example stainless steel RFI shielding mesh 700. The mesh 700 can be a carbon cover metal.

For example, the shielding mesh 700 can be sourced from Aaronia USA/Aaronia AG. The shielding mesh 700 can be an 80 dB Stainless Steel RFI Shielding Aaronia X-Steel model, which can provide military or industrial grade screening to meet various demanding usage cases. In some examples, the shielding mesh 700 can be coated with a polytetrafluoroethylene (i.e., PTFE or "Teflon") coating, silicone, polyurethane, plastic, or the like.

The steel mesh 700 can be highly durable, effective up to about 600° C., operate under a very high frequency range, and be permeable to air. In more detail, shielding mesh 700 is an Aaronia X-Steel component that can operate to at least partially shield both radio frequency (RF) and low frequency (LF) electric fields.

Some specifications of the shielding mesh 700 can include a frequency range of 1 MHz to 50 GHz, a damping in decibels (dB) of 80 dB, a shielding material including stainless steel, a carrier material including stainless steel, a color of stainless steel (silver), a width of 0.25 m or 1 m or some variation, a thickness of about 1 mm, available sizes of about 0.25 m² or 1 m², a mesh size of approximately 0.1 mm (multiple ply/layer), and a weight of approximately 1000 g/m². The shielding mesh 700 can be suitably durable, and can be configured and rated for use in industrial or other applications, can have a temperature range up to 600° C., can be permeable to air, and permit very easy handling.

In some examples, the shielding mesh 700 can be electromagnetic compatibility (EMC) screening Aaronia X-Steel from Aaronia AG, which can be made from 100% stainless steel fiber. The shielding mesh 700 can meet various industrial or military standards. The shielding mesh 700 can be very temperature stable for at least 600° C., does not rot, is permeable to air. The shielding mesh 700 can be suitable for EMC screening of air entrances and can be very high protective EMC clothing, etc. The shielding mesh 700 can protect against many kinds of RF fields and can offer a 1000-fold better shielding-performance and protection especially in the very high GHz range as compared to various other types of shielding mesh. The shielding mesh 700 provides high screening within the air permeable EMC screening materials. Application examples of the shielding mesh 700 include: Radio & TV, TETRA, ISM434, LTE800, ISM868, GSM900, GSM1800, GSM1900, DECT, UMTS, WLAN, etc.

Figure 35:
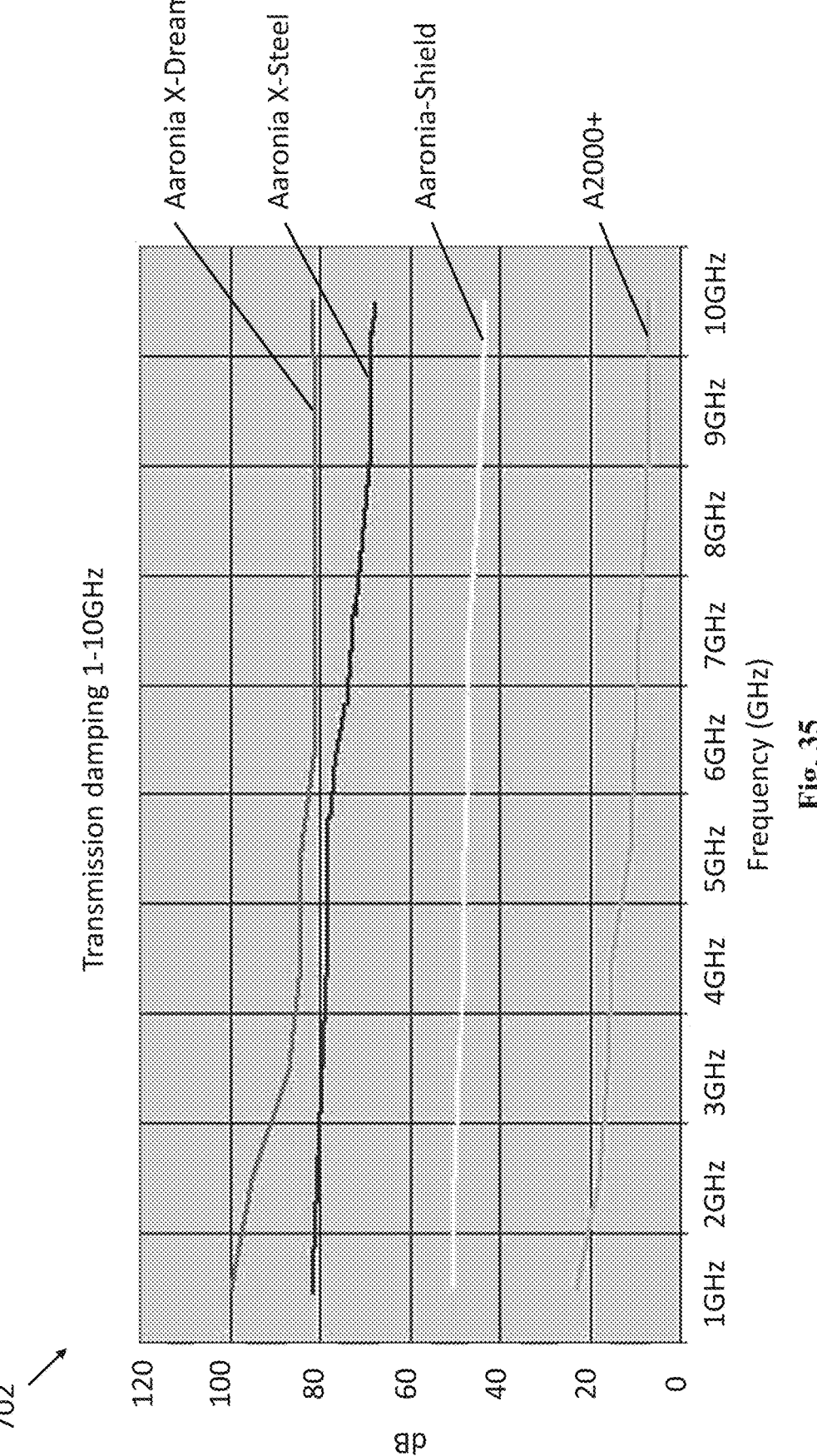
FIG. 35 is a transmission damping chart of the shielding mesh according to FIG. 33.

FIG. 35 shows a transmission damping chart 702 for various shielding mesh examples from 1-10 GHz in terms of dB for the mesh 700 of FIGS. 33 and 34. As shown, four shielding meshes are depicted. As shown, in descending order for transmission damping across 1-10 GHz, are Aaronia X-Dream, Aaronia X-Steel, Aaronia-Shield, and A2000+.

Figure 36:
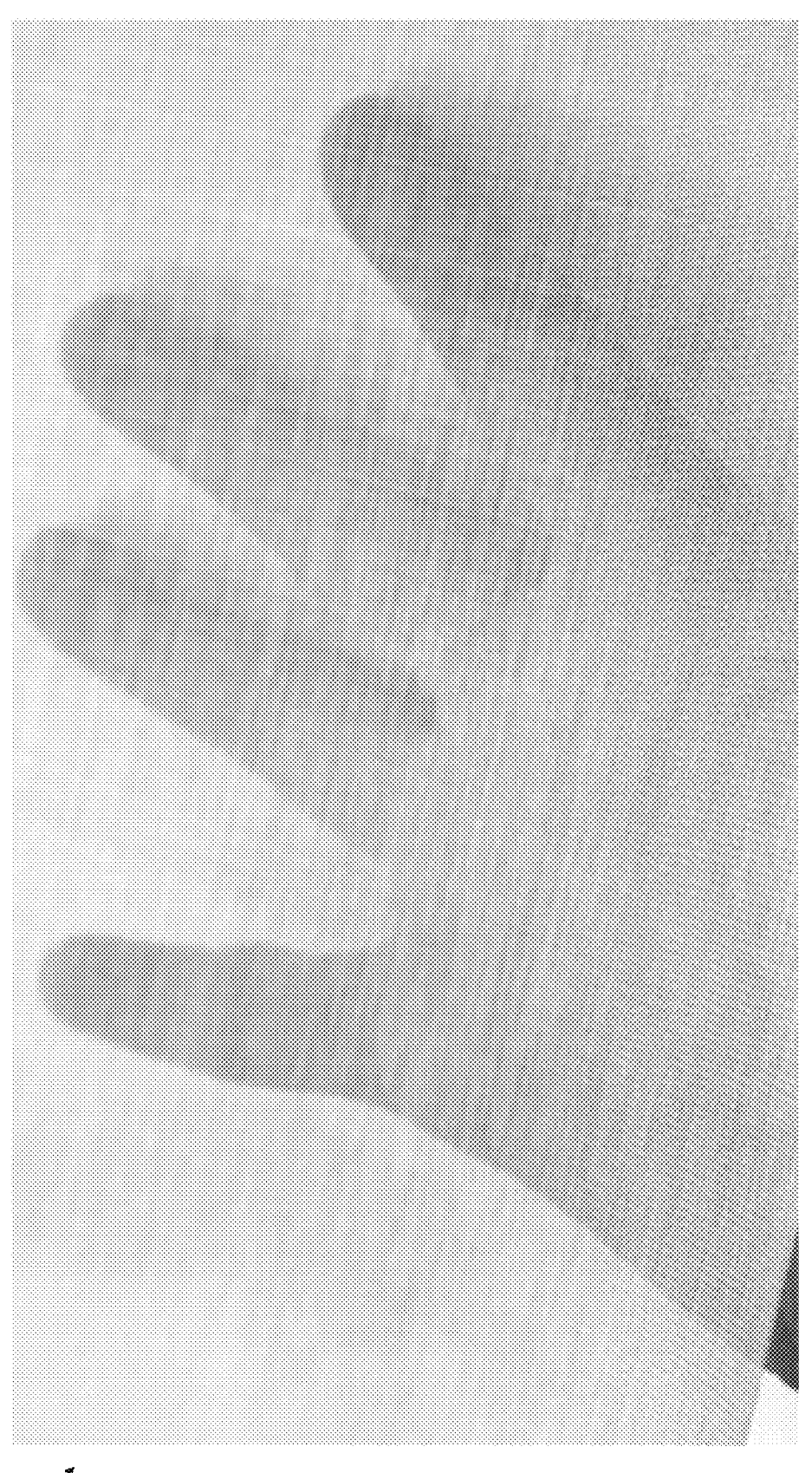
FIG. 36 is a detail view of another shielding mesh according to various embodiments.
Figure 37:
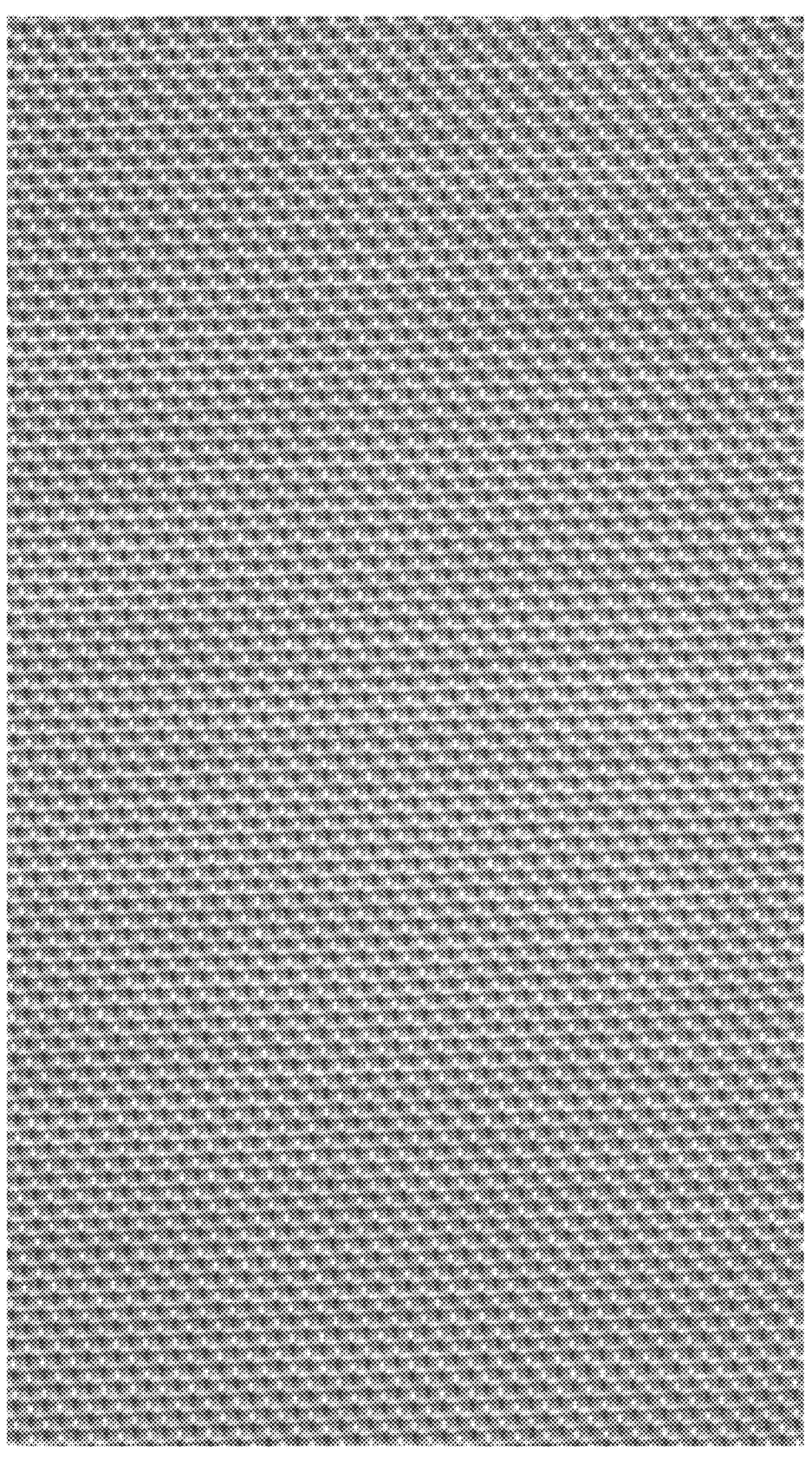
FIG. 37 is another view of the shielding mesh of FIG. 36.

FIGS. 36 and 37 show another example shielding mesh, a fireproof shielding fabric mesh 800.

The fireproof shielding fabric mesh 800 can be sourced from Aaronia AG, and is a stainless steel EMC/EMF shielding mesh for usage under extreme conditions. The fireproof shielding mesh 800 is usable up to 1200° C., can be half transparent, has high attenuation, and is both odorless and rot resistant. The fireproof shielding fabric mesh 800 has microwave attenuation as follows: 108 dB at 1 kHz, 100 dB at 1 MHz, 60 dB at 100 MHz, 44 dB at 1 GHz, 30 dB at 10 GHz.

Some specifications of the fireproof shielding fabric mesh 800 include: lane Width: 1 m; thickness: 0.2 mm; mesh size: about 0.1 mm; color: stainless steel; weight: approx. 400 g/m; usable until about 1200° C.; yield strength: 220 MPa; tensile strength: 550 MPa; hardness: 180HB; can be breathable; odorless; transparent; rot resistant; frost proof; washable; foldable; bendable; mesh material: stainless steel.

The fireproof shielding fabric mesh 800 has screening performance for static fields of: 99.9999% to 99.99999% (e.g., when grounded). The fireproof shielding fabric mesh 800 has screening performance for low electric fields of: 99.9999% to 99.99999% (e.g., when grounded).

The fireproof shielding fabric mesh 800 is suitable for industrial applications as well as for research and development. The fireproof shielding fabric mesh 800 has been specifically designed for use under adverse conditions (salt air, extreme temperatures, vacuum, etc.).

The fireproof shielding fabric mesh 800 is made of 100% stainless steel, is temperature stable up to 1200° C., has a high microwave attenuation, and yet is breathable. The material of mesh 800 absorbs reliable E&H fields. In particular, in the kHz and low MHz range mesh 800 offers a high shielding factor of up to 108 dB (E-field). Mesh 800 is easy to process and can be cut with a standard pair of scissors.

Figure 38:
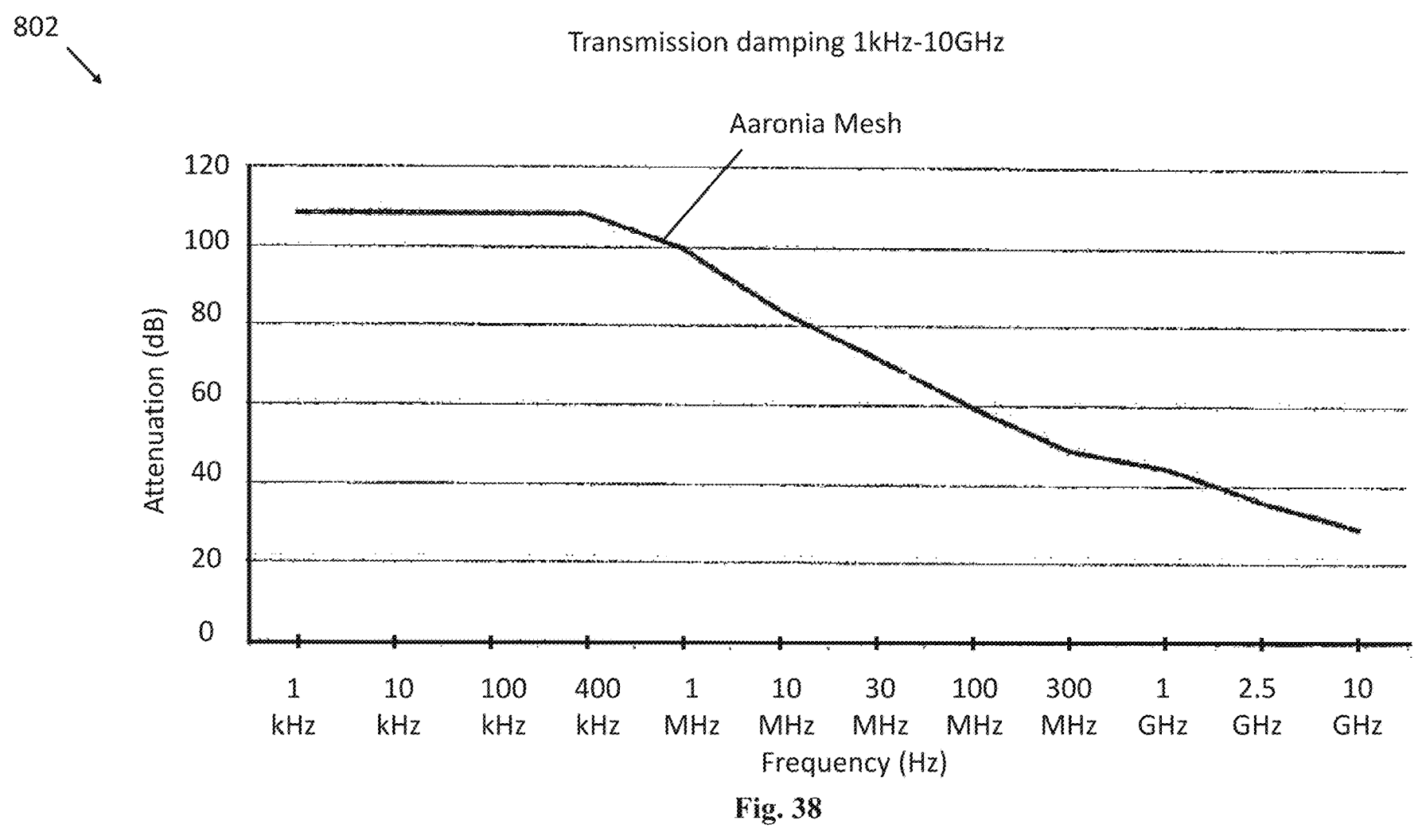

FIG. 38 is a transmission damping chart 802 from 1-10 GHz in terms of dB for the fireproof mesh 800 of FIGS. 36 and 37.

Figure 39:
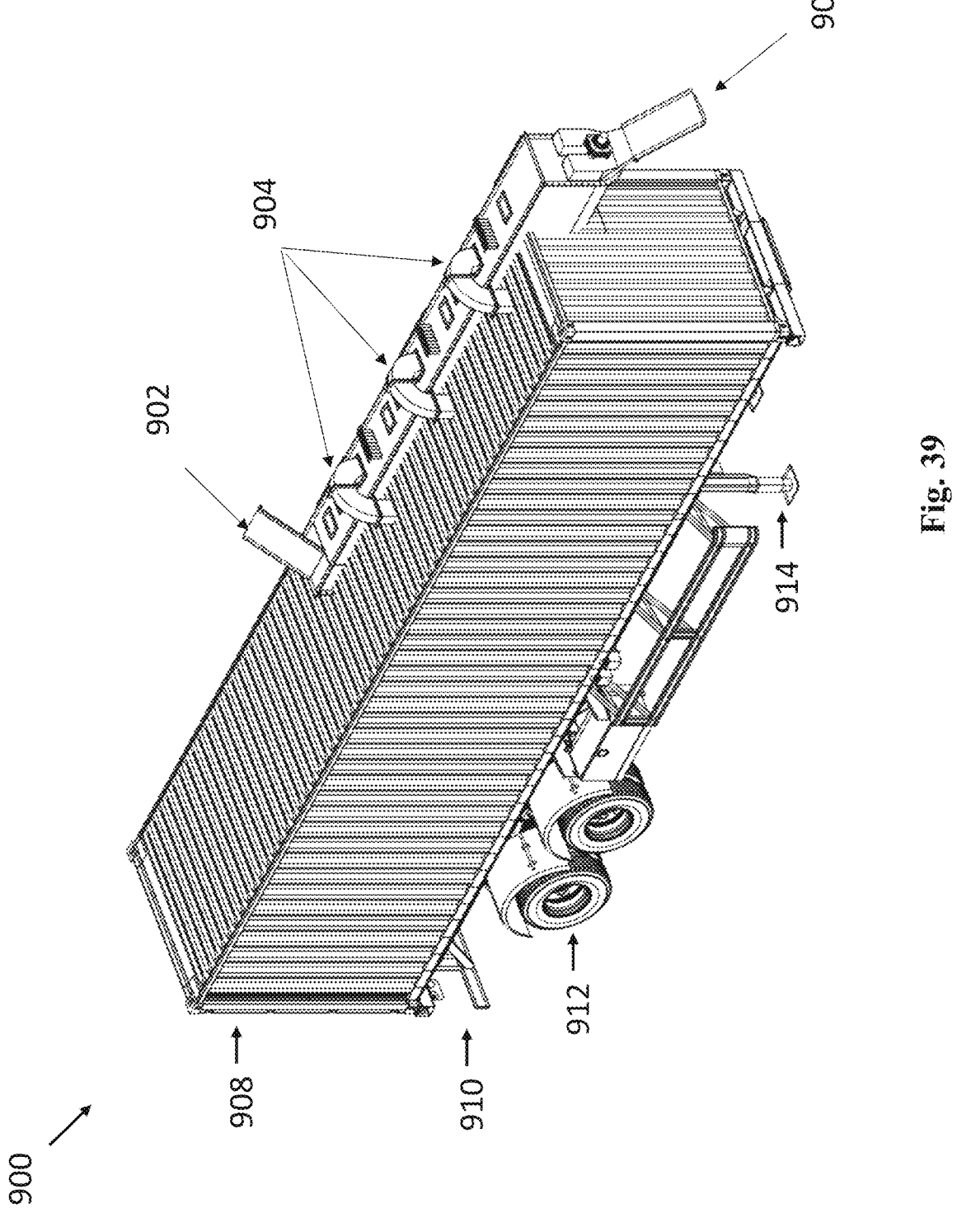
FIG. 39 is a perspective view of another embodiment of a portable, continuous waste processing system.

FIG. 39 is a perspective view of another embodiment of a portable, continuous waste processing system 900. The system 900 includes a trailer 910 with wheels 912, and a body 908. The body 908 is preferably supported by the trailer 910 and can be removable therefrom in some embodiments. The body 908 can be a shipping container or a modified shipping container in various embodiments. As described in other embodiments herein, the system 900 includes an inlet 902, one or more microwave waveguides 904, and an outlet 906, in addition to preferably including one or more microwave generators (not shown) internally to the body 908. The trailer 910 is also equipped optionally with one or more stabilizers 914, which can be used for leveling the system 900 when a tractor or truck (not shown) is removed from the trailer 910. The stabilizers 914 can be telescopic and adjustable in length. The system 900 is preferably substantially level when prepared for waste heating operation. As the system 900 is portable and/or towable, it is easily transported between various waste processing sites and/or facilities. Smaller and/or scaled down versions of the system 900 can meet certain target temperatures and heating times according to certain physical and mechanical limitations and constraints.

With reference to portable systems such as 900, in some embodiments a municipality or facility can be equipped with an auger configured to deliver waste from a centrifuge. In some cases, a clearance height of the auger can be insufficient to get system 900 unit under auger. An additional conveyor can in such cases be implemented to bridge a gap or otherwise connect a facility to the system 900. Therefore it is contemplated that some additional form of material handling equipment can be used to adapt system 900 to an existing system or facility.

As described herein, waste material is an example of material to be heated and/or processed as described herein. Waste, such as human and/or animal waste, or any liquid, solids, or slurries thereof, can be heated and/or processed using microwaves as described in further detail below. Animal waste material as used herein can include waste produced by animals, such as manure and/or urine produced thereby, but can additionally or alternatively denote animal various parts of the animal itself or products derived therefrom, e.g., during butchering or processing of animals parts, meat, entrails, etc.

In various embodiments, this disclosure relates to methods and systems for processing and/or heating waste material using microwaves. Waste, material, or waste material as used herein include biowaste, biosludge, human waste such as fecal matter, municipal waste, and waste activated sludge obtainable or obtained from aqueous waste streams, among other types of waste material. Also contemplated herein is the production of various products prepared from waste material, such as solid protein feed products, and methods of preparing such products. Disclosed methods are useful in that they can enhance waste and water remediation and provide for a raw material that may be used for the production of various products, including for example an animal feed, a human food product, and/or a fertilizer. Therefore, waste material can be treated and reused in some form following treatment.

Disclosed methods for processing waste materials obtainable from wastewater or municipal waste processing plants are useful in that they provide novel waste activated sludge preparations that are substantially free of live microbial organisms and optionally contain a high content of digestible protein.

Figure 43:
FIG. 43 is a perspective view of an example waste processing system used for testing, according to various embodiments.

In testing by Applicant, an example waste processing facility 1300 was identified that would benefit from a way to kill pathogens in received waste (e.g., biowaste). An example of such treatment facility 1300 is shown at FIG. 43. Received waste can include human waste, e.g., 10% human waste or any suitable type of flowable waste containing at least some water or moisture. The waste material can be a waste sludge received from any residential, commercial, or industrial site or process. The waste material can contain any suitable liquid, flowable, or semi-liquid waste product. Examples of the waste can be carried and flowed with water, and can include at least some animal manure in sludge form. Once the pathogens in the biowaste are neutralized from heating the biowaste can be repurposed, e.g., sold for land application among other uses.

Disclosed microwave waste heating systems such as described herein is an ideal candidate for treatment of the received biowaste. One example tested by Applicant was sewage sludge. The ambient temperature was about 30° F. (−1° C.) and a test run of roughly 6,000 lb (2,722 kg) of material was processed. The test was configured to determine the moisture/volume reduction of the waste material (sludge), and to create an output product that meets specific requirements for land application.

One such example of specific requirement for land application reviewed were the Wisconsin Sewage sludge treatment specifications according to State of Wisconsin (WI) Department of Natural Resources (DNR) NR204.03, which are hereby incorporated by reference for all purposes. The treatment of sewage sludge for most states is outlined in the United States Environmental Protection Agency (EPA) Section 503.32, which is also hereby incorporated by reference for all purposes. Furthermore the entireties of the WI DNR NR 204 and EPA Section 503 standards are incorporated by reference in their respective entireties for all purposes.

Based on the WI DNR NR204 and/or EPA Section 503, Applicant determined that systems and methods of the present disclosure can produce a "Class A-Alternative 1" product that is described best in section B, which reads, "[w]hen the percent solids of the sewage sludge is seven percent or higher and small particles of sewage sludge are heated by either warmed gases or an immiscible liquid." Then, the treatment for the waste sewage in question must, according to NR204.03, follow the following requirements, "the temperature of the sewage sludge shall be 50 degrees Celsius or higher; the time period shall be 15 seconds or longer; and the temperature and time period shall be determined using equation (2)." Equation 2 is represented in the time temperature table shown in table 1000 of FIG. 40. The duration for the biowaste to pass through the auger/conveyor unit is roughly 5 minutes which makes the target achieved temperature for the process above 170° F. (77° C.). This temperature provides a reasonable safety factor to ensure full treatment of the biowaste. It is noted that the specifications for metals and pathogens in the final product are the substantially the same in both NR 204.03 and EPA Section 503.32.

One goal during testing was to process and treat the biowaste so that it passes the specifications for land application in EPA section 503.13. Another goal of the project is to reduce the received volume of the waste product to increase the storage capacity of the processed waste product. This is done through the removal of water and processing of the waste product. An example biowaste treatment or processing facility includes of five microwave generator units as described herein. In one example, three 100 kW microwave generator units and two 75 kW microwave generator units were used. Therefore, in this example, the microwave waste processing system has a total maximum output of 450 kW. Variations as to the number, power, and configuration of the microwave generators are also contemplated. More total power in some examples can allow for greater treatment of received waste and can kill a higher percentage of pathogens present in the waste material in various embodiments. Embodiments of the system include an air handling system to remove air, gas, steam and the like and blow it out of a building housing the microwave waste processing system.

After processing by the example microwave waste processing system described above, the treated waste product (e.g., from biosludge/biowaste), tests were performed to determine if all the requisite EPA specifications were achieved. In one test, a sample of the treated biowaste product exited the augur/conveyor unit of the microwave waste processing system at a temperature between 170-175° F. (77-79° C.) with some readings inside the augur/conveyor unit having temperatures more than 180° F. (82° C.). The results and limits can be seen summarized in table 1100 shown in FIG. 41. As shown, in table 1100 it was determined that the metals were under the required limit for land application, and the organic compounds were all reported as trace amounts lower than the detection limit of the test equipment. As used in table 1100, <denotes that a reading was below a minimum certainty of the testing equipment, thus the result is reported as less than the minimum detectable amount. For land application, the metals in the final product must be below the limits in Table 3 of EPA Section 503.13. Furthermore, the Fecal Coliform Bacteria count was under the required limit of "1000 Most Probable Number per gram of dry solids" as listed in EPA Section 503.32 Class A-Alternative 1 B. Based on the above, it is evident that the microwave based waste processing system was effective in treating and pasteurizing the biowaste to a level suitable for land application, including according to various standards and regulations.

Information about the rates and moisture reduction of the bio sludge is shown in table 1200 of FIG. 42. As shown, the overall reduction in pile size was visually estimated to be around 35-40% after the processing. This estimated percent reduction is similar to the reduction of loader buckets of material in the pile before and after microwaving. The piles continue to release steam and slump as they cool over a period of time, e.g., week. The effects may be beneficial. As used in table 1200, "*" denotes that a temperature/time requirement according to the desired specification was not reached so as to kill pathogens and IR refers to infrared radiation.

Based on the information it was determined that the microwave system was working at approximately 43% efficiency as compared to theoretical values. Higher levels can be achieved by improving thermal absorption of the microwaves by the waste material, improving seals, and/or improving thermal insulation of the various components. Example waste was estimated to be roughly 80% water. Therefore, a high volume of steam can be generated during processing. Non-evacuated steam can absorb the microwave energy while it remains in the conveyor unit. Increased ventilation of the produced steam is therefore desirable to remove the steam from the conveyor unit housing. Ventilation can be selected and tuned based for example on a number of vents, vent location, and/or volume of flow (e.g., cubic feet per minute or cubic meters per second). In preferable configurations, the ventilation is configured such that ventilation airflow picks up minimal physical matter within the conveyor unit housing in the process. In preferable embodiments, the configuration is designed such that only a minimum of produced steam condenses on the conveyor unit housing, which can otherwise allow water to drip back into the waste sewage sludge being heated.

In preferable embodiments, and where ambient temperatures are relatively low, the conveyor unit can be thermally insulated to better maintain heat, which can increase efficiency significantly. Steam heat exchangers may be well-suited for implementation so as to improve overall system efficiency. Improvements to efficiency are desirable for many reasons. For example, a more efficient system can handle larger volumes of waste, and can decrease pasteurization time due to higher resulting temperatures, or alternatively can use less power to obtain the same heating rate.

The fatty nature of certain waste such as a sewage product makes it sticky on the conveyor unit housing, e.g., steel. A non-stick coating such as Teflon can therefore be beneficially applied to the conveyor unit case to reduce or prevent the sticking of the waste. In addition or in the alternative, side walls of the conveyor unit housing can be cleaned continuously or periodically according to various embodiments.

With respect to some types of municipal waste and wastewater in particular, wastewater can be contaminated by human, human-derived or related, or any other waste. Waste of various forms often has a high pure water content, but the water requires substantial processing before it can be usable water because it typically contains human waste and other harmful contaminants, such as, for example, hazardous heavy metals, organic poisons, microbiological infective organisms, pharmaceuticals, medications and hormones.

Wastewater itself can be treated according to various embodiments described herein. Currently, there are a variety of systems used in the treatment of wastewater. Some large municipal applications provide an integrated process of filters, oxygenators, settling tanks, clarifying tanks and digesters. In addition, some processes use ultraviolet (UV) light for destroying estrogens and hair products, chemical additives, carbon filtration to control odor, micropore filters with multiple barriers to decrease the dangers of infection, and ozone for color removal to achieve pureness and to add clarity to the water. These treatment processes generally comprise a biological format, using microorganisms contained in an active biomass for the removal of biological oxygen demand (BOD, organic carbon compounds) and chemical oxygen demand (COD), phosphorous and or nitrogen from wastewater. In some embodiments, water can be an undesirable byproduct of waste processing, and in further embodiments water can be cleaned and processed using the microwave based waste processing systems described herein.

Furthermore, current wastewater systems may use multiple levels of treatment incorporating the processes described above, including, for example, preliminary treatment, primary treatment, and secondary treatment processes. While the existing treatment systems may produce usable water, it can be a long and rather complicated process for purifying a supply of wastewater. One of the major issues that has to be addressed in wastewater treatment is the public discomfort of turning wastewater into drinking water.

Microwave heat can be used to achieve gasification of solid waste materials. Many sources of heat have been used, including fossil fuels, optic treatment of solar energy, electric energy and plasma generators. The use of a plasma generator for the disposal of municipal solid waste (refuse, garbage and, although there is no data available, it has been suggested that in Japan, solid waste residual) has been accomplished. Generally speaking, municipal solid waste systems are composed of a plasma generator as the gasification tool and a myriad of processes to achieve the disposal, including: the feed of solid waste, maintenance of waste temperature (e.g., Joule Bath), the removal of gases from the volatile materials, as well as the reduction of non-combustibles (e.g., glass and metal) to inert slag which is drained and disposed of. The resultant hot gases may then drive appropriate energy conversion means such as a turbine generator and may be scrubbed or otherwise purified before being allocated for further use or released to the atmosphere.

Wastewater treatment uses biological/mechanical processes that are generally complex and require a lot of time and energy to isolate usable water from the contents of the wastewater.

By heating various waste materials using microwaves as described herein, concurrent with moisture reduction, pathogen reduction preferably also simultaneously occurs. Previously, processing Class "A" biosolids has been reliant on natural gas and Liquid Petroleum Gas (LPG) fired drum dryers and vertical chamber incinerators which at best, are still inefficient. The cost involved in owning and operating these methods have made it impractical for waste water facilities to process Class "A" biosolids, whereas microwave heating processes described herein operate at greater efficiency. If waste water biosolids or sludge can be treated to meet Class "A", Alternative "6," (40 C.F.R. 503) the generators or waste water facilities can do anything with the end product, such as: give biosolids away, or market the biosolids without any restrictive regulations. The microwave thermal processes therefore not only complete a total or substantially total pathogen kill, but also reduces the amount of moisture content, which results in less tonnage to be removed from the facilities.

In fact, it is envisioned that both decrosslinking and depolymerization reactions are contemplated and within the scope of this disclosure. In one such embodiment, waste organic materials, such as scrap tires, are gasified by the application of microwave and convection energy using a continuous, self-aligning, porous, 6 ft (1.82 m) wide stainless steel 304/316 type belt with 2 in (5.08 cm) material retaining sides and 24-28% open area, to produce a stable product which comprises essentially ethane and methane. In some embodiments, any ethane and/or methane produced can be captured, stored, and preferably prevented from escaping to the environment.

Embodiments described herein can mechanically and biologically introduce microwave excitation of water molecules inside the waste biosolid material by subjecting the waste material to high frequency radio waves in the ultra-high frequency (UHF) band. The pathogens and polar water molecules in the material can attempt to align themselves with the oscillating electric field at a frequency of 915 MHz or approximately every millisecond. The pathogens or molecules within the pathogens cannot align themselves synchronously, creating an atmosphere of excitement, which causes heat and explodes the pathogens structurally.

When excited by microwave energy, not only do the pathogens self-destruct, the attached water molecules of the pathogens release the moisture as water vapor as described herein. The chamber can be heated in some embodiments above the boiling point of water, which allows the vapor to rise with the help of induction and exhaust ventilation fans and removes vapor from biosolids material out into the atmosphere (or other location as desired). Once the biosolid material has exited the microwave chamber, all pathogens are preferably destroyed and the material no longer has a vector attraction. This result would not only meet but also exceeds all requirements for Class A, Alternative "6" of 40 C.F.R. 503; entitled specification for Process to Further Reduce Pathogens (PFRP).

However, for the ability to process various and different materials in this system is a function of the microwave generator(s) and the material being processed (load). In this manner, the same product is capable of processing virtually any of the solid hydrocarbon materials identified; i.e., scrap tires, mixed plastics, automobile shredder residue (ASR), roofing shingles, construction/demolition waste, medical waste, municipal solid waste (MSW), and PCB/PAC/HCB-laden or fuel-laden soils and aggregates within the same applicator unit.

Applicant hereby also incorporates by reference 40 C.F.R. 503 in its entirety, including the Biosolids Laws and Regulations and all content of the Clean Water Act of 1972 and its amendments. Applicant also further incorporates by reference 21 C.F.R. 112 in its entirety, including Standards for the Growing, Harvesting, Packing, and Holding of Produce for Human Consumption and all amendments and any amendments thereto. Applicant further incorporates any and all European standards for the treatment of waste, including Directive 2008/98/EC of waste (Waste Framework Directive) Directive 91/271/EEC, and Directive 86/278/EEC.

The manufacture of many industrially made products involves the use of water, resulting in the generation of an aqueous waste stream as a by-product of the manufacturing process. Prior to disposal of an aqueous waste stream, environmental regulations frequently stipulate that organic pollutants be removed from the waste stream. Strategies to remove pollutants include aerobic biological water treatment, e.g., by cultivating microbial organisms to convert the pollutants present in the aqueous waste stream and produce carbon dioxide, water and microbial cell mass.

A typical aerobic biological wastewater treatment process involves the cultivation of microbial cells within an aeration reactor comprising the aqueous waste and microbial cells grown in suspension in the aqueous waste. Often, wastewater is delivered continuously to the aeration reactor(s). The cellular suspension (known in the art as the "mixed liquor") overflows into a solid-liquid separator (e.g. a clarifier or membrane based system), generating a clear effluent and microbial mass. This microbial mass may be returned to the aerobic reactor(s) (known as return activated sludge, or "RAS") or it may be removed from the system and wasted; this solid waste is also known to the art as "waste activated sludge" or "WAS." The effluent is discharged in a local waterway, injected underground or discharged in any other appropriate manner, and the microbial mass is commonly in part returned to the aeration reactor, and in part disposed as solid waste.

The wastewater treatment processes of the prior art exhibit significant drawbacks. The waste activated sludge (WAS) component must be disposed of, and disposal costs reflect a significant cost component in the operation of a wastewater plant. Thus, in most instances, waste treatment or processing plants are constructed and operated in such a manner that minimal costs are incurred in processing wastewater, with the goal of reaching a point that the wastewater and/or the waste activated sludge meets the minimal applicable requirements for disposal. It is a conventional objective of wastewater treatment operations to minimize the production of waste solids. Most commonly, this is achieved by holding the microbial cells within the system for an extended period where they will die, lyse, and be converted into carbon dioxide via microbial pathways and oxidation.

It is known in the art that waste activated sludge may be used as a raw material in the manufacture of valuable products, e.g. animal feed products. In another process, the waste activated sludge is subsequently dewatered and dried after being removed from the wastewater treatment process to produce a fertilizer (a representative example of this is Milorganite® fertilizer that is manufactured and sold by the Milwaukee, Wis. sewerage district). Most commonly, this conversion to a fertilizer product is achieved by drying the waste activated sludge that was held within the wastewater treatment system for an extended period where microbial cells will die, lyse, and be converted into carbon dioxide via microbial pathways and oxidation 1) at high temperatures (often as high as 300° C.). Exposing it to a high dose of microwaves is another option. As a result, potentially beneficial constituents of the microbial cells such as protein, vitamins, and coenzymes are damaged and/or destroyed by the cellular production method, heat, or excessively high amounts of radiation. These processes significantly improve wastewater treatment economics. However, process steps are ordinarily not conducted in typical wastewater treatment facilities designed to process wastewater strictly to disposal standards.

The operation of wastewater facilities intended strictly for disposal purposes does not involve the performance of the above steps (i.e. for producing animal feed products or fertilizer) and will. Indeed, some examples involve dewatering the waste activated sludge, followed by drying through heat treatment using temperatures between 55° C. and 105° C. for less than a day. The processes provided in the '806 patent employ higher temperatures within the prescribed temperature range, i.e. at about 105° C., such that reductions in live bacterial cell content and reductions in water content are achieved; however, the exposure of substantially dewatered waste activated sludge to the higher temperatures within this range, e.g. at about 105° C., can result in a substantial reduction of protein digestibility in the waste activated sludge, which in turn can affect the quality of the dried product. In particular, protein digestibility can be affected and this can limit the utility of the dried waste activated sludge as a raw material for the production of high quality animal feed products. On the other hand, at the lower temperatures within a prescribed temperature range, e.g., at about 55° C., the protein structure may be less compromised. However, drying can require a much longer period of time, and, importantly, can result in dried product which will contain a substantial viable bacterial load. The latter provides a dried waste activated sludge product which will be difficult to preserve and/or may not meet the safety standards required for the raw materials used for, for example, the manufacture of feed products. Additionally, the equipment required to dry large quantities of waste activated sludge at about 55° C. can be very large and/or prohibitively costly.

Conventional wastewater treatment facilities are designed to process wastewater strictly to disposal standards, where the microbial cells are removed from the system as late as possible (i.e., the cells are aged for as long as possible), or not at all, in order to convert as much of the microbial cell biomass to carbon dioxide as possible. The objective of conventional wastewater treatment facilities is to minimize the production of waste products is much as possible. Furthermore, in order to render waste activated sludge useful for the manufacture of products, it is important to reduce its water content and the live bacterial load present therein.

In some embodiments, the present disclosure relates to methods of processing waste activated sludge, and to methods generally involving deactivation of the microbial cells present in the waste activated sludge while maintaining valuable cellular constituents, which may be accomplished by microwave-based thermal treatment of waste activated sludge. The performance of methods of thermal treatment, in accordance herewith involves heating the microbial cells. The use of mechanical methods of deactivating the microbial cells, in accordance herewith involves exposure of the microbial cells to a rapid pressure drop or to ultrasonic cavitation. The use of radiation methods, in accordance herewith involves the use of microwaves.

As described herein, there is provided at least one embodiment of a method that is beneficial in that it provides a dried waste activated sludge product substantially free of live microbial cells and, can comprise large quantities of digestible protein. A dried waste activated sludge product substantially free of live bacteria and, in addition, rich in digestible protein is desirable.

In some embodiments, aspects of the disclosure are directed to methods of producing a solid protein feed product from waste water that include growing microbial cells in an aqueous waste stream to produce waste activated sludge. The waste activated sludge can be characterized as having solid content as well as water/liquid content.

The method can further include dewatering the waste activated sludge to a solids content of about 9-28 wt. % solids; drying the dewatered waste activated sludge to a solids content of about 80-90 wt. % solids; and sterilizing the waste activated sludge before, during, or after said dewatering or drying to provide a solid protein feed product which is commercially sterile, whereby protein quality of the solid protein feed product is substantially unchanged from that of the waste activated sludge prior to sterilization and drying.

As disclosed herein, sterilizing is by microwave radiation. In some embodiments, after said sterilizing, no single viable microbial species is present in amounts in excess of about 50 (colony forming unit) cfu/g. In some embodiments, after said sterilizing, no single microbial species is present in amounts in excess of about 10 cfu/g. In some embodiments, said sterilizing is by heating at a temperature of from about 120° C. to about 160° C. In some embodiments, the residence time (calculated merely by measuring the time that the solid protein feed product is exposed to inactivation conditions) during said sterilizing is less than about 20 minutes.

As discussed above, and in some embodiments, said sterilizing is by microwave radiation. In some embodiments, a wavelength of the microwave radiation ranges from about 915 MHz to about 2,450 MHz, and a microwave power of each microwave generator ranges from about 50 kW to about 150 kW. In some embodiments, said sterilizing occurs after a drying step.

In some embodiments, the method further includes a step of adding an additive or preservative to the waste activated sludge. In some embodiments, the preservative is selected from the group consisting of acids, bases, humectants, bactericidal agents, fungicidal agents, and any combination thereof.

In some embodiments, the water content of the solid protein feed product is 10% or less, and digestible protein content of the solids content is at least about 40 wt. %. In some embodiments, the digestible protein content of the solids content is at least about 50 wt. %. In some embodiments, the digestible protein content of the solids content is at least about 60 wt. %. In some embodiments, the digestible protein content of the solids content is at least about 70 wt. %. In some embodiments, the digestible protein content of the solids content is at least about 80 wt. %. In some embodiments, the digestible protein content of the solids content is at least about 90 wt. %.

In some embodiments, the protein feed product meets one or more regulatory standards. In some embodiments, the protein feed product is classifiable as a feed as defined in the "CODE OF PRACTICE ON GOOD ANIMAL FEEDING" ("Code") of the Food and Agriculture Organization of the United Nations. The "Code" defines a feed as any single or multiple materials, whether processed, semi-processed or raw, which is intended to be fed directly to food producing animals.

The term "aqueous waste stream," "wastewater stream," and variants thereof, as used herein are examples of waste material contemplated herein, and can refer to any wastewater effluent including, but not limited to, any effluent from industrial manufacturing processes, municipal, commercial and domestic sources, and runoff water from rainfall or flooding. The wastewater streams used in accordance with the present disclosure include, but are not limited to, wastewater streams obtained from food manufacturing processes, including wastewater streams comprising food by-products and residuals which require the removal of such food by-products and residuals prior to release into the open environment, and further include, but are not limited to, wastewater streams relating to one or more of beverage production processes, including beer breweries, distilleries, fruit juice production facilities and the like, potato processors, citrate manufacturers, yeast producers, palm oil mills, wet corn and rice millers, sugar manufacturers, meat rendering processes and other food production processes that release food-grade biological oxygen demand into effluent water. "Biological oxygen demand" or "BOD" as used herein refers to the quantity of oxygen required to degrade contaminants biologically in wastewater. In general, the BOD correlates with the quantity of biologically assimilable organic material present in wastewater. In preferred embodiments, the aqueous waste stream comprises a BOD of at least about 200 mg per liter of food by-product and residual contaminants.

The terms "waste activated sludge" or "WAS," which may interchangeably be used herein, refers to microbial biomass grown using aqueous wastewater as a microbial growth medium. Growth techniques and methodologies for generating WAS typically involve the general steps of (i) microbial proliferation in a growth vessel or reactor, such as an aeration reactor, which is assembled to permit the use of an aqueous waste stream as a growth medium, (ii) separation of the microbial biomass from the aqueous effluent, using for example one or more settling tanks, clarifiers, membrane-based separation techniques or other processes and unit operations generally known to the skilled artisan, and (iii) removing a portion of the microbial biomass known as the WAS. Microbial proliferation is typically achieved by contacting the wastewater stream with microbial organisms, which may be endogenously present in the wastewater stream or exogenously supplied, preferably in one or more basins, in which oxygen is introduced to maintain aerobic metabolic conditions, for example by agitation and mixing. As noted earlier, WAS can be characterized as having solid content and water/liquid content.

Furthermore, the wastewater stream may be supplemented with nutrients, e.g. micronutrients and/or macronutrients, in order to stimulate microbial growth. The microbial organisms metabolize the waterborne contaminant residuals contained in the aqueous wastewater and convert these residuals to microbial biomass, in the process consuming energy (in the form of carbon contained in the wastewater stream). In order to separate the microbial organisms from the treated wastewater, the contents of the wastewater basins are typically allowed to settle in a clarifier basin. Alternatively growth and separation are carried out in the same vessel, e.g. by periodically altering the operating conditions (e.g. terminating agitation in the vessel thereby permitting settling of the microbial mass). Other systems for separation may also be used, for example, membrane based bioreactors, involving the use of filters to separate the microbial organisms, or dissolved air floatation, may also be used. A portion of the microbial organisms is then typically returned to the aeration basin(s) to maintain a high concentration of microbial organisms therein, while the remaining portion is collected as waste activated sludge in accordance herewith. The collected waste activated sludge can comprise from about 1% to about 2% solids and from about 98% to about 99% water.

In some embodiments, the microbial proliferation process is carried out under essentially aerobic conditions. The term "essentially aerobic conditions" is intended to refer to conditions where the growth of the microbial organisms under conditions where oxygen supply is controlled by aeration in such a manner that predominant growth of microbial species digesting carbon in an aerobic manner is promoted. While some anaerobic growth may occur, such growth is preferably limited to less than 50%, more preferably to less than 25%, and most preferably to less than 10%. Typically in order to achieve essentially aerobic growth conditions a supply of oxygen to the aqueous waste stream in an amount of at least 0.5 ppm, more preferably at least 1-2 ppm is required. The microbial organisms produced under essentially aerobic conditions are also referred to as "aerobic microbial organisms." Two operating parameters that are of particular import in microbial proliferation are the "mean cell residence time" or "MCRT" and the "mean waste residence time" or "MWRT." The MCRT can be calculated by dividing the total mass of microbial organisms in the wastewater treatment process by the mass of the microbial organisms removed (or wasted) per unit time. The total mass of microbial organisms in the process can be measured by various conventional methods, for example by removing samples of known volume from the aerobic basins and clarifiers, filtering the microorganisms out of the wastewater sample using a membrane filter with a nominal pore size of approximately one micron, drying the filter and captured cells, calculating the mass of microbial organisms in the samples, and extrapolating the mass of the microbial organisms in the samples to the mass of the microbial organisms in the total volume present in the process. "Residence time" of other systems (for example, within a conveyor unit in which material is constantly added and removed, can be calculated by dividing the total mass in the system at any instant by the rate at which mass is removed.

As used herein, a conveyor or conveyor unit can be any vessel or mechanism that moves waste material from an inlet to an outlet. The waste product or material being heated can be carried in various examples by another type of conveyance mechanism, such as by an auger or various types of conveyor belts. Therefore, in some alternative embodiments a conveyorized modular industrial microwave power system can be employed instead of an auger-based system such as system 100. A conveyor unit can also be referred to more generally as an auger herein.

Based on power requirements, two or more microwave power modules or heating units can be installed on the same conveyor. To assure uniform heat distribution in a large variety of load configurations, a multimode cavity can be provided with a waveguide splitter with dual microwave feed points and mode stirrers.

In embodiments that use a conveyor belt, a belt material and configuration are selected based on the nature of the product being heated. Each end of the conveyor is preferably also provided with a special vestibule to suppress any microwave leakage. Air intake and exhaust vents or ports are provided for circulating air to be used in cases where vapors or fumes are developed during the heating process.

Unlike home microwave ovens, example industrial microwave-based heating systems contemplated herein preferably separate microwave generation from a heating/drying cavity such as a trough or housing. An example industrial microwave heating system can be constructed to use one or more microwave generator units. Example microwave generator and heating units come in 75 kW and 100 kW (output power) models. Using special ducts called waveguides or microwave guides, the microwave energy is carried to one or more industrial microwave cavities. In a conveyor belt-based embodiment, a conveyor belt, auger, etc. carries the product through the cavities. A simple example system may include one microwave generator and one cavity, while a larger and/or more complex system may have a dozen generators and six cavities. This inherent modularity provides great flexibility in scaling a system, or building systems, which can be easily expanded in the future.

Certain example embodiments of the present disclosure are described as follows. According to an embodiment herein a method of processing waste material comprises receiving a quantity of waste material at a first conveyor unit provided in a first housing. The method also comprises performing a first processing step to the quantity of waste material within the first conveyor unit using at least one microwave generator coupled to the housing of the first conveyor unit, wherein the waste material is heated within the first conveyor unit.

In optional embodiments, the method also comprises receiving the quantity of waste material at a mixer, wherein a mixing step is performed to the waste material within the mixer. In further optional embodiments, at least some of the waste material is crushed or reduced in size before or during the first processing step. In further optional embodiments, the method further comprises receiving the quantity of waste material at a second conveyor unit provided in a second housing; and performing a second processing step to the quantity of waste material within the second conveyor unit using the at least one microwave generator coupled to the housing of the second conveyor, wherein the waste material is heated to a greater temperature in the second processing step than in the first processing step. According to various embodiments, the method further comprises receiving the quantity of waste material at a third conveyor unit provided in a third housing; and performing a third processing step to the quantity of waste material within the third conveyor unit using the at least one microwave generator coupled to the housing of the third conveyor, wherein the waste material is heated to a greater temperature in the third processing step than in the first or second processing steps. In yet further embodiments, the quantity of waste material received at the mixer is received from a conveyor unit, and wherein the waste material enters a different conveyor unit after exiting the mixer. In further embodiments, the at least first conveyor unit comprises a number and arrangement of conveyor units selected such that a desired result is reached. In further embodiments, at least two conveyor units are arranged in series. In further embodiments, at least two conveyor units are arranged in parallel. In further embodiments, a processing speed of the at least one conveyor unit is adjusted based on the series or parallel arrangement. In further embodiments, the processing speed can be reduced to increase heating, or can be increased to reduce heating of the waste material in the at least one conveyor unit. In further embodiments, for a given processing speed, two or more conveyor units operating in parallel increases a waste material throughput based at least on the number of parallel conveyor units. In further embodiments, the method further comprises using a microwave radar of a frequency different than any heating microwaves to perform at least a level measurement. In further embodiments, based on the level measurement at least one of a processing speed and heating power is adjusted. Also contemplated herein is a product made by any system or method of any preceding claim.

Another method is contemplated herein. Specifically, a method for portably providing processed waste material upon demand is disclosed. The method comprises receiving a request for a first quantity of processed waste at a first location. The method also comprises determining that the first location has a first group of characteristics that include at least a distance from the first location to an external power source of a first power output. An example characteristic of the first location includes an availability and/or distance of an air-lift facility, airport, or helipad from the first location. The method also comprises deploying a portable system for processing waste material at the first location based on at least the first quantity of waste and the first group of characteristics. The first group of characteristics comprises at least one power generator configured to provide at least the first power output, at least one microwave generator operatively coupled to the power generator at least one conveyor unit configured to receive and process a quantity of waste material. The method further comprises applying microwave energy to the waste material within the conveyor unit of the portable system.

These and other advantages will be apparent to those of ordinary skill in the art. While the various embodiments of the invention have been described, the invention is not so limited. Also, the method and apparatus of the present invention is not necessarily limited to any particular field, but can be applied to any field where an interface between a user and a computing device is applicable.

The disclosures of published PCT patent applications, PCT/US2017/023840 (WO2017165664), PCT/US2013/039687 (WO2013166489), PCT/US2013/039696 (WO2013166490), and PCT/US2020/040464 (filed Jul. 1, 2020) are hereby incorporated by reference.

In alternative embodiments, example microwave suppression flap(s) can be rigid and non-flexible, but can be attached to top portion using hinges or any other articulating hardware as known in the art. Alternative hardware and flap fastening arrangements are also contemplated.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A system for continuously processing waste material, comprising:
    at least one microwave generator;
    a first conveyor unit;
    at least a first microwave guide operatively connecting the at least one microwave generator to the first conveyor unit;

the first conveyor unit provided in a first housing that comprises at least one opening configured to receive microwave energy via the first microwave guide; and at least one microwave suppression tunnel comprising at least one flexible and/or movable microwave reflecting component within the tunnel, wherein the microwave reflecting component is a mesh flap configured to absorb, deflect, and/or block microwave energy, wherein the first conveyor unit is configured to receive and continuously process a quantity of flowing waste material in accordance with a target specification, at a first processing step comprising heating the waste material, as it flows within the first housing, to a first temperature for a first time period to reduce contaminants of the waste material in accordance with the target specification, wherein the first processing step is configured to perform a sterilizing, pasteurizing, or other heat treatment of the waste material in accordance with the target specification, the system being configured such that contaminants of the waste material are reduced to or below a predetermined target level specified by the target specification, and the waste material is caused to be suitable for at least one of reuse, resale, disposal, and consumption, and wherein at least a portion of the at least one microwave reflecting component is configured to be deflected as the flowing waste material passes through the tunnel and then to return to a resting, closed position when the waste material is no longer passing through the tunnel.

2. The system according to claim 1, further comprising a second conveyor unit, the second conveyor unit provided in a second housing that comprises at least one opening configured to receive microwave energy via a second microwave guide, wherein the second conveyor unit is configured to receive the quantity of flowing waste material, and is further configured to heat the waste material within the second housing at a second processing step, and wherein the second processing step comprises heating the waste material to a second temperature.

3. The system according to claim 2, wherein the second temperature is equal to or greater than the first temperature.

4. The system according to claim 1, wherein the first temperature is at least 50 degrees C., and wherein the first time period is at least 15 seconds.

5. The system according to claim 1, wherein the first temperature is at least 98.9 degrees C.

6. The system according to claim 1, wherein the waste material comprises at least one of human waste, fecal sewage, animal waste, plant waste, food waste, contaminated waste, hazardous waste, industrial waste, semi-solid waste, solid waste, chemical waste, biowaste, biological waste, pharmaceutical waste, medication waste, hormone waste, biosludge, and waste-activated sludge.

7. The system according to claim 1, wherein after the first processing step, the waste material is substantially free of the contaminants.

8. The system according to claim 1, wherein the received waste material contains at least a first percent water by weight, and the first percent water by weight of the waste material is reduced to a second percent water by weight lower than the first percent water by weight during or after the first processing step.

9. The system according to claim 1, wherein a processing speed of the system is adjustable such that the processing speed can be reduced to increase heating and/or moisture reduction of the waste material, or can be increased to reduce heating and/or moisture reduction of the waste material being processed within at least the first conveyor unit.

10. The system according to claim 1, wherein the tunnel is either:

a) an inlet microwave suppression tunnel associated with an inlet of the first conveyor unit, or b) an outlet microwave suppression tunnel associated with an outlet of the first conveyor unit.

11. The system according to claim 1, wherein the first temperature is at least 50 degrees C., and wherein the first time period is at least 20 minutes.

12. The system according to claim 1, wherein the target specification is a waste regulatory specification.

13. The system according to claim 12, wherein the waste regulatory specification comprises a level meeting sewage sludge pathogen reduction requirements set forth in 40 CFR § 503.32.

14. The system according to claim 1, wherein the contaminants comprise microbial matter.

15. The system according to claim 14, wherein the microbial matter comprises pathogens.

16. The system according to claim 1, wherein at least one of the microwave reflecting component and the first housing is coated with a non-stick coating.

17. A method for continuously processing waste material, comprising the steps of:

receiving a quantity of waste material at a first conveyor unit, wherein the waste material passes through an inlet microwave suppression tunnel before entering the first conveyor unit;

continuously transporting a flow of the waste material along the first conveyor unit;

emitting microwave energy from at least one microwave generator operatively connected to a respective microwave guide, and heating the flowing waste material within a first housing of the first conveyor unit when the microwave energy is absorbed by at least a portion of the flowing waste material within the first housing, wherein the waste material is heated to a first temperature for a first time period at a first processing step to reduce contaminants of the waste material in accordance with a target specification;

performing a sterilizing, pasteurizing, or other heat treatment of the waste material in accordance with the target specification as part of the first processing step;

processing the waste material such that contaminants of the waste material are reduced to or below a predetermined target level of the target specification and the waste material is caused to be suitable for at least one of reuse, resale, disposal, and consumption; and causing the processed flowing waste material to exit through an outlet microwave suppression tunnel, wherein at least one of the inlet or the outlet microwave suppression tunnel comprises at least one flexible and/or movable mesh flap within the respective inlet/outlet microwave suppression tunnel, wherein the at least one mesh flap is configured to perform at least one of absorbing, deflecting, and blocking microwave energy, and wherein at least a portion of the at least one mesh flap is configured to be deflected as the flowing waste material passes through the respective inlet/outlet microwave suppression tunnel and then to return to a resting, closed position when the waste material is no longer passing through the respective inlet/outlet microwave suppression tunnel.

18. The method of claim 17, further comprising:

receiving the flowing waste material at a second conveyor unit provided in a second housing; and performing a second processing step to the flowing waste material within the second housing using the at least one microwave generator coupled to the second housing of the second conveyor unit, wherein the second processing step comprises heating the waste material to a second temperature.

19. The method according to claim 17, wherein the target specification is a waste regulatory specification that comprises a level meeting sewage sludge pathogen reduction requirements set forth in 40 CFR § 503.32.

20. The method according to claim 17, wherein the first temperature is at least 50 degrees C., and wherein the first time period is at least 15 seconds.

\* \* \* \* \*